(12) United States Patent
Imai et al.

(10) Patent No.: US 9,400,419 B2
(45) Date of Patent: Jul. 26, 2016

(54) ILLUMINATION DEVICE AND PROJECTION DISPLAY DEVICE USING SAME

(75) Inventors: Masao Imai, Minato-ku (JP); Goroh Saitoh, Minato-ku (JP); Fujio Okumura, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 1157 days.

(21) Appl. No.: 13/498,532

(22) PCT Filed: Sep. 10, 2010

(86) PCT No.: PCT/JP2010/065601
§ 371 (c)(1),
(2), (4) Date: Mar. 27, 2012

(87) PCT Pub. No.: WO2011/037026
PCT Pub. Date: Mar. 31, 2011

(65) Prior Publication Data
US 2012/0182484 A1     Jul. 19, 2012

(30) Foreign Application Priority Data
Sep. 28, 2009 (JP) ................................ 2009-222671

(51) Int. Cl.
*G03B 21/28* (2006.01)
*G03B 21/20* (2006.01)
(Continued)

(52) U.S. Cl.
CPC ........ *G03B 21/2033* (2013.01); *G03B 21/2073* (2013.01); *G03B 33/12* (2013.01); *H04N 9/3164* (2013.01); *H04N 9/3167* (2013.01)

(58) Field of Classification Search
CPC ........... H04N 5/15; G03B 21/14; G03B 27/28
USPC .......................................................... 353/20
See application file for complete search history.

(56) References Cited

U.S. PATENT DOCUMENTS

2003/0160859 A1   8/2003   Roddy et al.
2004/0263500 A1   12/2004  Sakata
(Continued)

FOREIGN PATENT DOCUMENTS

CN   1693988 A   11/2005
CN   1847974 A   10/2006
(Continued)

OTHER PUBLICATIONS

Communication dated May 11, 2015 from the European Patent Office in counterpart application No. 10818701.4.
(Continued)

*Primary Examiner* — William C Dowling
*Assistant Examiner* — Jerry Brooks
(74) *Attorney, Agent, or Firm* — Sughrue Mion, PLLC

(57) ABSTRACT

An illumination device comprises a light source (3a) that includes a solid-state light source whose peak wavelength is set in the red wavelength band, a light source (3b) that includes a solid-state light source whose peak wavelength is set in the green wavelength band, a light source (3c) that includes a solid-state light source whose peak wavelength is set in the blue wavelength band, and a color synthesis optical element (1) that combines P-polarized colored light incident from one light source (3b) and S-polarized colored light incident from the other two light sources (3a and 3c). One light source (3c) includes at least one solid-state light source whose peak wavelength is set in the wavelength band of the color corresponding to one of the other light sources (3b).

9 Claims, 31 Drawing Sheets

(51) Int. Cl.
  *G03B 33/12* (2006.01)
  *H04N 9/31* (2006.01)

(56) References Cited

U.S. PATENT DOCUMENTS

| | | | |
|---|---|---|---|
| 2005/0248733 | A1 | 11/2005 | Sakata et al. |
| 2007/0019163 | A1 | 1/2007 | Ikeda et al. |
| 2007/0052928 | A1* | 3/2007 | Maeda ............... G02B 27/1026 353/20 |
| 2007/0139620 | A1* | 6/2007 | Bruzzone ........... G02B 27/1026 353/20 |
| 2008/0297728 | A1 | 12/2008 | Salters et al. |
| 2009/0086167 | A1 | 4/2009 | Yatsu et al. |

FOREIGN PATENT DOCUMENTS

| | | | |
|---|---|---|---|
| CN | 1928626 | A | 3/2007 |
| EP | 1596247 | A1 | 11/2005 |
| JP | 01-302385 | A | 12/1989 |
| JP | 2000-056410 | A | 2/2000 |
| JP | 2001-042431 | A | 2/2001 |
| JP | 2003-307782 | A | 10/2003 |
| JP | 2004-070018 | A | 3/2004 |
| JP | 2004-325630 | A | 11/2004 |
| JP | 2005-189277 | A | 7/2005 |
| JP | 2005-321524 | A | 11/2005 |
| JP | 200618067 | A | 1/2006 |
| JP | 2006-337609 | A | 12/2006 |
| JP | 2007-065412 | A | 3/2007 |
| JP | 2009-086078 | A | 4/2009 |

OTHER PUBLICATIONS

Communication dated Apr. 25, 2014, issued by the State Intellectual Property Office of the People's Republic of China in corresponding Application No. 201080053929.0.

Communication dated Aug. 5, 2014, from the Japanese Patent Office in counterpart Japanese application No. 2011532961.

* cited by examiner

Figure of spectral reflectance characteristic (45° incidence) of blue-reflecting multilayer film in color synthesis means Figure of spectral reflectance characteristic (45° incidence) of red-reflecting multilayer film in color synthesis means

ILLUMINATION DEVICE AND PROJECTION DISPLAY DEVICE USING SAME

CROSS REFERENCE TO RELATED APPLICATIONS

This application is a National Stage of International Application No. PCT/JP2010/065601 filed Sep. 10, 2010, claiming priority based Japanese Patent Application No. 2009-222671, filed Sep. 28, 2009 the contents of all of which are incorporated herein by reference in their entirety.

TECHNICAL FIELD

The present invention relates to a projection-type display device of which a projector is representative, and more particularly relates to an illumination device that generates an illumination light in which light of a plurality colors is synthesized and to a projection-type display device that uses this illumination device.

BACKGROUND ART

A projection-type display device includes an illumination device, a display element that is illuminated by the illumination light from the illumination device, and a projection lens that magnifies and projects the image displayed on the display element onto a screen. The illumination device is made up of a white light source, and a color wheel in which red (R), green (G), and blue (B) color filters are arranged in a disk form. The light from the white light source is entered onto the color wheel that rotates at high speed, whereby an illumination light is obtained in which color switches in a time sequence.

In the projection-type display device that is provided with the above-described illumination device, a full-color image can be displayed on a screen according to the principles of successive additive color mixture by displaying images of these color components on display elements in synchronization with the switching of the illumination light. This type of projection-type display device is referred to as a field-sequential or time-division projection-type display device.

A high-luminance light source such as a high-pressure mercury lamp is used as the white light source. However, a discharge lamp such as a high-pressure mercury lamp, while having high luminance, gives rise to the problems described hereinbelow in an illumination device that is combined with a color wheel or in a projection-type display device that uses such an illumination device.

Such a lamp is inconvenient to use because a lengthy time is required from being turned on until reaching a steady state of brightness, and further, after being turned off, a waiting period is also required for sufficient cooling before the lamp can be relighted.

When colored light is obtained from a white light source by a color wheel, the light utilization efficiency is extremely poor because, for example, blue and green light cannot be used during the time interval in which light passes through the red color filter to give red illumination.

In addition, two colors are mixed when light passes through the boundary portions of the color filters. As a result, the color purity of light that has passed through the boundary portions is degraded, or the light utilization efficiency drops because this light is not used in the projection display.

Still further, the time or order of switching colors is fixed by the color wheel that is employed.

In addition to the above, there is the problem that mechanical parts that causes the color wheel to rotate at high speed and sensors and electronic circuits that control the stability of rotation are required, leading to a corresponding increase in the cost of the device. Still further, there is the problem of noise during high-speed rotation.

Recent years have seen the development of higher luminance of light sources such as light-emitting diodes (LEDs) and semiconductor lasers (LDs) that are referred to as semiconductor light sources or solid-state light sources. The light emitted from these semiconductor light sources has a narrower spectral width than the light of white light sources of which discharge lamps such as high-pressure mercury lamps are representative and have the feature of enabling higher color reproducibility to be obtained without the use of color filters.

If an illumination device is configured using, for example, red (R), green (G), and blue (B) LEDs and a color synthesis optical element in place of a white light source and color wheel and the LEDs of each color are successively lighted, an illumination device is obtained in which colors are switched in a time sequence.

In contrast to a discharge lamp in which time is required for brightness to reach a steady state of brightness after lighting, a semiconductor light source such as an LED obtains an illumination light as well as a projected image that is bright immediately after lighting, and moreover, requires no waiting time for cooling before relighting. As a result, using a semiconductor light source as the light source of a projection-type display device improves user convenience.

In addition, an LED has a longer service life than a discharge lamp and is superior from an environmental standpoint because mercury is not used. The utilization efficiency of light is high because blue and green LEDs are extinguished when red is irradiated by an LED, and lower power consumption can thus be realized. Still further, installing a dimming function that controls the amount of current of the LEDs enables precise power saving according to conditions.

Because each of the red, green, and blue LEDs can be separately controlled, the time and order of color switching can be controlled electronically, colors can be switched freely, and moreover, synchronization with the display elements can be achieved with high accuracy. Because colors can be switched at high speed, color break-up that was problematic in the field-sequential mode color display can be markedly reduced. The ability to obtain not only R-G-B illumination light but also C (cyan), M (magenta), Y (yellow), as well as W (white) illumination light also enables display by a display mode that prioritizes brightness by displaying these color images. Still further, the problems of deterioration of rotation mechanism parts or noise caused by high-speed rotation do not arise.

Due to these many advantages afforded by LEDs, an illumination device that uses, for example, LEDs and a color synthesis optical element in a projection-type display device is highly anticipated.

However, emission light of a sufficient brightness cannot currently be obtained from a single LED. Thus, in order to realize higher luminance, various techniques for combining a plurality of colors have been proposed. For example, Patent Documents 1-3 disclose light source devices that combine luminous flux from a plurality of LEDs having different peak wavelengths by means of dichroic mirrors or dichroic prisms. These light source devices are of a mode in which differences in wavelength are used to synthesize colored light by dichroic mirrors.

Alternatively, light source devices are disclosed in Patent Documents 4 and 5 in which at least one of three light sources is of a configuration in which a plurality of light sources having different peak wavelengths are disposed in array form. This is a mode of spatially synthesizing colored light.

Yet another mode of synthesizing colored light is a technique that uses polarization. For example, an illumination device is disclosed in Patent Document 6 in which light from two light sources that emit light having random polarization directions is converted to linearly polarized light having polarization directions that are mutually orthogonal and is then synthesized by a polarization beam splitter.

As a related invention, Patent Document 7 discloses a light source device in which light of each color is arranged in a specific polarization direction in advance and then synthesized by a dichroic prism. Still further, a projection-type display device is disclosed in Patent Document 8 in which the polarization direction of incident light is selected while taking into consideration the incident angle dependency when colors are synthesized by a dichroic prism.

The color synthesis optical element that is used in the light source device described in Patent Document 8 includes blue-reflecting multilayer film and red-reflecting multilayer film. FIG. 1A shows the spectral reflectance characteristic of the blue-reflecting multilayer film, and FIG. 1B shows the spectral reflectance characteristic of the red-reflecting multilayer film.

As shown in FIG. 1A, the cutoff wavelength of S-polarized light of the blue-reflecting multilayer film is at least 510 nm but no greater than 540 nm. As shown in FIG. 1B, on the other hand, the cutoff wavelength of S-polarized light of the red reflecting multilayer film is at least 540 nm but no greater than 560 nm.

The light (P-polarized light) from a green light valve (display element) is entered into the blue-reflecting multilayer film and the red-reflecting multilayer film, and light (S-polarized light) from red and blue light valves (display elements) is entered into blue-reflecting multilayer film and red-reflecting multilayer film.

LITERATURE OF THE PRIOR ART

Patent Documents

Patent Document 1: Japanese Unexamined Patent Application Publication No. 2001-042431 (FIG. 1)
Patent Document 2: Japanese Unexamined Patent Application Publication No. 2005-321524 (FIG. 1)
Patent Document 3: Japanese Unexamined Patent Application Publication No. 2004-070018 (FIG. 5)
Patent Document 4: Japanese Unexamined Patent Application Publication No. 2004-325630 (FIG. 1)
Patent Document 5: Japanese Unexamined Patent Application Publication No. 2005-189277 (FIG. 1)
Patent Document 6: Japanese Unexamined Patent Application Publication No. 2006-337609 (FIG. 1)
Patent Document 7: Japanese Unexamined Patent Application Publication No. 2000-056410 (FIG. 7)
Patent Document 8: Japanese Unexamined Patent Application Publication No. H01-302385 (FIG. 1)

SUMMARY OF THE INVENTION

A projection-type display device that uses LEDs as light sources of each of the colors red, green, and blue and that synthesizes the colored light from the LEDs of each color to obtain white light has the problems as described below.

In the projection optics, there is also the constraint of etendue that is determined by the area of the light source and the angle of divergence. If the value that is the product of the area of the light source and the angle of divergence is not made less than or equal to the value of the product of the area of a display element and the acceptance angle (solid angle) that is determined by the f-number of the projection lens, the light from the light source is not used as projection light. In other words, in the projection optics, there are constraints regarding the area of a semiconductor chip of an LED or the number of LEDs, and moreover, there is a constraint regarding the angular spread of the illumination light. Essentially, brightness cannot be improved even if a multiplicity of LEDs greater than or equal to the number determined by the constraint of etendue is aligned in an array.

Still further, because the optical output characteristic of LEDs differs for each of the colors of red, green, and blue, the optical output of the LEDs of other colors must be restrained to accord with the optical output of the LEDs of the color having the lowest performance. As a result, the maximum optical output performance of LEDs of other colors cannot be realized.

Under the conditions of the constraints of etendue, an illumination device that can exhibit the maximum optical output performance of the LEDs of each color and that can obtain white light having superior white balance is difficult to realize even by a combination of the technology disclosed in Patent Documents 1-8.

For example, even if a device in which the polarization dependence of a dichroic mirror is taken into consideration in selecting the polarization direction of incident light (Patent Document 8) is used in a device that, taking incident angle dependency and polarization dependency into consideration, uses polarization to synthesize light (Patent Document 6) or in a device that aligns the light of each color in a specific polarization direction in advance and then irradiates the light into a dichroic mirror (Patent Document 7), the light of a color that is inadequate at the LED light source cannot be augmented, and consequently, the constraints of etendue cannot be canceled and the optical output performance of all LEDs cannot be displayed at their maximum. Here, the incident angle dependency is the shifting of cutoff wavelengths towards shorter wavelengths or longer wavelengths from the set values according to the angle of incidence to the dichroic mirror. Polarization dependency is the difference in cutoff wavelengths between P-polarized light and S-polarized light.

It is therefore an object of the present invention to provide an illumination device that can obtain white light having superior white balance and that can display the optical output performance of an LED at a maximum and thus solve the above-described problems, and to provide a projection-type display device that uses such an illumination device.

The illumination device of the present invention for achieving the above-described objects includes:
a first light source that includes a solid-state light source whose peak wavelength is set in the red wavelength band;
a second light source that includes a solid-state light source whose peak wavelength is set in the green wavelength band;
a third light source that includes a solid-state light source whose peak wavelength is set in the blue wavelength band; and
a color synthesis optical element that synthesizes colored light of a first polarization that is entered from the above-described second light source and colored light of a second polarization whose polarization state differs from that of the above-described first polarization that is entered from the above-described first and third light sources;
wherein any one of the above-described first to third light sources further includes at least one solid-state light source whose peak wavelength is set in a specific wavelength band that is the wavelength band of the color of the solid-state light source that is used in one of the remaining two light sources.

The projection-type display device of the present invention includes: the above-described illumination device;

a display element into which light from the above-described illumination device is entered;

projection optics that project an image displayed by the above-described display elements; and control means that both displays images that accord with an input video signal on the above-described display element for each color component that corresponds to the three primary colors of light and that controls the lighting of the above-described first to third light sources that make up the above-described illumination device in synchronization with the timing of the image display of each color component.

EXPLANATION OF REFERENCE NUMBERS 1 color synthesis optical element
1a-1d right angle prisms
2a first dichroic mirror
2b second dichroic mirror
3a-3c light sources
Best Mode for Carrying Out the Invention Exemplary embodiments of the present invention are next described with reference to the accompanying drawings.

First Exemplary Embodiment

Figure 2:
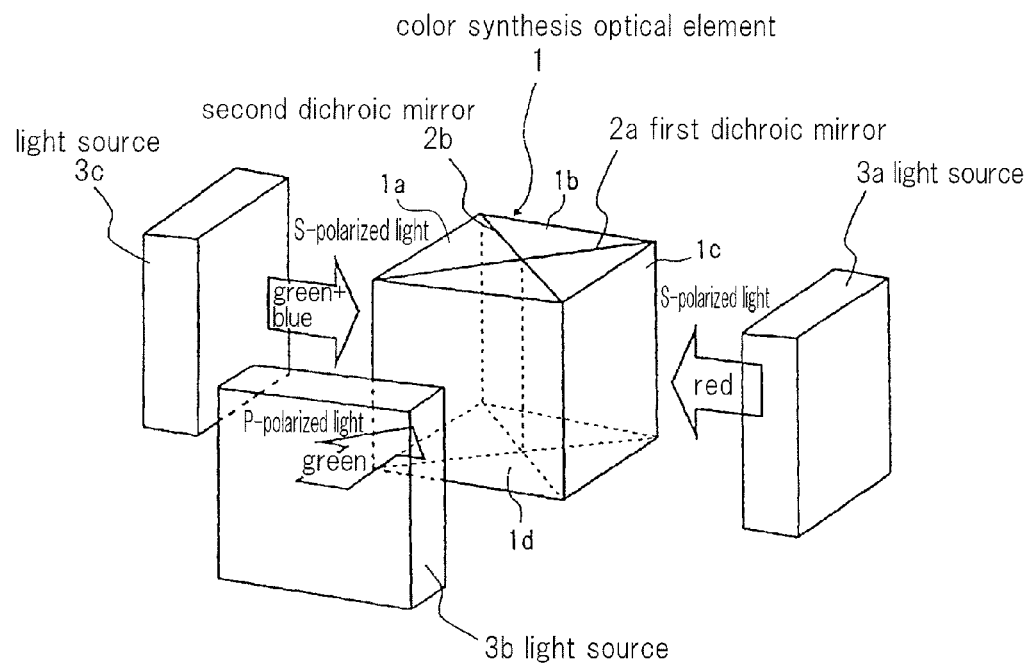
FIG. 2 is a perspective view showing the configuration of the illumination device that is the first exemplary embodiment of the present invention.

FIG. 2 is a perspective view showing the configuration of the illumination device that is the first exemplary embodiment of the present invention.

Referring to FIG. 2, the illumination device includes color synthesis optical element 1 and three light sources 3a-3c.

Color synthesis optical element 1 is a cross dichroic prism made up of four right angle prisms 1a-1d in which the surfaces that form right angles are joined together. A uniform first plane is formed by the joined surfaces of right angle prisms 1a and 1d and the joined surfaces of right angle prisms 1b and 1c, and first dichroic mirror 2a composed of a dielectric multilayer film is formed on this first plane. A uniform second plane that intersects the first plane is formed by the joined surfaces of right angle prisms 1a and 1b and the joined surfaces of right angle prisms 1c and 1d, and second dichroic mirror 2b composed of dielectric multilayer film is formed on this second plane. In other words, first dichroic mirror 2a and second dichroic mirror 2b are formed such that their film surfaces intersect each other.

Light is entered from three surfaces (each of the surfaces of right angle prisms 1a, 1c, and 1d) of the four side surfaces of color synthesis optical element 1 and colors are synthesized. The one remaining side surface is the exit surface of the synthesized light.

Light source 3a supplies red light (S-polarized light). Light source 3b supplies green light (P-polarized light). Light source 3c supplies green and blue light (S-polarized light). Here, red, green, and blue correspond to the three primary colors of light.

The S-polarized light (red) from light source 3a is entered into color synthesis optical element 1 from the incident surface of right angle prism 1c. The P-polarized light (green) from light source 3b is entered into color synthesis optical element 1 from the incident surface of right angle prism 1d. The S-polarized light (green+blue) from light source 3c is entered into color synthesis optical element 1 from the incident surface of right angle prism 1a.

In color synthesis optical element 1, the S-polarized light (red), P-polarized light (green), and S-polarized light (green+blue) from each incident surface are synthesized by first dichroic mirror 2a and second dichroic mirror 2b.

Figure 3A:
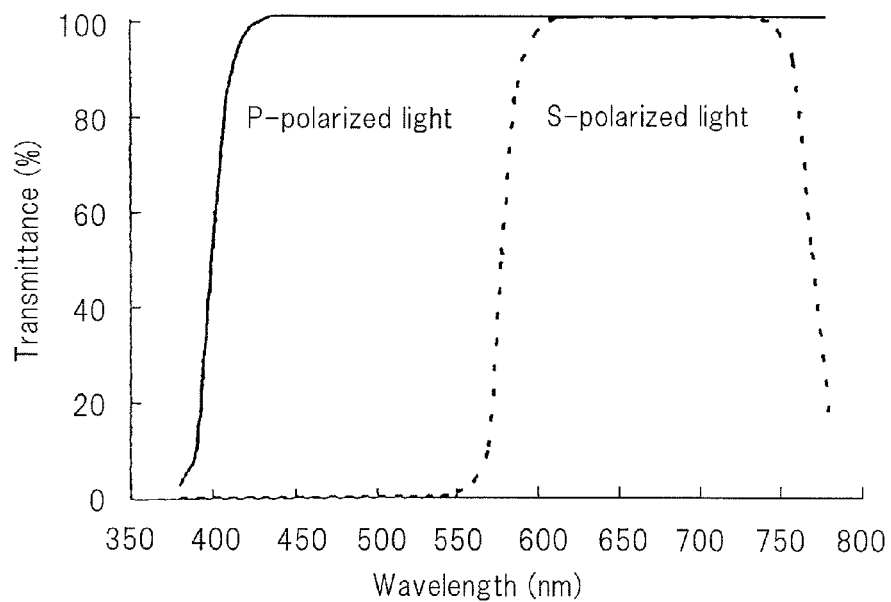
FIG. 3A is a graph showing the spectral transmittance characteristic with respect to P-polarized light and S-polarized light of the first dichroic mirror of the color synthesis optical element that forms part of the illumination device shown in FIG. 2.
Figure 3B:
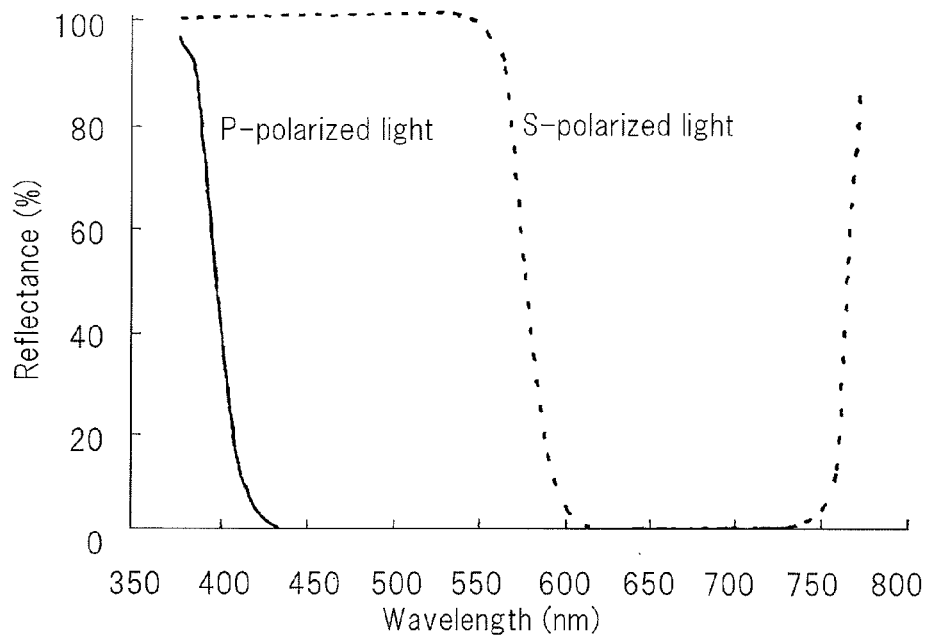
FIG. 3B is a graph showing the spectral reflectance characteristic with respect to P-polarized light and S-polarized light of the first dichroic mirror of the color synthesis optical element that forms part of the illumination device shown in FIG. 2.

FIG. 3A is a graph showing the spectral transmittance characteristic with respect to P-polarized light and S-polarized light of first dichroic mirror 2a. FIG. 3B is a graph showing the spectral reflectance characteristic with respect to P-polarized light and S-polarized light of the first dichroic mirror 2a.

The cutoff wavelength is defined as the wavelength at which the transmittance or reflectance is 50%. The cutoff wavelength of first dichroic mirror 2a with respect to incident P-polarized light is 400 nm. In this case, first dichroic mirror 2a largely transmits and does not reflect P-polarized light having a wavelength of 400 nm or more. On the other hand, the cutoff wavelength of first dichroic mirror 2a with respect to incident S-polarized light is 580 nm. In this case, first dichroic mirror 2a largely transmits and does not reflect S-polarized light having a wavelength of 580 nm or more. In addition, first dichroic mirror 2a largely reflects and does not transmit S-polarized light having a wavelength shorter than 580 nm.

If the characteristics of first dichroic mirror 2a are expressed by its action upon colored light, with respect to blue and green light, first dichroic mirror 2a transmits P-polarized light and reflects S-polarized light. In other words, first dichroic mirror 2a also acts as a polarization beam splitter with respect to blue and green light. In addition, with respect to red light, first dichroic mirror 2a transmits and does not act in any way upon either of P-polarized light and S-polarized light.

Figure 4A:
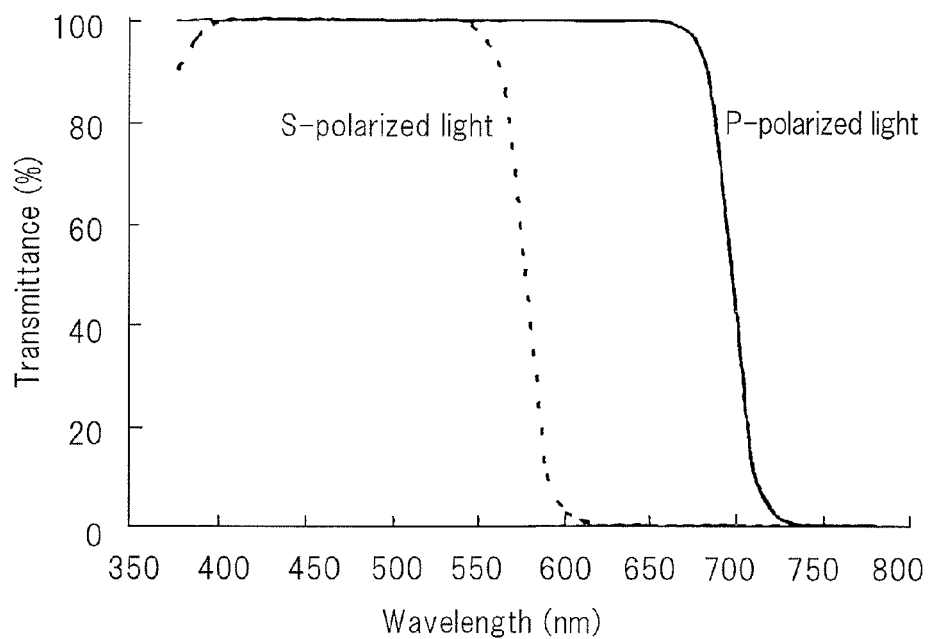
FIG. 4A is a graph showing the spectral transmittance characteristic of the second dichroic mirror of the color synthesis optical element that forms part of the illumination device shown in FIG. 2.
Figure 4B:
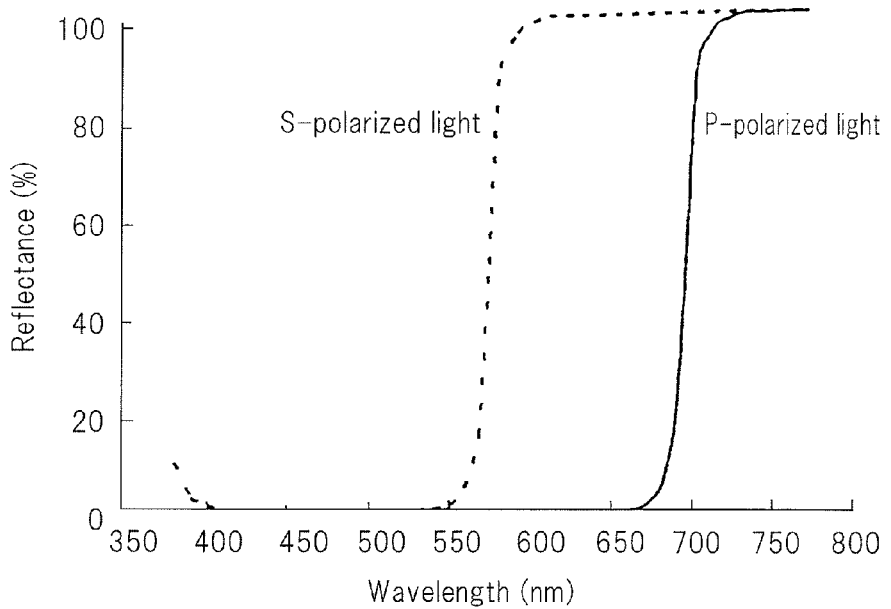
FIG. 4B is a graph showing the spectral reflectance characteristic of the second dichroic mirror of the color synthesis optical element that forms part of the illumination device shown in FIG. 2.

FIG. 4A is a graph showing the spectral transmittance characteristic with respect to P-polarized light and S-polarized light of second dichroic mirror 2b. FIG. 4B is a graph showing the spectral reflectance characteristic with respect to P-polarized light and S-polarized light of second dichroic mirror 2b.

The cutoff wavelength of second dichroic mirror 2b with respect to incident P-polarized light is 700 nm. In this case, second dichroic mirror 2b largely transmits and does not reflect P-polarized light having a wavelength of 700 nm or less. On the other hand, the cutoff wavelength of second dichroic mirror 2b with respect to incident S-polarized light is 580 nm. In this case, second dichroic mirror 2b largely reflects and does not transmit S-polarized light having a wavelength of 580 nm or more. In addition, second dichroic mirror 2b largely transmits and does not reflect S-polarized light having a wavelength shorter than 580 nm.

If the characteristics of second dichroic mirror 2b are expressed as its action upon colored light, with respect to blue and green light, second dichroic mirror 2b transmits and does not act in any way upon either of P-polarized light and S-polarized light. In addition, with respect to red light, second dichroic mirror 2b transmits P-polarized light and reflects S-polarized light. In other words, second dichroic mirror 2b also acts as a polarization beam splitter with respect to red light.

Figure 5:
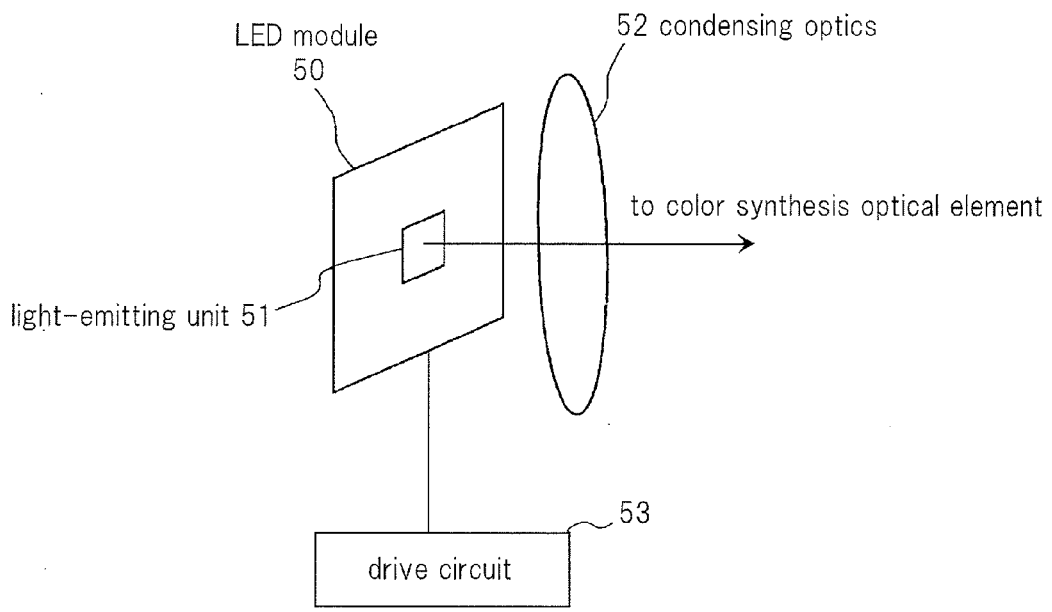
FIG. 5 is a block diagram showing the configuration of the light source that is used in the illumination device shown in FIG. 2.

FIG. 5 is a block diagram showing the basic configuration of a light source that is used as light sources 3a-3c. Referring to FIG. 5, the light source includes LED module 50 in which an LED that is light-emitting unit 51 is mounted on a substrate. The substrate also provides the function of radiator plate and a heat sink (not shown) is attached. A forced cooling apparatus is further provided on LED module 50 and temperature control is carried out such that the light-emitting characteristic of the LED is stabilized.

When the switch of the illumination device is turned on, drive circuit 53 supplies drive current to light-emitting unit (LED) 51. When current flows in light-emitting unit (LED) 51, light-emitting unit (LED) 51 emits light. The light from light-emitting unit (LED) 51 is condensed by condensing optics 52. The luminous flux from condensing optics 52 is entered into color synthesis optical element 1.

Although an optical element in the form of a lens is used as the condensing optics in FIG. 5, a reflective optical element such as a reflector may also be used. In addition, a fly-eye lens or glass rod may be used as an integrator for illuminating the display element uniformly. Still further, in order to efficiently obtain polarization components, optics may be used for reusing one polarization component, such as polarization conversion optics that use a polarization beam splitter and a half-wave plate. Of course, light-emitting unit 51 of LED module 50 may be a light source that emits polarized light, or a configuration may be adopted in which a polarization conversion function is provided in light-emitting unit 51 such that polarized light is emitted from light-emitting unit 51. Any form can be configured through the free combination of known technology.

An actual configuration of the LED module of light sources 3a-3c is next described.

Figure 6A:
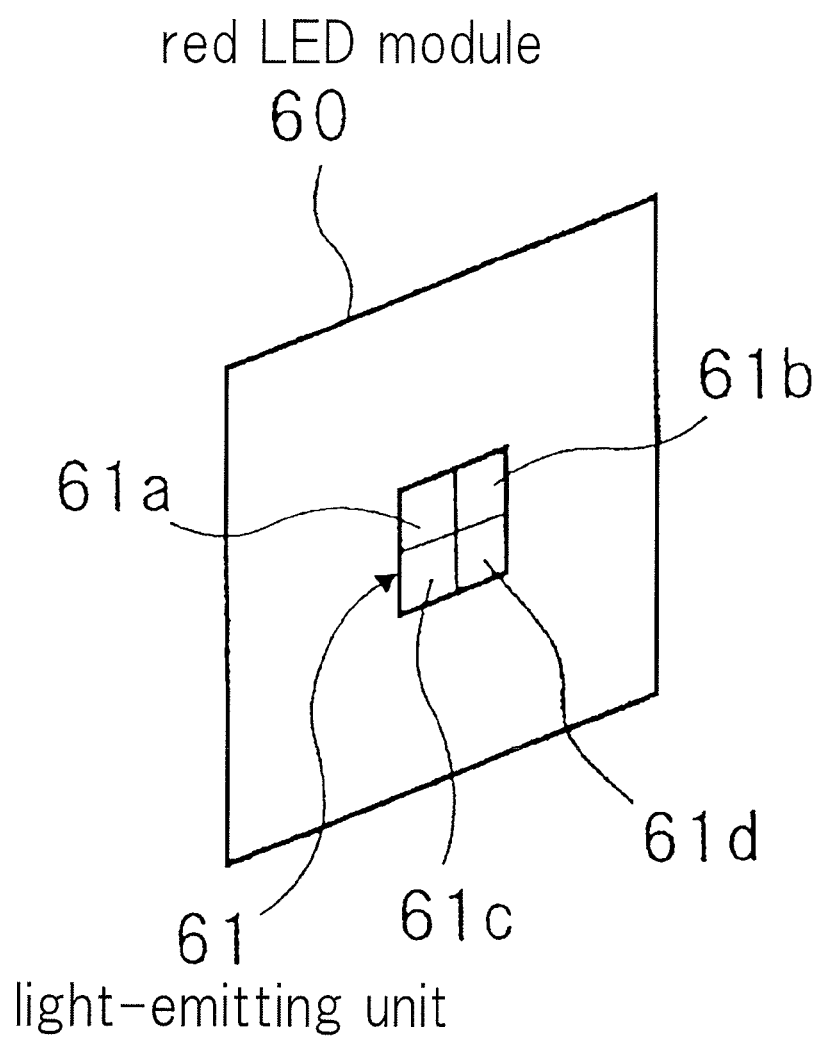
FIG. 6A is a schematic view showing the configuration of the red LED module that is used as a light source of the illumination device shown in FIG. 2.

FIG. 6A is a schematic view showing the configuration of the red LED module that is used in light source 3a. Referring to FIG. 6A, red LED module 60 includes light-emitting unit 61 that is composed of four LED chips 61a-61d. All of LED chips 61a-61d are red LEDs having a peak wavelength of 630 nm and all have substantially identical chip areas.

Figure 6B:
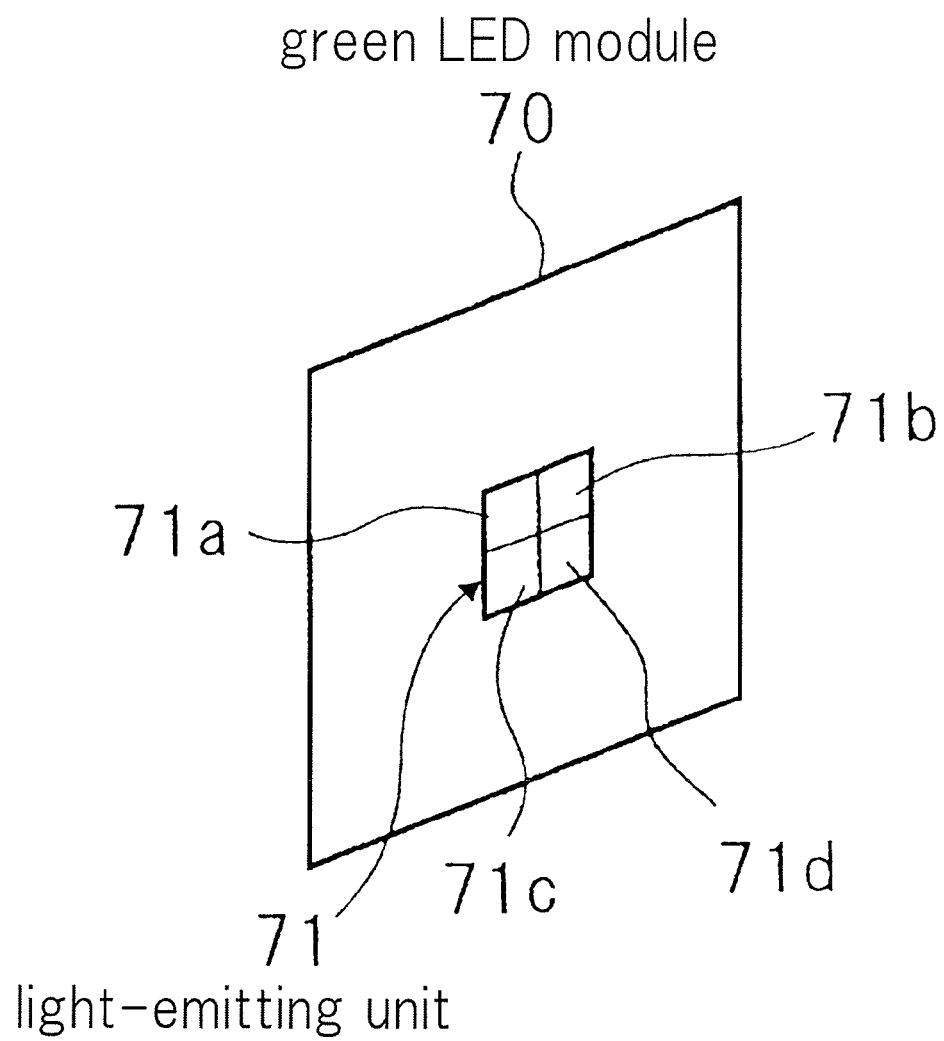
FIG. 6B is a schematic view showing the configuration of the green LED module that is used as a light source of the illumination device shown in FIG. 2.

FIG. 6B is a schematic view showing the configuration of the green LED module that is used in light source 3b. Referring to FIG. 6B, green LED module 70 includes light-emitting unit 71 composed of four LED chips 71a-71d. All of LED chips 71a-71d are green LEDs having a peak wavelength of 520 nm and all have substantially identical chip areas.

Figure 6C:
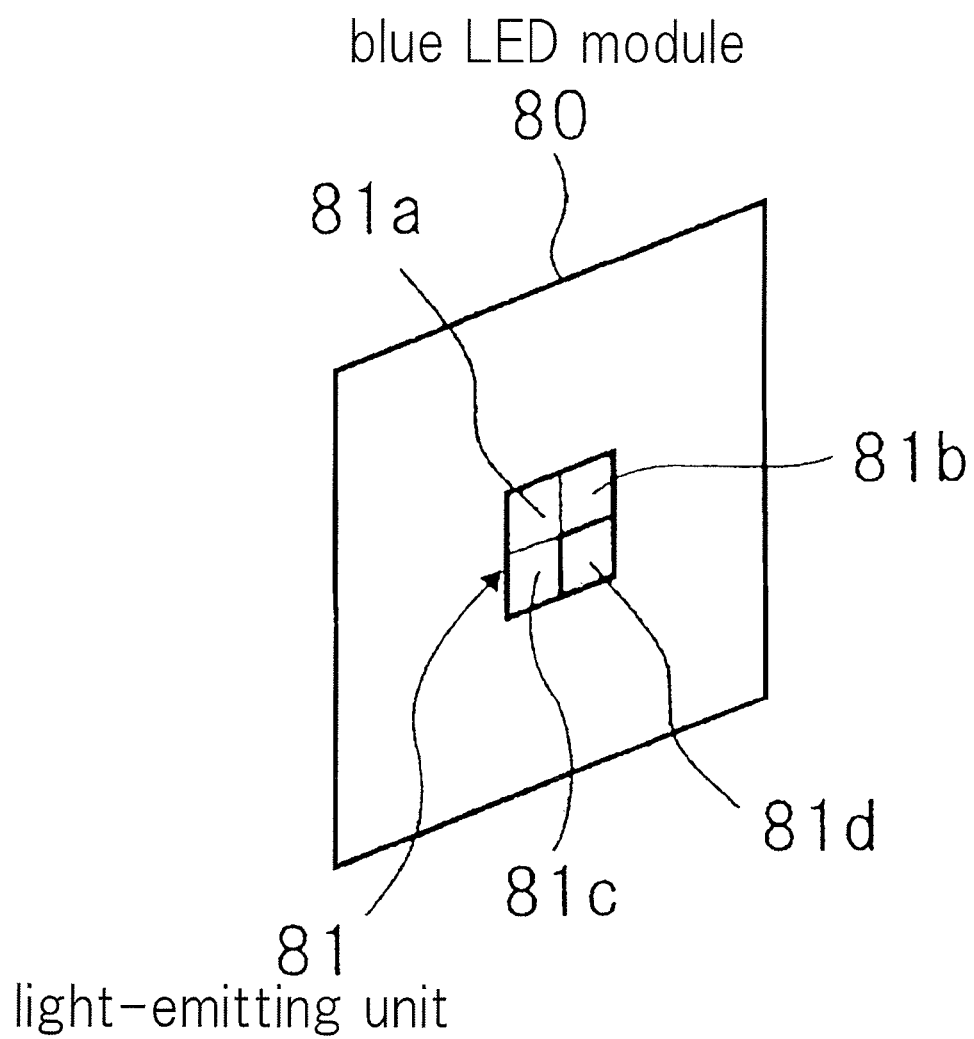
FIG. 6C is a schematic view showing the configuration of the blue LED module that is used as a light source of the illumination device shown in FIG. 2.

FIG. 6C is a schematic view showing the configuration of the blue LED module that is used in light source 3c. Referring to FIG. 6C, blue LED module 80 includes light-emitting unit 81 composed of four LED chips 81a-81d. All of LED chips 81a-81c are blue LEDs having a peak wavelength of 460 nm. LED chip 81d is a green LED having a peak wavelength of 520 nm. The chip areas of LED chips 81a-81d are substantially identical.

Figure 8A:
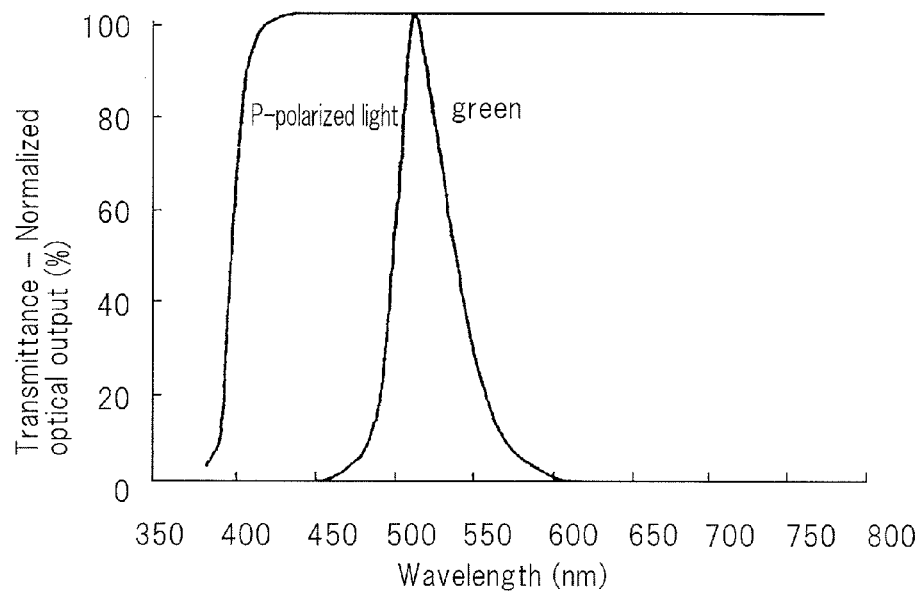
FIG. 8A is a graph showing the relation between the emission spectrum of a green LED light source and the spectral transmittance characteristic with respect to P-polarized light of the first dichroic mirror of the color synthesis optical element that forms part of the illumination device shown in FIG. 2.
Figure 8B:
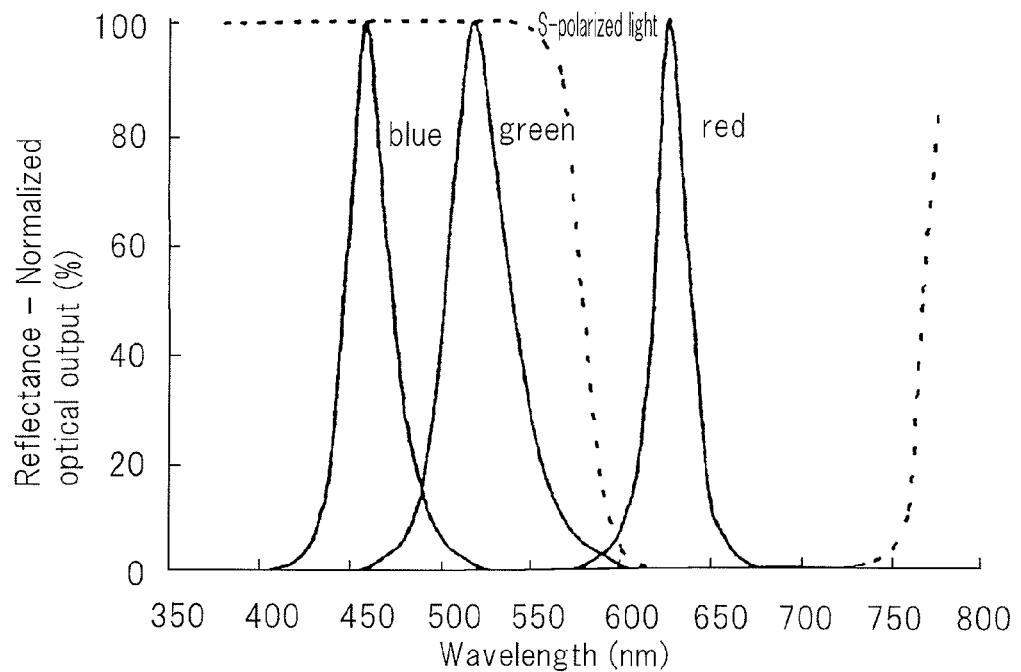
FIG. 8B is a graph showing the relation between the emission spectrums of each of red, green, and blue LED light sources and the spectral reflectance characteristic with respect to S-polarized light of the first dichroic mirror of the color synthesis optical element that forms part of the illumination device shown in FIG. 2.

The emission spectrums of the red, green, and blue LEDs that make up the above-described LED chips 61a-61d, 71a-71d, and 81a-81d are similar to the emission spectrums shown in FIG. 8B, to be described.

The areas of each of light-emitting units 61, 71, and 81 are basically determined by the area of the display elements and the f-number of the projection lens based on the previously described constraints of etendue, but when determining the areas, the positioning margins during manufacturing and the uniformity of the illuminance distribution of the illumination light are taken into consideration.

In red LED module 60, green LED module 70, and blue LED module 80, the light-emission characteristics vary with respect to current of the LED chips that make up the light-emitting units, and the amount of current to the LED chips is controlled by the drive circuit shown in FIG. 5 in accordance with this light-emission characteristic.

In addition, the characteristics of each color of the LEDs during rated drive are as follows. The chromaticity of the red LEDs is given as (0.700, 0.300) on xy chromaticity coordinates and the emitted luminous flux is 455 lm per chip. The chromaticity of the green LEDs is given as (0.195, 0.700) on xy chromaticity coordinates and the emitted luminous flux is 1000 lm per chip. The chromaticity of the blue LEDs is (0.140, 0.046) on xy chromaticity coordinates and the emitted luminous flux is 133 lm per chip.

Figure 1A:
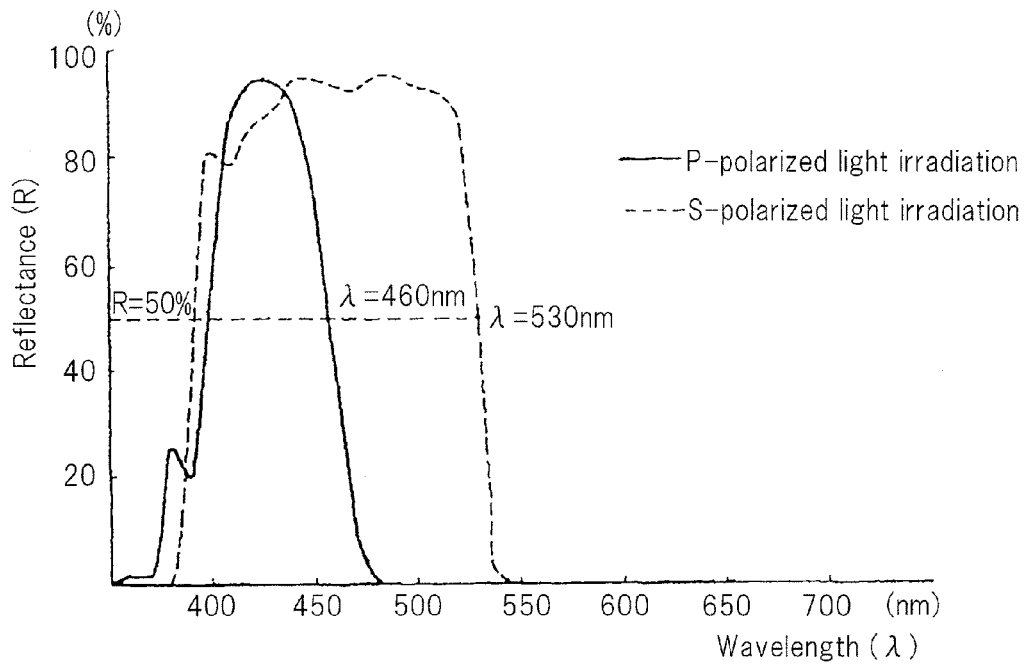
FIG. 1A is a graph showing the spectral reflectance characteristic of blue-reflecting multilayer film of the color synthesis optical element described in Patent Document 8.
Figure 1B:
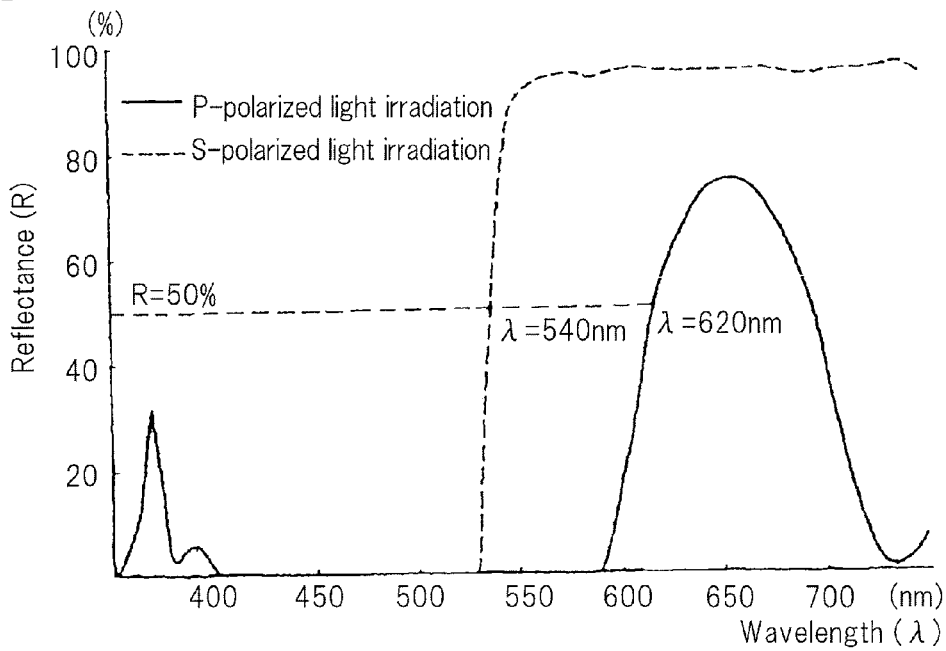
FIG. 1B is a graph showing the spectral reflectance characteristic of a red-reflecting multilayer film of the color synthesis optical element described in Patent Document 8.

The setting of the cutoff wavelength with respect to S-polarized light of first dichroic mirror 2a and second dichroic mirror 2b to the yellow band of 580 nm differs greatly from the spectral characteristics of the dichroic prism disclosed in Patent Document 8 (see FIGS. 1A and 1B). Due to this point of difference, the light of a color that is inadequate can be augmented within the constraints of etendue to obtain good white balance and the optical output characteristic of LED light sources can be displayed at a maximum. These features will be described in detail hereinbelow.

Figure 7:
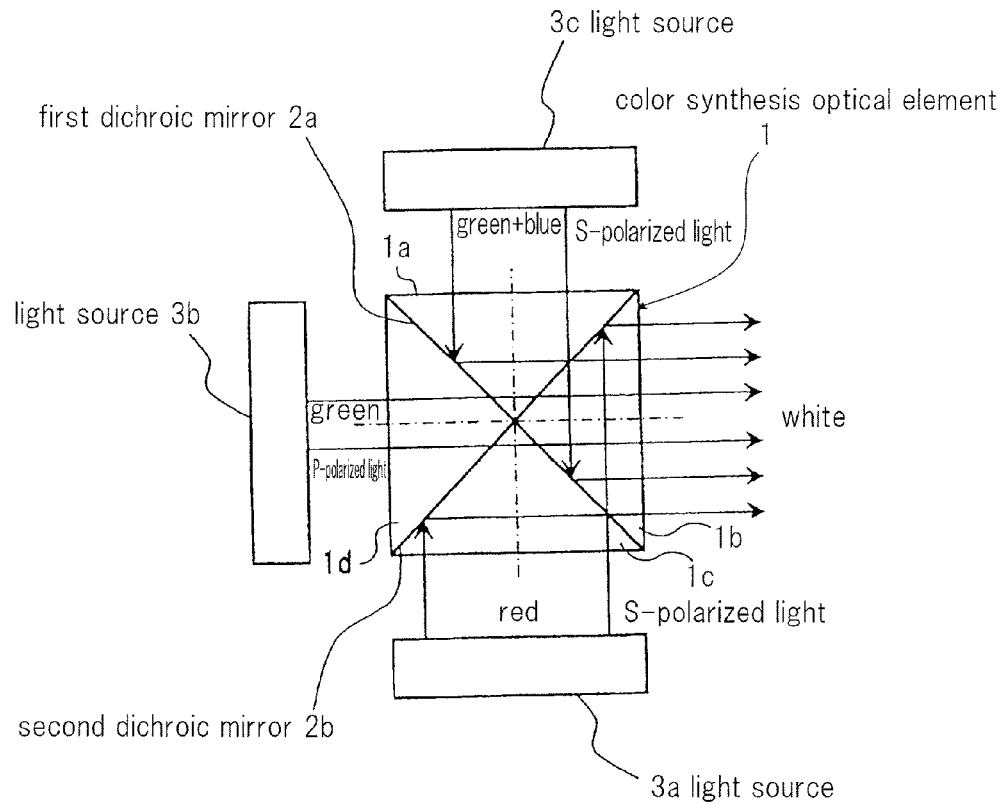
FIG. 7 is a schematic view showing an example of optical paths when colored light is synthesized using the illumination device shown in FIG. 2.

FIG. 7 is a plan view for describing the optical paths when colored light is synthesized using the illumination device shown in FIG. 2.

Of the four side surfaces of color synthesis optical element 1, three surfaces are incident surfaces and the colored light that is entered from these incident surfaces is synthesized by first dichroic mirror 2a and second dichroic mirror 2b. The one remaining surface is the exit surface, and the synthesized colored light is emitted from this exit surface.

In FIG. 7, the lines represented by solid lines with arrows each show representative directions of progression of incident luminous flux, but this is not intended to indicate that the incident rays are only the lines represented by these solid lines with arrows. The incident light is luminous flux having a cross-sectional area no greater than the incident surfaces of color synthesis optical element 1 and includes positions other than the lines represented by the solid lines with arrows and further includes angular components.

Light source 3a emits red S-polarized light. The red S-polarized light from light source 3a is entered into color synthesis optical element 1 from the incident surface of right angle prism 1c (in FIG. 7, the surface located on the lower side of the figure).

First dichroic mirror 2a does not act in any way upon red S-polarized light and the red S-polarized light therefore passes through first dichroic mirror 2a without change. On the other hand, second dichroic mirror 2b reflects all red S-polarized light. As a result, the luminous flux of red S-polarized light is bent 90 degrees at second dichroic mirror 2b and then exited from the exit surface of right angle prism 1b, as shown in FIG. 7.

Light source 3b emits green P-polarized light. The green P-polarized light from light source 3b is entered into color synthesis optical element 1 from the incident surface of right angle prism 1d (in FIG. 7, the surface located on the left side of the figure).

Neither first dichroic mirror 2a nor second dichroic mirror 2b act in any way upon green P-polarized light, and the green P-polarized light therefore passes through first dichroic mirror 2a and second dichroic mirror 2b without alteration. The green P-polarized light that has passed through first dichroic mirror 2a and second dichroic mirror 2b is exited from the exit surface of right angle prism 1b.

Light source 3c emits blue and green S-polarized light. The blue and green S-polarized light from light source 3c is entered into color synthesis optical element 1 from the incident surface of right angle prism 1a (in FIG. 7, the surface located on the upper side of the figure).

Second dichroic mirror 2b does not act in any way upon blue and green S-polarized light, and the blue and green S-polarized light therefore passes through second dichroic mirror 2b without alteration. On the other hand, first dichroic mirror 2a reflects all blue and green S-polarized light. As a result, the luminous flux of blue and green S-polarized light is bent 90 degrees at first dichroic mirror 2a and then exited from the exit surface of right angle prism 1b as shown in FIG. 7.

As described hereinabove, white light can be obtained in the illumination device of the present exemplary embodiment by the synthesis in first dichroic mirror 2a and second dichroic mirror 2b of green and blue S-polarized light entered from incident surface of right angle prism 1a, red S-polarized light entered from the incident surface of right angle prism 1c, and green P-polarized light entered from the incident surface of right angle prism 1d.

FIG. 8A is a graph showing the relation between the emission spectrum of a green LED light source and the spectral transmittance characteristic with respect to P-polarized light of first dichroic mirror 2a. FIG. 8B is a graph showing the relation between the emission spectrums of each of red, green, and blue LED light sources and the spectral reflectance characteristic with respect to S-polarized light of first dichroic mirror 2a. The peak wavelength of the red LED light source is 630 nm, the peak wavelength of the green LED light source is 520 nm, and the peak wavelength of the blue LED light source is 460 nm.

Figure 9A:
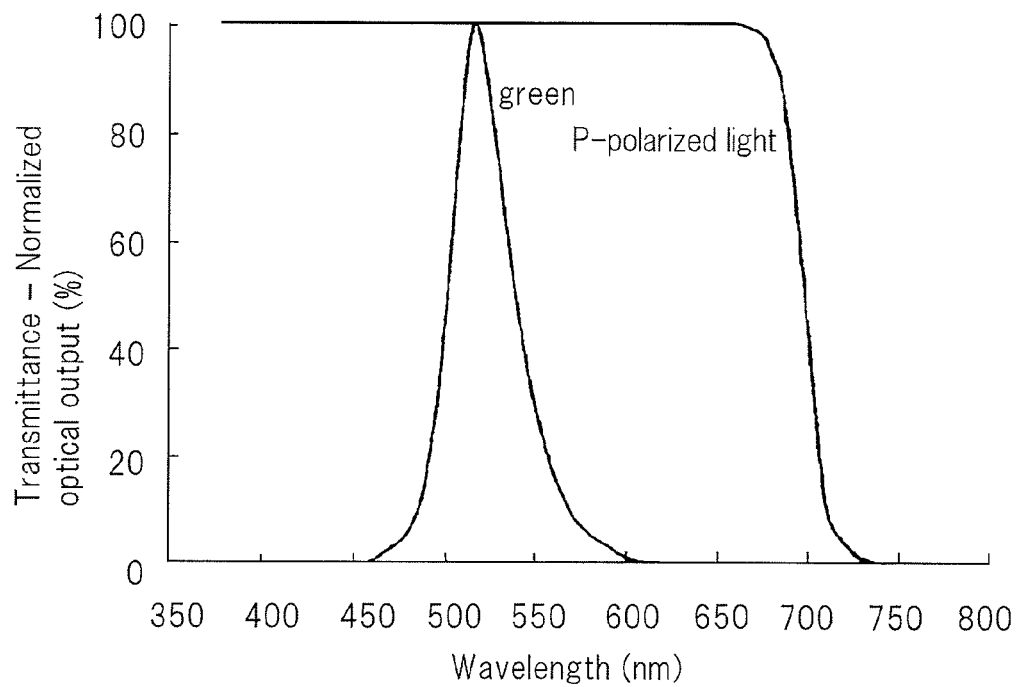
FIG. 9A is a graph showing the relation between the emission spectrum of a green LED light source and the spectral transmittance characteristic with respect to P-polarized light of the second dichroic mirror of the color synthesis optical element that forms part of the illumination device shown in FIG. 2.
Figure 9B:
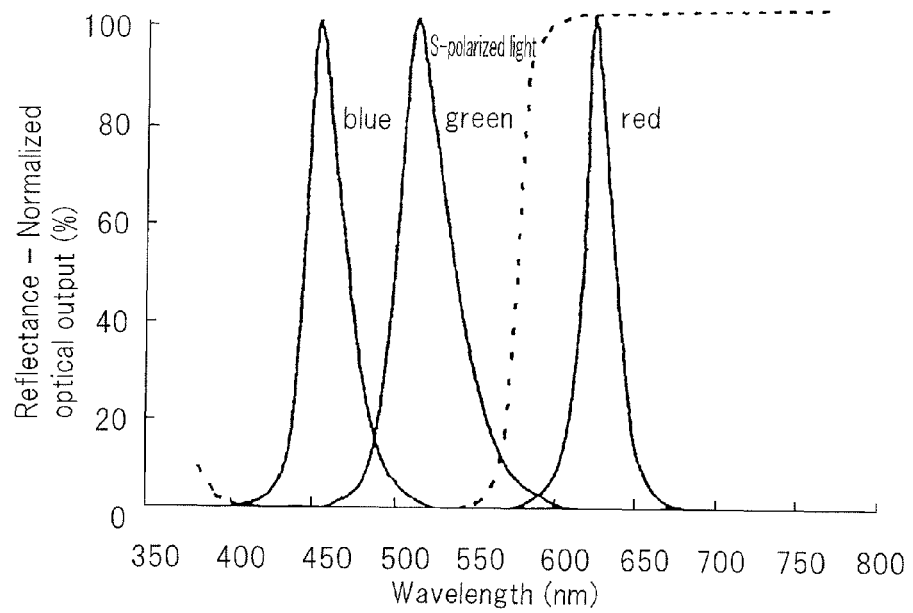
FIG. 9B is a graph showing the relation between the emission spectrums of each of the red, green, and blue LED light sources and the spectral reflectance characteristic with respect to S-polarized light of the second dichroic mirror of the color synthesis optical element that foams part of the illumination device shown in FIG. 2.

FIG. 9A is a graph showing the relation between the emission spectrum of a green LED light source and the spectral transmittance characteristic with respect to P-polarized light of second dichroic mirror 2b. FIG. 9B is a graph showing the relation between the emission spectrums of each of red, green, and blue LED light sources and the spectral reflectance characteristic with respect to S-polarized light of second dichroic mirror 2b. The peak wavelength of the red LED light source is 630 nm, the peak wavelength of the green LED light source is 520 nm, and the peak wavelength of the blue LED light source is 460 nm.

As can be clearly seen from FIGS. 8A and 9A, the cutoff wavelengths with respect to green P-polarized light of first dichroic mirror 2a and second dichroic mirror 2b are sufficiently separated. Accordingly, green P-polarized light will not be reflected by these dichroic mirrors 2a and 2b despite shift of the cutoff wavelength due to incident angle dependency, and loss will therefore not occur due to incident angle dependency.

In addition, as can be clearly seen from FIGS. 8B and 9B, the cutoff wavelengths of first dichroic mirror 2a and second dichroic mirror 2b with respect to green S-polarized light and red S-polarized light are sufficiently separated. Accordingly, red and green S-polarized light can be synthesized by these dichroic mirrors 2a and 2b with virtually no loss despite shifts in the cutoff wavelengths due to incident angle dependency.

The cutoff wavelengths of first dichroic mirror 2a and second dichroic mirror 2b are thus set to the yellow band which is not used in color synthesis, whereby light that is entered at angles different from parallel light can also be efficiently synthesized.

Typically, when semiconductor light sources such as LEDs are used as each of red, green, and blue light sources and the red, green, and blue light from each semiconductor light source is synthesized to obtain white light having superior white balance, regarding the color mixture ratios of red, green, and blue light, the blue optical output is greater than for other colors and the green optical output is smaller than for the other colors. In this case, the optical output of the blue and red semiconductor light sources is suppressed to accord with the green semiconductor light source for which optical output is relatively small, and as a consequence, the optical output of the obtained white light is small.

According to the illumination device of the present exemplary embodiment, green light can be synthesized from two different directions. Still further, a configuration is adopted that reduces the amount of blue light for which the optical output is relatively great and adds green light. Accordingly, the three primary colors can be synthesized at preferable color mixture ratios and white light having superior white balance can be obtained. Still further, the optical output of the LEDs of three colors can be exhibited at the maximum without limitation.

The effects of the illumination device of the invention of the present application are next described.

As an example, the light-emitting unit of a blue LED module is made up of four blue LEDs, the light-emitting unit of a green LED module is made up of four green LEDs, and the light-emitting unit of a red LED module is made up of four red LEDs. When luminous flux from each of the blue, green, and red LED modules of this type is synthesized, the entire synthesized luminous flux is 6352 lm (=(455+100+133)×4).

However, the chromaticity of the above-described synthesized white is (0.299, 0.271), a value that diverges greatly toward blue-violet from the white chromaticity (0.313, 0.329) of standard illuminant D65. The reason for this divergence is the relative weakness of the optical output of the green LEDs and the relative strength of the optical output of blue LEDs with respect to the light amount ratios for obtaining a preferable white.

To obtain white balance, the emitted luminous flux of green must be increased. The emitted luminous flux can be increased by increasing the current that flows to the LEDs if within the rated range. However, if the amount of current is increased in a state in which the emitted luminous flux from the green LEDs is 1000 lm, the LEDs are driven in excess of their rating, in which case an increase of luminous flux according to the increase of the amount of current cannot be expected. In addition, driving an LED in excess of its rating not only shortens the service life of the LED, but in some cases may destroy the LED.

As described hereinabove, both the emitted luminous flux of the blue LEDs is suppressed from 133 lm to 80 lm and the emitted luminous flux of the red LEDs is suppressed from 455 lm to 364 lm to accord with the emitted luminous flux of the green LEDs. In this case, the total luminous flux is 5776 lm, which is a 9% reduction of brightness.

In contrast, in the illumination device of the present exemplary embodiment, blue LED module 80 is made up of three LED chips 81a-81c that emit blue light and one LED chip 81d that emits green light, as shown in FIG. 6C. In other words, in this blue LED module, the number of blue LED chips is decreased by one compared to the previously described blue LED module that is made up of four blue LEDs, and one LED chip that emits green light is disposed in its place.

In addition, red LED module 60 is composed of four LED chips 61a-61d that emit red light as shown in FIG. 6A, and green LED module 70 is composed of four LED chips 71a-71d that emit green light as shown in FIG. 6B. Accordingly, the number of green LED chips is the four LED chips 71a-71d that are provided in green LED module 70 and one LED chip 81d that is provided in the blue LED module for a total of five. The number of blue LED chips becomes three, and the number of red LED chips is four. When these red, green, and blue LED chips are all driven at rating, a white chromaticity of (0.313, 0.329) of the standard illuminant D65 is obtained. Moreover, the total luminous flux is 7219 lm, enabling a 25% improvement over the previously described 5776 lm.

According to the present exemplary embodiment as described hereinabove, an illumination device is obtained that can exhibit the optical output performance of LEDs at their maximum, can raise the light utilization efficiency during color mixing, and can obtain white light having superior white balance.

Figure 10:
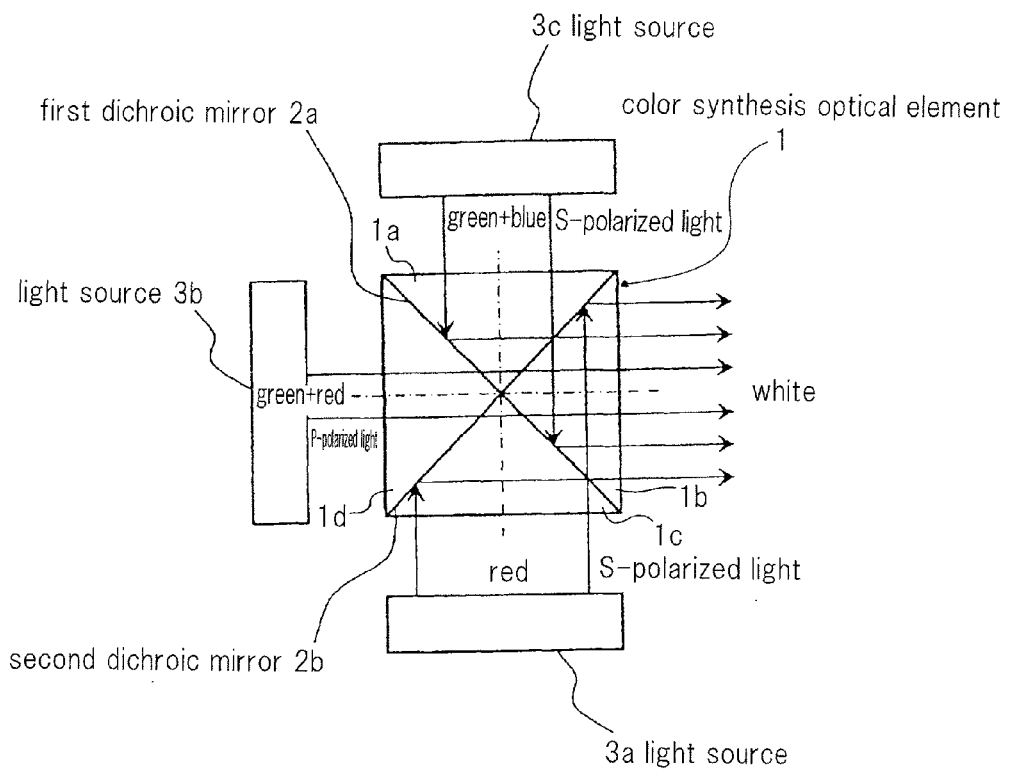
FIG. 10 is a schematic view showing another example of optical paths when colors are synthesized using the illumination device shown in FIG. 2.

The illumination device of the present exemplary embodiment is not limited to a configuration that synthesizes only green light from two different directions. For example, light source 3a may emit red S-polarized light, light source 3b may emit green and red P-polarized light, and light source 3c may emit green and blue S-polarized light as shown in FIG. 10. In this case, the green and blue S-polarized light is entered into the incident surface of right angle prism 1*a*, the red S-polarized light is entered into the incident surface of right angle prism 1*c*, and the green and red P-polarized light is entered into the incident surface of right angle prism 1*d*.

Figure 11A:
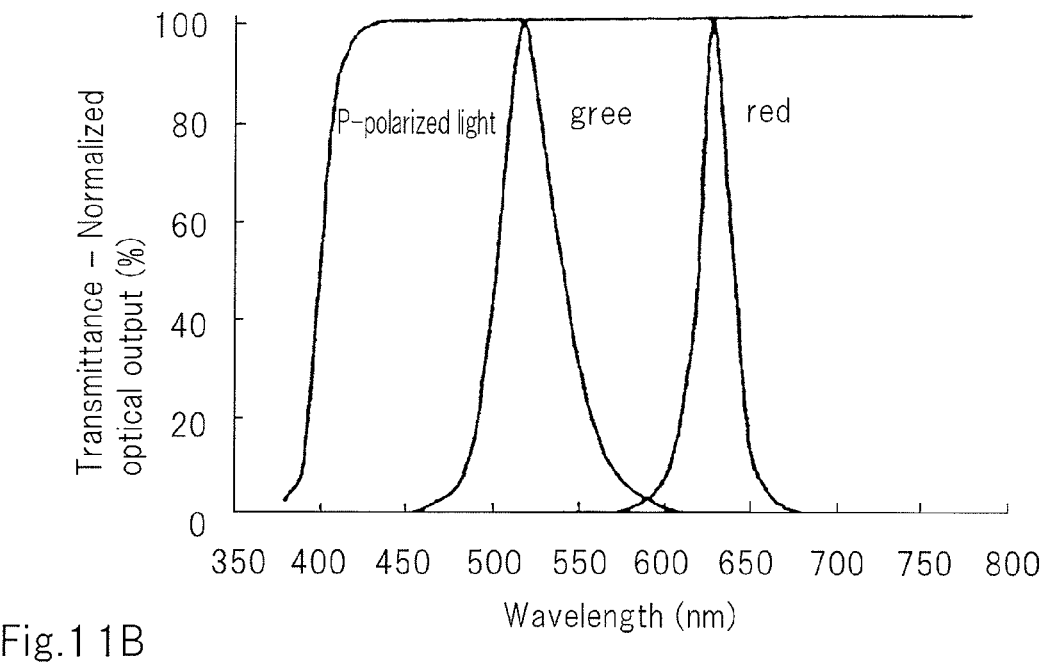
FIG. 11A is a graph showing the relation between the emission spectrums of each of green and red LED light sources and the spectral transmittance characteristic with respect to P-polarized light of the first dichroic mirror of the color synthesis optical element that forms part of the illumination device shown in FIG. 10.
Figure 11B:
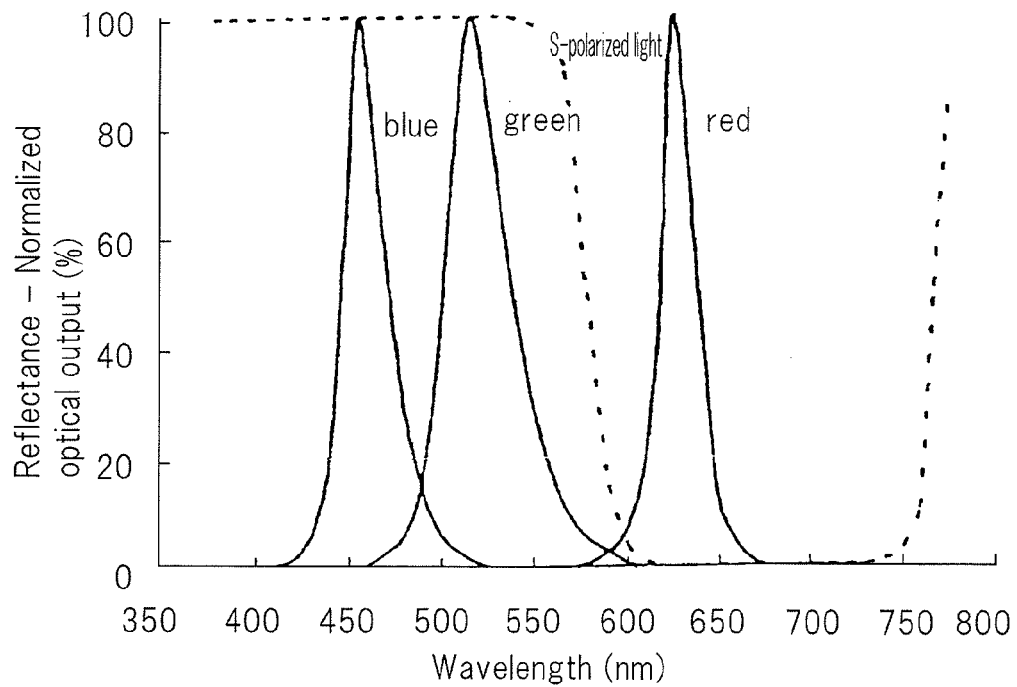
FIG. 11B is a graph showing the relation between the emission spectrums of each of red, green and blue LED light sources and the spectral reflectance characteristic with respect to S-polarized light of the first dichroic mirror of the color synthesis optical element that forms part of the illumination device shown in FIG. 10.

FIG. 11A is a graph that shows the relation between the emission spectrums of each of green and red LED light sources and the spectral transmittance characteristic with respect to P-polarized light of first dichroic mirror 2*a* in the color synthesis optical element of the illumination device shown in FIG. 10. FIG. 11B is a graph showing the relation between the emission spectrums of each of red, green, and blue LED light sources and the spectral reflectance characteristic with respect to S-polarized light of first dichroic mirror 2*a* in the color synthesis optical element of the illumination device shown in FIG. 10. The peak wavelength of the red LED light source is 630 nm, the peak wavelength of the green LED light source is 520 nm, and the peak wavelength of the blue LED light source is 460 nm.

Figure 12A:
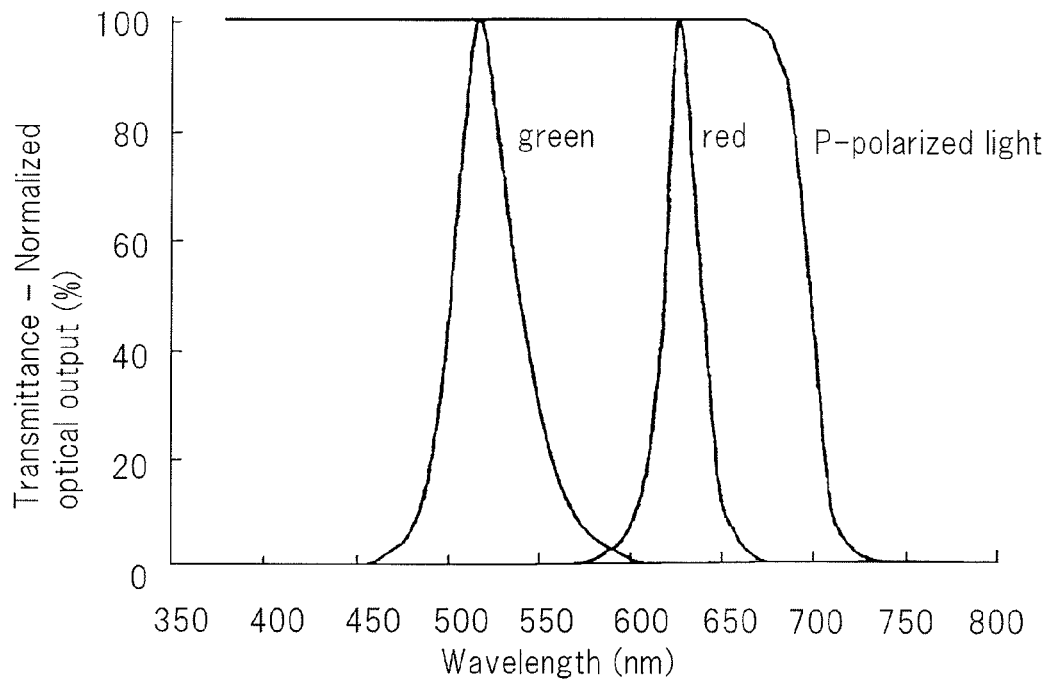
FIG. 12A is a graph showing the relation between the emission spectrums of each of green and red LED light sources and the spectral transmittance characteristic with respect to P-polarized light of the second dichroic mirror of the color synthesis optical element that forms part of the illumination device shown in FIG. 10.
Figure 12B:
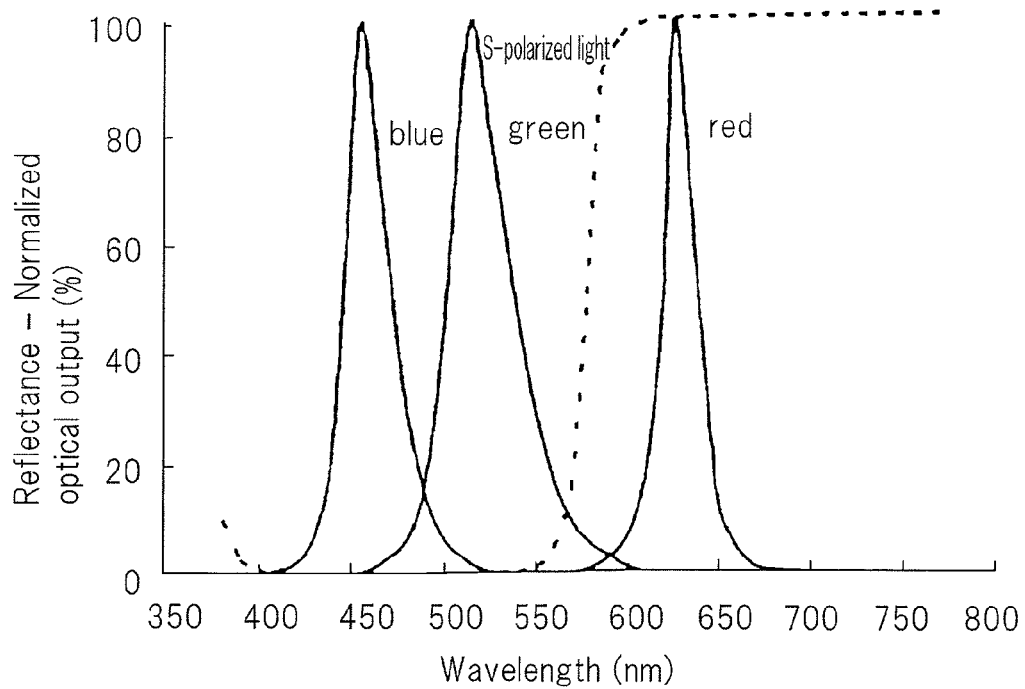
FIG. 12B is a graph showing the relation between the emission spectrums of each of red, green, and blue LED light sources and the spectral reflectance characteristic with respect to S-polarized light of the second dichroic mirror of the color synthesis optical element that forms part of the illumination device shown in FIG. 10.

FIG. 12A is a graph showing the relation between the emission spectrum of the green LED light source and the spectral transmittance characteristic with respect to P-polarized light of second dichroic mirror 2*b* in the color synthesis optical element of the illumination device shown in FIG. 10. FIG. 12B is a graph showing the relation between the emission spectrums of each of red, green, and blue LED light sources and the spectral reflectance characteristic with respect to S-polarized light of second dichroic mirror 2*b* in the color synthesis optical element in the illumination device shown in FIG. 10. The peak wavelength of the red LED light source is 630 nm, the peak wavelength of the green LED light source is 520 nm, and the peak wavelength of the blue LED light source is 460 nm.

As can be seen from FIGS. 11A and 12A, first dichroic mirror 2*a* and second dichroic mirror 2*b* do not act in any way upon green and red P-polarized light. As a result, the green and red P-polarized light that is entered from the incident surface of right angle prism 1*d* passes through each of dichroic mirrors 2*a* and 2*b* without alteration and is then exited from the exit surface of right angle prism 1*b*. The action of each of dichroic mirror 2*a* and 2*b* upon red, green, and blue S-polarized light is as shown in FIG. 7.

The cutoff wavelengths with respect to green and red P-polarized light of first dichroic mirror 2*a* and second dichroic mirror 2*b* are sufficiently separated. Accordingly, green and red P-polarized light are not reflected by these dichroic mirrors 2*a* and 2*b* despite shifting of the cutoff wavelengths due to incident angle dependency, whereby loss due to incident angle dependency does not occur.

In addition, as can be clearly seen from FIGS. 11B and 12B, the cutoff wavelengths with respect to green and red S-polarized light of first dichroic mirror 2*a* and second dichroic mirror 2*b* are sufficiently separated. Accordingly, red and green S-polarized light can be synthesized in these dichroic mirrors 2*a* and 2*b* with virtually no loss despite shifting of the cutoff wavelengths due to incident angle dependency.

According to the illumination device shown in FIG. 10, not only can green light be entered from two different directions and synthesized, but red light can also be entered from two different directions and synthesized.

In the illumination device shown in FIG. 7 or FIG. 10, light source 3*b* may be of a configuration that further emits blue P-polarized light. In this case, blue light can also be entered from two different directions and synthesized.

In the illumination device of the present exemplary embodiment, the colors among red, green, and blue light that are subjected to color mixing from two directions can be set as appropriate according to design.

Second Exemplary Embodiment

Figure 13:
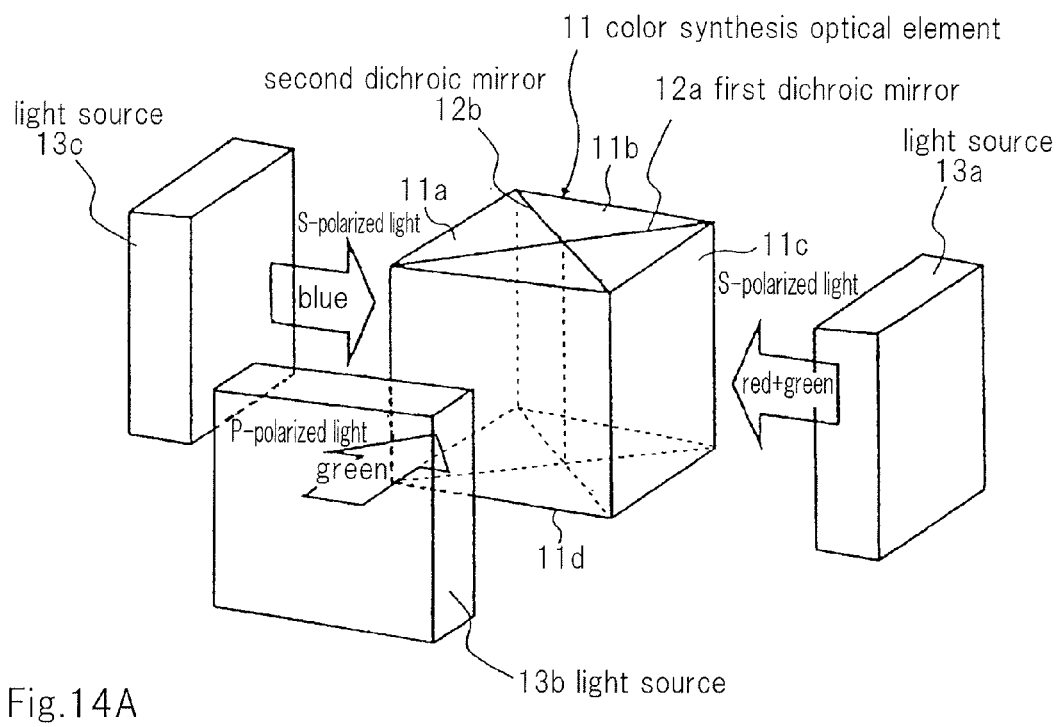
FIG. 13 is a perspective view showing the configuration of the illumination device that is the second exemplary embodiment of the present invention.

FIG. 13 is a perspective view showing the configuration of the illumination device that is the second exemplary embodiment of the present invention.

Referring to FIG. 13, the illumination device includes color synthesis optical element 11 and three light sources 13*a*-13*c*.

As with the first exemplary embodiment, color synthesis optical element 11 is a cross dichroic prism composed of four right angle prisms 11*a*-11*d* in which surfaces that form right angles are joined together. First dichroic mirror 12*a* and second dichroic mirror 12*b* are composed of dielectric multilayer films formed on the joined surfaces of right angle prisms 11*a*-11*d* so as to intersect.

Of the four side surfaces of color synthesis optical element 11, light is entered from three surfaces (the surfaces of right angle prisms 11*a*, 11*c*, and 11*d*) and colors are synthesized. The one remaining side surface is the exit surface of the synthesized light.

Light source 13*a* emits red and green light (S-polarized light). Light source 13*b* emits green light (P-polarized light). Light source 13*c* emits blue light (S-polarized light). Here, red, green, and blue correspond to the three primary colors of light.

The S-polarized light (red+green) from light source 13*a* is entered into color synthesis optical element 11 from the incident surface of right angle prism 11*c*. The P-polarized light (green) from light source 13*b* is entered into color synthesis optical element 11 from the incident surface of right angle prism 11*d*. The S-polarized light (blue) from light source 13*c* is entered into color synthesis optical element 11 from the incident surface of right angle prism 11*a*.

In color synthesis optical element 11, the S-polarized light (red+green), P-polarized light (green), and S-polarized light (blue) from each of the incident surfaces are synthesized by first dichroic mirror 12*a* and second dichroic mirror 12*b*.

In the illumination device of the first exemplary embodiment, green and blue S-polarized light are entered into color synthesis optical element 1 from the incident surface of right angle prism 1*a*. In contrast, in the illumination device of the present exemplary embodiment, green S-polarized light is entered into color synthesis optical element 11 together with red S-polarized light not from the incident surface of right angle prism 11*a* but from the incident surface of right angle prism 11*c* that is opposite this incident surface. This is the point of difference between illumination device of the present exemplary embodiment and the color synthesis optical element 1 of the first exemplary embodiment.

Figure 14A:
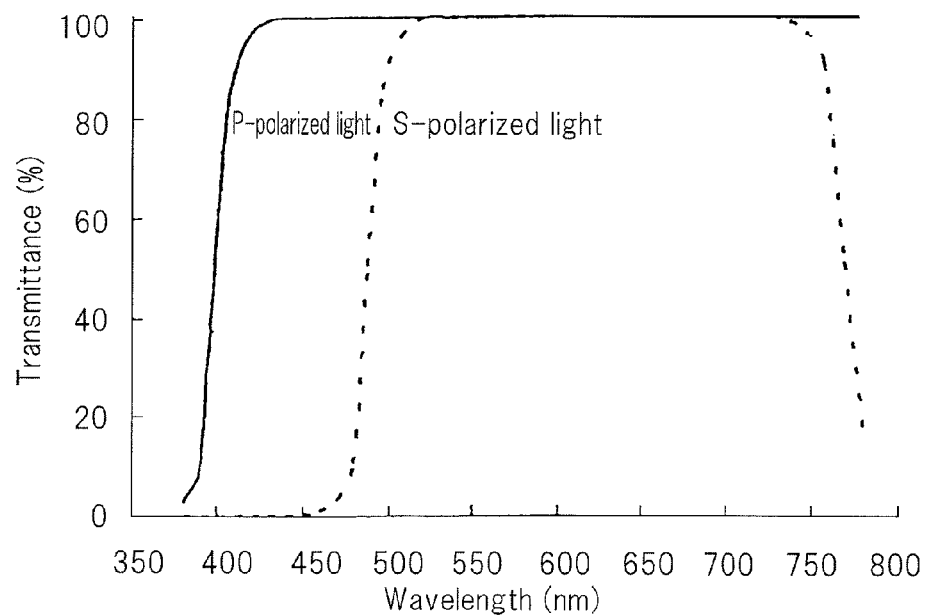
FIG. 14A is a graph showing the spectral transmittance characteristic with respect to P-polarized light and S-polarized light of the first dichroic mirror of the color synthesis optical element that forms part of the illumination device shown in FIG. 13.
Figure 14B:
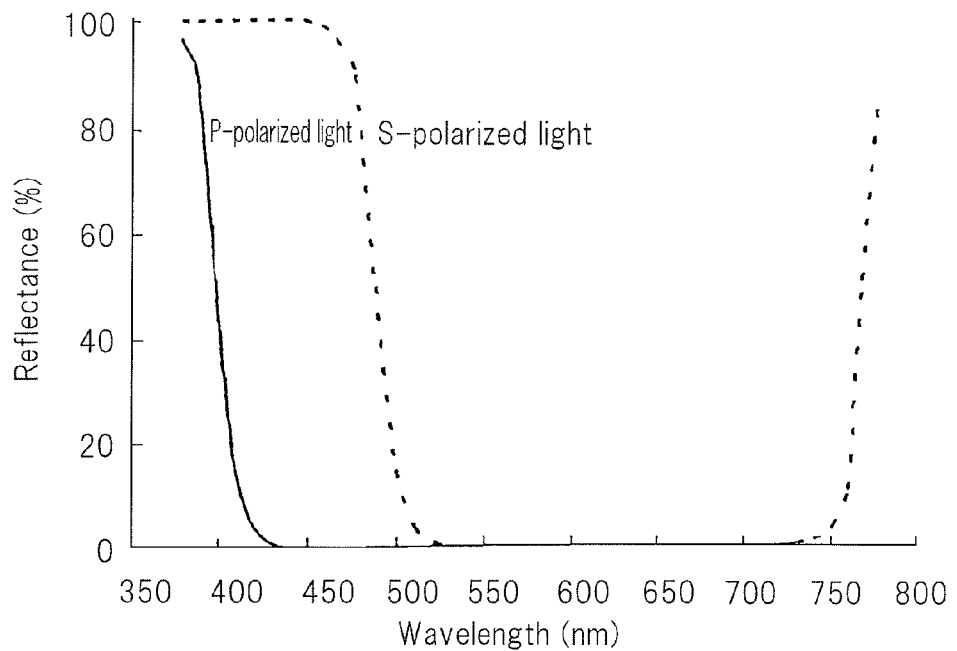
FIG. 14B is a graph showing the spectral reflectance characteristic with respect to P-polarized light and S-polarized light of the first dichroic mirror of the color synthesis optical element that forms part of the illumination device shown in FIG. 13.

FIG. 14A is a graph showing the spectral transmittance characteristic with respect to P-polarized light and S-polarized light of first dichroic mirror 12*a*. FIG. 14B is a graph showing the spectral reflectance characteristic with respect to P-polarized light and S-polarized light of first dichroic mirror 12*a*.

The cutoff wavelength of first dichroic mirror 12*a* with respect to light entered as P-polarized light is 400 nm. In this case, first dichroic mirror 12*a* largely transmits and does not reflect P-polarized light having a wavelength of 400 nm or more. On the other hand, the cutoff wavelength of first dichroic mirror 12*a* with respect to light that is entered as S-polarized light is 490 nm. In this case, first dichroic mirror 12*a* largely transmits and does not reflect S-polarized light having a wavelength of 490 nm or more. In addition, first dichroic mirror 12*a* largely reflects and does not transmit light of S-polarized light having a wavelength shorter than 490 nm.

If the characteristics of first dichroic mirror 12a are expressed by its action upon colored light, with respect to blue light, first dichroic mirror 12a transmits P-polarized light and reflects S-polarized light. In other words, first dichroic mirror 12a also acts as a polarization beam splitter upon blue light. On the other hand, first dichroic mirror 12a does not act in any way upon green and red light and transmits both P-polarized light and S-polarized light.

Figure 15A:
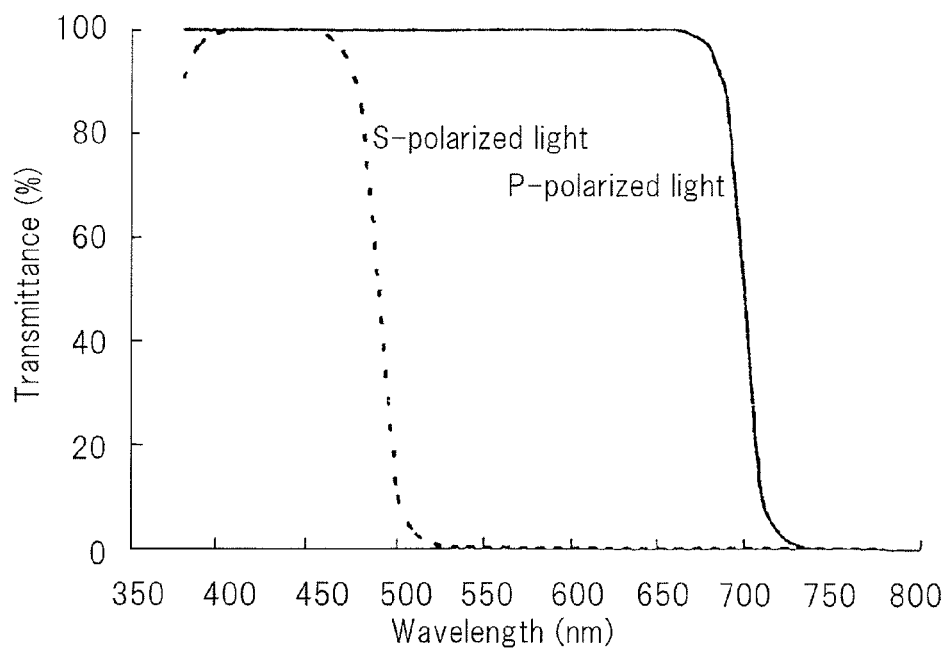
FIG. 15A is a graph showing the spectral transmittance characteristic with respect to P-polarized light and S-polarized light of the second dichroic mirror of the color synthesis optical element that forms part of the illumination device shown in FIG. 13.
Figure 15B:
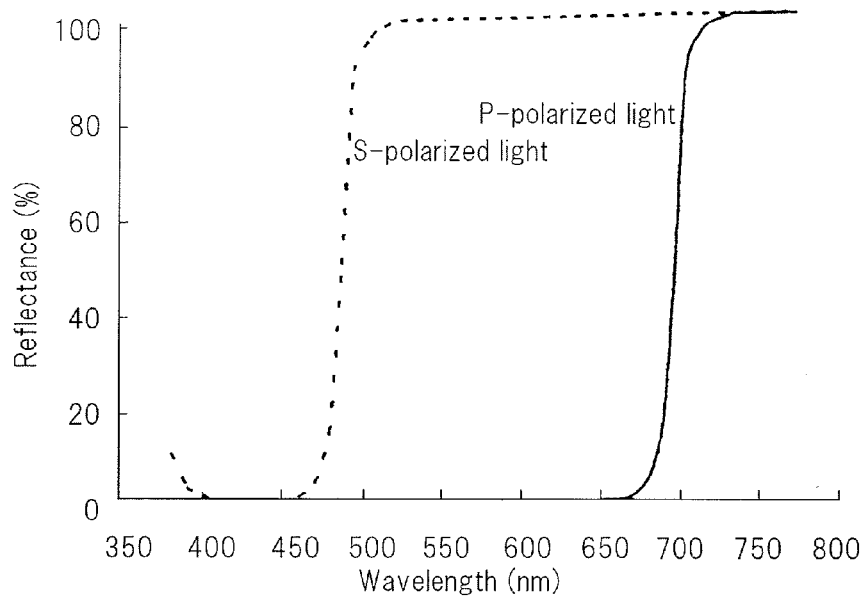
FIG. 15B is a graph showing the spectral reflectance characteristic with respect to P-polarized light and S-polarized light of the second dichroic mirror of the color synthesis optical element that forms part of the illumination device shown in FIG. 13.

FIG. 15A is a graph showing the spectral transmittance characteristic with respect to P-polarized light and S-polarized light of second dichroic mirror 12b. FIG. 15B is a graph showing the spectral reflectance characteristic with respect to P-polarized light and S-polarized light of second dichroic mirror 12b.

The cutoff wavelength of second dichroic mirror 12b with respect to light that is entered as P-polarized light is 700 nm. In this case, second dichroic mirror 12b largely transmits and does not reflect P-polarized light having a wavelength of 700 nm or less. On the other hand, the cutoff wavelength of second dichroic mirror 12b with respect to light that is entered as S-polarized light is 490 nm. In this case, second dichroic mirror 12b largely reflects and does not transmit S-polarized light having a wavelength of 490 nm or more. In addition, second dichroic mirror 12b largely transmits and does not reflect S-polarized light having a wavelength shorter than 490 nm.

If the characteristics of second dichroic mirror 12b are expressed by its action upon colored light, second dichroic mirror 12b does not act in any way upon blue light and transmits both P-polarized light and S-polarized light. In addition, with respect to green and red light, second dichroic mirror 12b transmits P-polarized light and reflects S-polarized light. In other words, second dichroic mirror 12b also acts as a polarization beam splitter with respect to green and red light.

The illumination device of the present exemplary embodiment differs from the dichroic prism that was disclosed in Patent Document 8 in that the cutoff wavelength with respect to S-polarized light of first dichroic mirror 12a and second dichroic mirror 12b is set to the blue-green (cyan) band of 490 nm. According to this point of difference, the light of a color that is insufficient can be augmented within the constraints of etendue in order to obtain good white balance and the optical output characteristic of LED light sources can be exhibited to the maximum. This feature will be described in detail hereinbelow.

Figure 16:
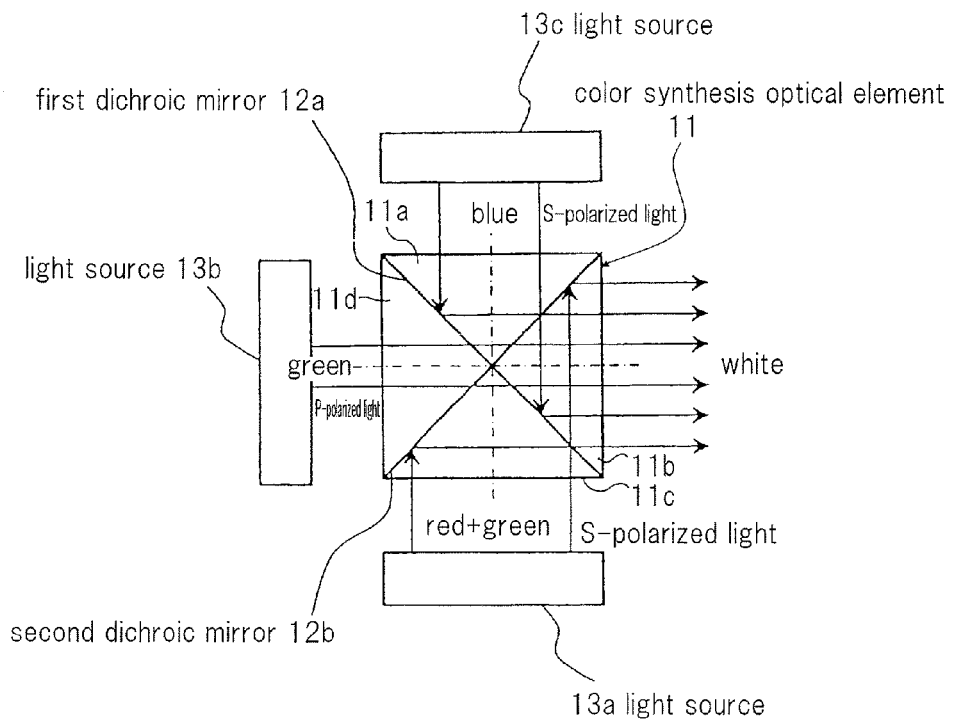
FIG. 16 is a schematic view showing an example of the optical paths when colored light is synthesized using the illumination device shown in FIG. 13.

FIG. 16 is a plan view for describing the optical paths when colored light is synthesized using the illumination device shown in FIG. 13.

Of the four side surfaces of color synthesis optical element 11, three surfaces are incident surfaces and colored light that is entered from these incident surfaces is synthesized by first dichroic mirror 12a and second dichroic mirror 12b. The one remaining surface is the exit surface, and colored light that has been synthesized is exited from this exit surface.

In FIG. 16, lines that are represented as solid lines with arrows each show representative directions of the progression of incident luminous flux, but this is not intended to indicate that only the lines represented as solid lines with arrows are the incident rays. The incident light is luminous flux having a cross-sectional area no greater than the incident surfaces of color synthesis optical element 11 and includes positions other than the lines represented by solid lines with arrows as well as rays having an angular component.

Light source 13c emits blue S-polarized light. The blue S-polarized light from light source 13c is entered into color synthesis optical element 11 from the incident surface of right angle prism 11a (in FIG. 16, the surface located on the upper side of the figure). Second dichroic mirror 12b does not act in any way upon blue S-polarized light and the blue S-polarized light therefore passes through second dichroic mirror 12b without alteration. On the other hand, first dichroic mirror 12a reflects all blue S-polarized light. As a result, luminous flux of blue S-polarized light is bent 90 degrees at first dichroic mirror 12a and is then exited from the exit surface of right angle prism 11b.

Light source 13b emits green P-polarized light. The green P-polarized light from light source 13b is entered into color synthesis optical element 11 from the incident surface of right angle prism 11d (in FIG. 16, the surface located on the left side of the figure). Neither of first dichroic mirror 12a and second dichroic mirror 12b acts in any way upon green P-polarized light, and green P-polarized light therefore passes through each of dichroic mirrors 12a and 12b without alteration and then is exited from the exit surface of right angle prism 11b.

Light source 13a emits red and green S-polarized light. The red and green S-polarized light from light source 13a is entered into color synthesis optical element 11 from the incident surface of right angle prism 11c (in FIG. 16, the surface located on the lower side of the figure). First dichroic mirror 12a does not act in any way upon green and red S-polarized light, and the green and red S-polarized light therefore passes through first dichroic mirror 12a without alteration. On the other hand, second dichroic mirror 12b reflects all green and red S-polarized light, whereby the luminous flux of green and red S-polarized light is bent 90 degrees at second dichroic mirror 12b and is then exited from the exit surface of right angle prism 11b as shown in FIG. 16.

Thus, according to the illumination device of the present exemplary embodiment, blue S-polarized light, green P-polarized light and S-polarized light, and red S-polarized light can be synthesized to obtain white light.

Figure 17A:
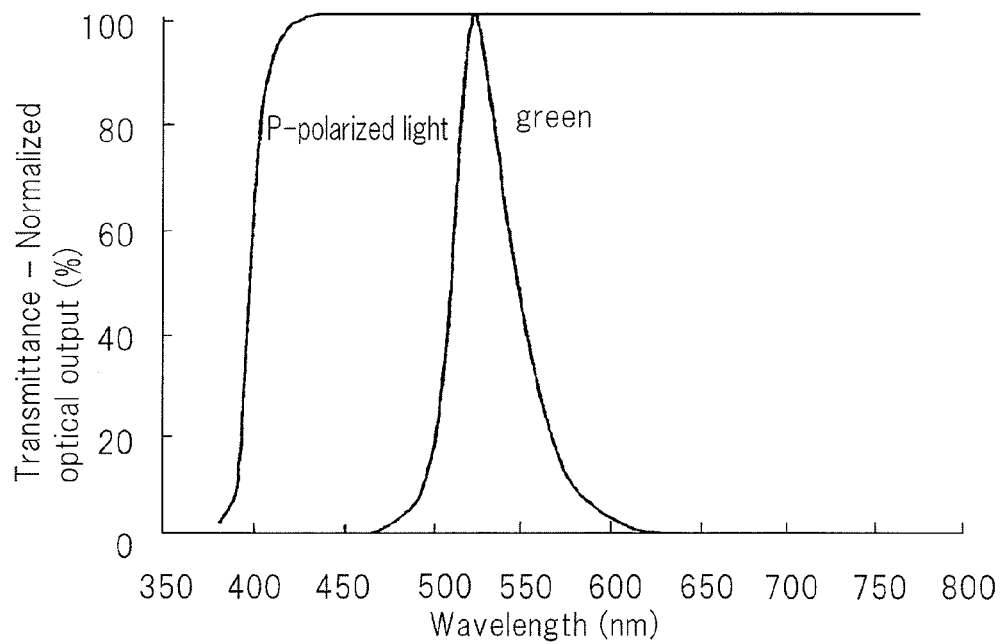
FIG. 17A is a graph showing the relation between the emission spectrum of a green LED light source and the spectral transmittance characteristic with respect to P-polarized light of the first dichroic mirror of the color synthesis optical element that forms part of the illumination device shown in FIG. 13.
Figure 17B:
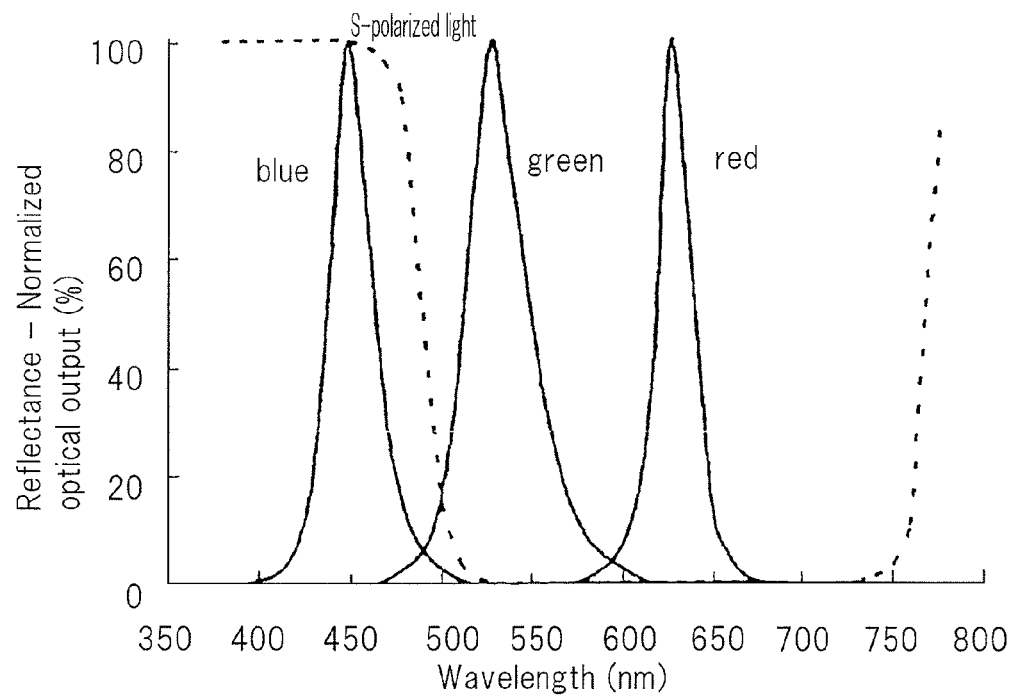
FIG. 17B is a graph showing the relation between the emission spectrums of each of the red, green, and blue LED light sources and the spectral reflectance characteristic with respect to S-polarized light of the first dichroic mirror of the color synthesis optical element that foams part of the illumination device shown in FIG. 13.

FIG. 17A is a graph showing the relation between the emission spectrum of a green LED light source and the spectral transmittance characteristic with respect to P-polarized light of first dichroic mirror 12a. FIG. 17B is a graph showing the relation between the emission spectrums of each of red, green, and blue LED light sources and the spectral reflectance characteristic with respect to S-polarized light of first dichroic mirror 12a. The peak wavelength of the red LED light source is 630 nm, the peak wavelength of the green LED light source is 530 nm, and the peak wavelength of the blue LED light source is 450 nm.

Figure 18A:
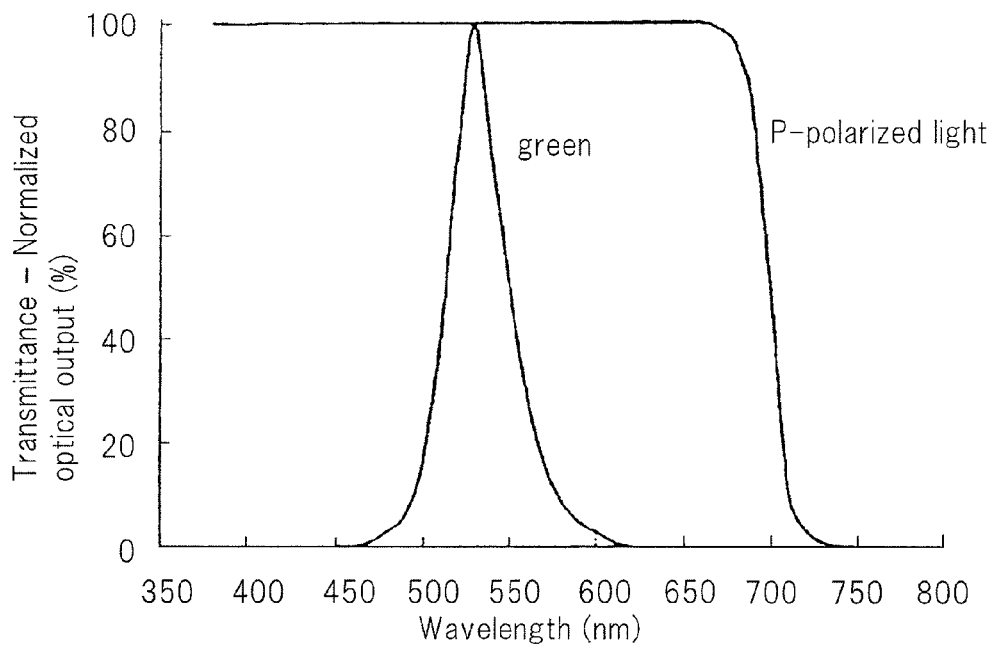
FIG. 18A is a graph showing the relation between the emission spectrum of a green LED light source and the spectral transmittance characteristic with respect to P-polarized light of the second dichroic mirror of the color synthesis optical element that forms part of the illumination device shown in FIG. 13.
Figure 18B:
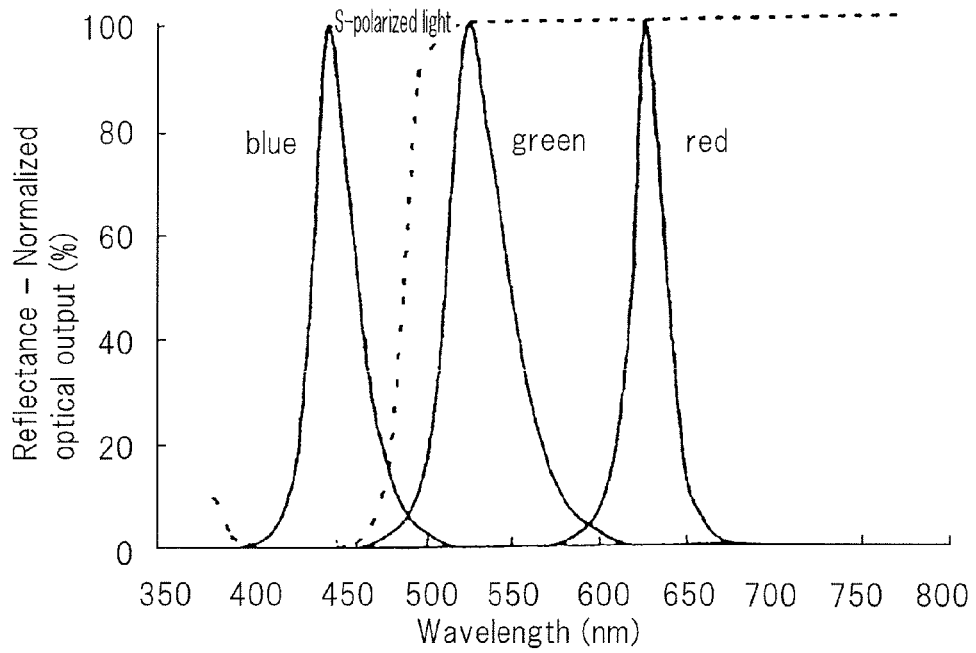
FIG. 18B is a graph showing the relation between the emission spectrums of each of red, green, and blue LED light sources and the spectral reflectance characteristic with respect to S-polarized light of the second dichroic mirror of the color synthesis optical element that forms part of the illumination device shown in FIG. 13.

FIG. 18A is a graph showing the relation between the emission spectrum of a green LED light source and the spectral transmittance characteristic with respect to P-polarized light of second dichroic mirror 12b. FIG. 18B is a graph showing the relation between the emission spectrums of each of red, green, and blue LED light sources and the spectral reflectance characteristic with respect to S-polarized light of second dichroic mirror 12b. The peak wavelength of the red LED light source is 630 nm, the peak wavelength of the green LED light source is 530 nm, and the peak wavelength of the blue LED light source is 450 nm.

As is clear from FIGS. 17A and 18A, the cutoff wavelengths of first dichroic mirror 12a and second dichroic mirror 12b with respect to green P-polarized light are sufficiently separated. Accordingly, green P-polarized light is not reflected by these dichroic mirrors 12a and 12b despite shifting of the cutoff wavelengths due to incident angle dependency. As a result, loss does not occur due to incident angle dependency.

As is clear from FIGS. 17B and 18B, the cutoff wavelengths of first dichroic mirror 12a and second dichroic mirror 12b with respect to blue S-polarized light and green S-polarized light are sufficiently separated. Accordingly, blue and green S-polarized light can be synthesized by these dichroic mirrors 12a and 12b with virtually no loss despite shifting of the cutoff wavelengths due to incident angle dependency.

In this way, the cutoff wavelengths of first dichroic mirror 12a and second dichroic mirror 12b are set to the blue-green (cyan) band that is not used in color synthesis, whereby color synthesis can be realized efficiently even for light that is entered at angles that differ from parallel rays.

As with the first exemplary embodiment, the present exemplary embodiment enables the synthesis of green light from two different directions. In addition, a configuration is adopted that reduces the amount of red light for which the optical output is relatively great and adds green light. Accordingly, the three primary colors can be synthesized at preferable color mixing ratios and white light can be obtained having superior white balance. In addition, the optical output of the LEDs of three colors can be displayed at their maximum without limitation.

The illumination device of the present exemplary embodiment is not limited to the configuration that synthesizes only green light from two directions. For example, the illumination device shown in FIG. 13 may also be configured such that light source 13b further emits blue or red P-polarized light or red and blue P-polarized light.

In the illumination device of the present exemplary embodiment, from among red, green, and blue, the colors that undergo color mixing from two directions can be set as appropriate according to design.

It is known that, due to problems in the fabrication of LEDs, the peak wavelength of an LED varies on the order of ±10-20 nm. In the first exemplary embodiment, the cutoff wavelengths of the dichroic mirrors are set to the yellow wavelength band (at least 560 nm but no greater than 600 nm), whereby the use of a color synthesis optical element in which the peak wavelength of green LEDs diverges in the direction of shorter wavelengths enables an even greater decrease of loss during color synthesis. In the second exemplary embodiment, the cutoff wavelengths of the dichroic mirrors are set to the blue-green (cyan) wavelength band (at least 480 nm but no greater than 500 nm), whereby the use of a color synthesis optical element in which the peak wavelength of green LEDs diverges in the direction of longer wavelengths and the peak wavelength of blue LEDs diverges in the direction of shorter wavelengths enables an even greater decrease of loss during color synthesis. A color synthesis optical element may thus be selected in accordance with the divergence of the peak wavelengths of the LEDs.

In addition, the optical output characteristic of an LED varies greatly due to problems that occur during the manufacturing process. When the optical output of blue LEDs is relatively great, blue is decreased and green added as in the first exemplary embodiment. Conversely, when the optical output of red LEDs is relatively great, red is decreased and green added as in the second exemplary embodiment. Still further, the combination or arrangement of the light sources of each color can be selected by adding red or blue P-polarized light to the optical path of green P-polarized light.

In this way, the illumination device of each exemplary embodiment is useful because it allows the utilization of LEDs having great variations in the peak wavelength or optical output.

Third Exemplary Embodiment

Figure 19:
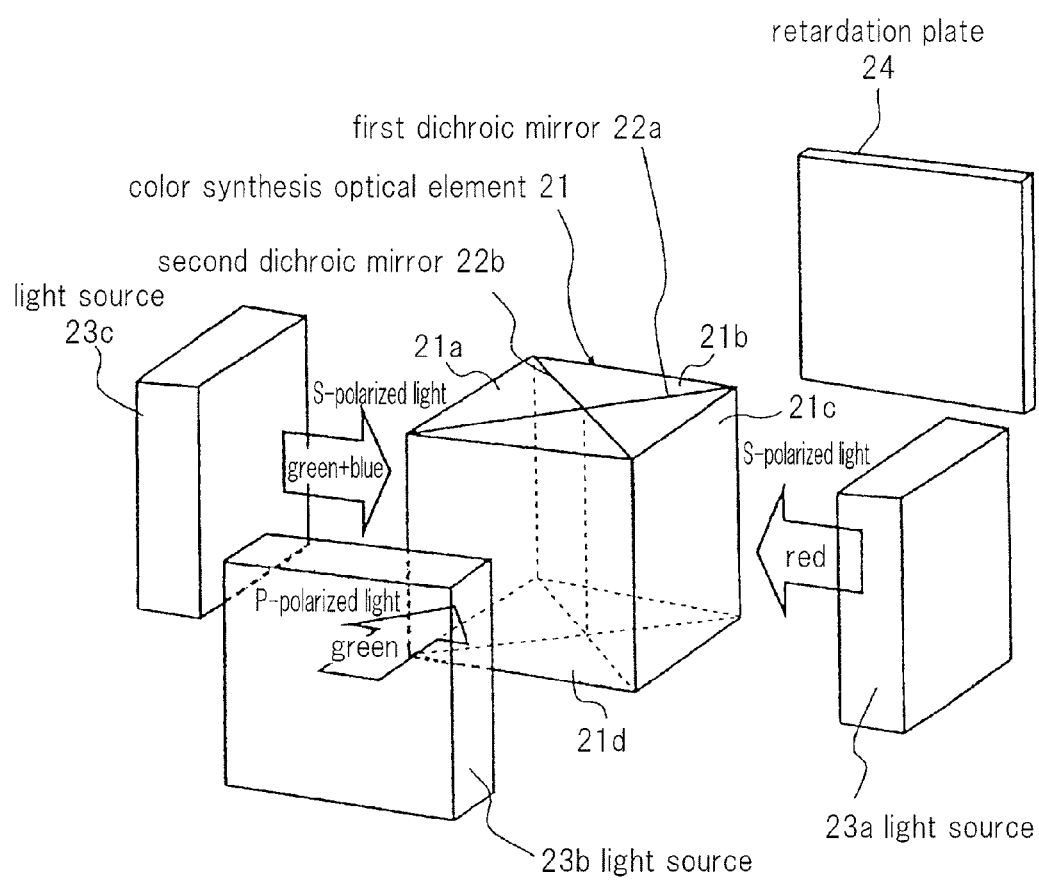
FIG. 19 is a perspective view showing the configuration of the illumination device that is the third exemplary embodiment of the present invention.

FIG. 19 is a perspective view showing the configuration of the illumination device that is the third exemplary embodiment of the present invention.

Referring to FIG. 19, the illumination device includes color synthesis optical element 21, three light sources 23a-23c, and retardation plate 24.

As in the first exemplary embodiment, color synthesis optical element 21 is a cross dichroic prism composed of four right angle prisms 21a-21d in which surfaces forming right angles are joined together. First dichroic mirror 22a and second dichroic mirror 22b composed of dielectric multilayer films are formed on the joined surfaces of right angle prisms 21a-21d so as to intersect.

Of the four side surfaces of color synthesis optical element 21, light is entered from three surfaces (each of the surfaces of right angle prisms 21a, 21c, and 21d) and colors are synthesized. The one remaining side surface is the exit surface of the synthesized light.

Light source 23a emits red light (S-polarized light). Light source 23b emits green light (P-polarized light). Light source 23c emits green and blue light (S-polarized light). Here, red, green, and blue correspond to the three primary colors of light.

The S-polarized light (red) from light source 23a is entered into color synthesis optical element 21 from the incident surface of right angle prism 21c. The P-polarized light (green) from light source 23b is entered into color synthesis optical element 21 from the incident surface of right angle prism 21d. The S-polarized light (green+blue) from light source 23c is entered into color synthesis optical element 21 from the incident surface of right angle prism 21a.

In color synthesis optical element 21, the S-polarized light (red), P-polarized light (green), and S-polarized light (green+blue) from each of the incident surfaces are synthesized by first dichroic mirror 22a and second dichroic mirror 22b.

Retardation plate 24 is arranged at a position that corresponds to and faces the exit surface (surface of right angle prism 21b) of color synthesis optical element 21. The illumination device of the present exemplary embodiment differs from illumination device of the first exemplary embodiment in that this retardation plate 24 is provided.

In the illumination device of the first exemplary embodiment, blue S-polarized light, green P-polarized light and S-polarized light, and red S-polarized light are synthesized to obtain white light. In other words, luminous flux is entered in which the direction of polarization differs according to light.

When the object that is illuminated has polarization dependency, the amount of light that is reflected differs according to color. In order to circumvent this problem in the illumination device of the present exemplary embodiment, retardation plate 24 is arranged in the direction of progression of the color-synthesized light (white light) that is exited from the exit surface of color synthesis optical element 21.

Retardation plate 24 is a quarter-wave plate, and for example, is of a construction in which polyvinyl alcohol film is stretched uniaxially and sandwiched between protective films. When the optical axis of a quarter-wave plate is set to the 45-degree direction, blue S-polarized light, green S-polarized light, and red S-polarized light become right-handed circularly polarized light, and green P-polarized light becomes left-handed circularly polarized light, whereby the directivity of the polarization of the illumination light is eliminated and the differences caused by color in the amount of light reflected by an object can be resolved.

Retardation plate 24 is not limited to the above-described construction. A component composed of a multilayer film that acts as a quarter-wave plate over the broad wavelength band of white light is preferable as retardation plate 24.

Retardation plate 24 may also be a retardation plate that randomly changes the phase difference within a minute range to cancel polarization. The illumination light from each minute range spreads at a particular angle, whereby polarization states that differ randomly are superposed to obtain illumination light that lacks a polarization characteristic.

Retardation plate 24 is not limited to a film. A component that can electronically control phase difference such as a liquid crystal element may also be used as retardation plate 24. A component that changes voltage that is applied within a minute range or that changes the cell thickness of the liquid crystal to give random phase difference, or a component that changes phase difference at high speed to equalize the polarization characteristic over time may also be used as retardation plate 24.

When the illuminated object has polarization dependency with respect to P-polarized light and S-polarized light, the optical axis of a half-wave plate may be set to the 22.5-degree direction and the polarized light that is transmitted may be rotated to the ±45-degree direction. In this case, reflected light is the average value of reflected light with respect to P-polarized light and S-polarized light, and differences in reflected light arising from color can thus be canceled.

Fourth Exemplary Embodiment

Figure 20:
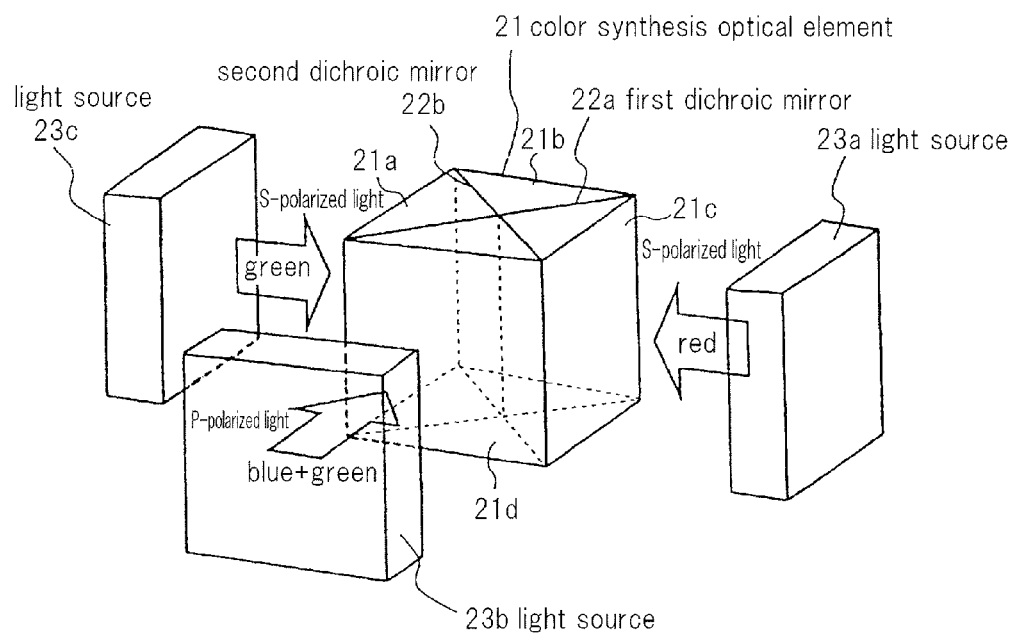
FIG. 20 is a perspective view showing the configuration of the illumination device that is the fourth exemplary embodiment of the present invention.

FIG. 20 is a perspective view showing the configuration of the illumination device that is the fourth exemplary embodiment of the present invention.

Referring to FIG. 20, the illumination device includes color synthesis optical element 21 and three light sources 23a-23c.

As with the first exemplary embodiment, color synthesis optical element 21 is a cross dichroic prism composed of four right angle prisms 21a-21d in which surfaces that form right angles are joined together. First dichroic mirror 22a and second dichroic mirror 22b composed of dielectric multilayer films are formed on the joined surfaces of the right angle prisms 21a-21d so as to intersect.

Of the four side surfaces of color synthesis optical element 21, light is entered from three surfaces (the surfaces of right angle prisms 21a, 21c, and 21d) and colors are synthesized. The one remaining side surface is the exit surface of light that was synthesized.

In the illumination device of the first exemplary embodiment shown in FIG. 2, light source 3a emits red light (S-polarized light), light source 3b emits green light (P-polarized light), and light source 3c emits green and blue light (S-polarized light).

In the illumination device of the present exemplary embodiment, in contrast, light source 23a emits red light (S-polarized light), light source 23b emits blue and green light (P-polarized light), and light source 23c emits green light (S-polarized light).

The S-polarized light (red) from light source 23a is entered into color synthesis optical element 21 from the incident surface of right angle prism 21c. The P-polarized light (blue and green) from light source 23b is entered into color synthesis optical element 21 from the incident surface of right angle prism 21d. The S-polarized light (green) from light source 23c is entered into color synthesis optical element 21 from the incident surface of right angle prism 21a. In other words, the present exemplary embodiment differs from the first exemplary embodiment in that green S-polarized light is entered into color synthesis optical element 21 from light source 23c and blue and green P-polarized light is entered into color synthesis optical element 21 from light source 23b.

In color synthesis optical element 21, the S-polarized light (red), the P-polarized light (blue+green), and the S-polarized light (green) from each incident surface are synthesized by first dichroic mirror 22a and second dichroic mirror 22b.

Figure 21A:
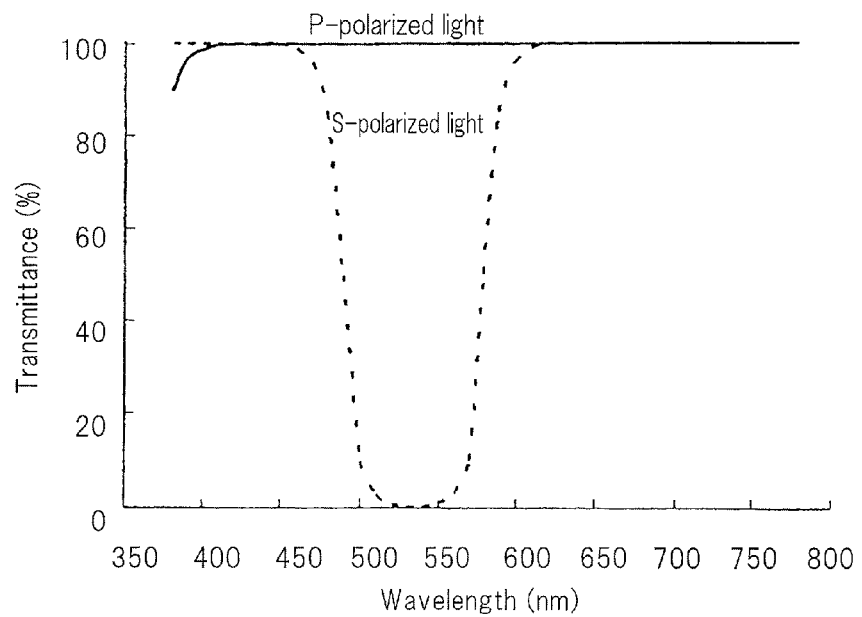
FIG. 21A is a graph showing the spectral transmittance characteristic with respect to P-polarized light and S-polarized light of the first dichroic mirror of the color synthesis optical element that forms part of the illumination device shown in FIG. 20.
Figure 21B:
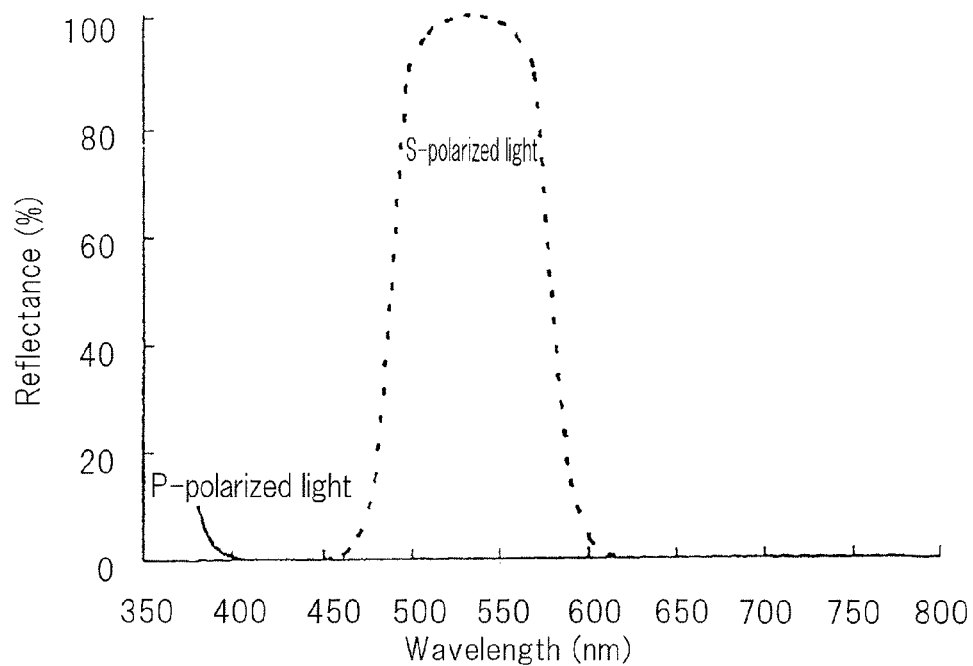
FIG. 21B is a graph showing the spectral reflectance characteristic with respect to P-polarized light and S-polarized light of the first dichroic mirror of the color synthesis optical element that forms part of the illumination device shown in FIG. 20.

FIG. 21A is a graph showing the spectral transmittance characteristic with respect to P-polarized light and S-polarized light of first dichroic mirror 22a. FIG. 21B is a graph showing the spectral reflectance characteristic with respect to P-polarized light and S-polarized light of first dichroic mirror 22a.

First dichroic mirror 22a largely transmits and does not reflect light of the visible range of the incident P-polarized light. The cutoff wavelengths of first dichroic mirror 22a with respect to incident S-polarized light are 490 nm and 580 nm. In this case, first dichroic mirror 22a largely transmits and does not reflect S-polarized light having a wavelength no greater than 490 nm and S-polarized light having a wavelength of at least 580 nm. In addition, first dichroic mirror 22a largely reflects and does not transmit S-polarized light of a wavelength range that is greater than 490 nm but less than 580 nm.

If the characteristics of first dichroic mirror 22a are expressed as its action upon colored light, with respect to green light, first dichroic mirror 22a transmits P-polarized light and reflects S-polarized light. In other words, first dichroic mirror 22a also acts as a polarization beam splitter with respect to green light. On the other hand, with respect to blue and red light, first dichroic mirror 22a does not act in any way upon either P-polarized light or S-polarized light and transmits both without alteration.

Figure 22A:
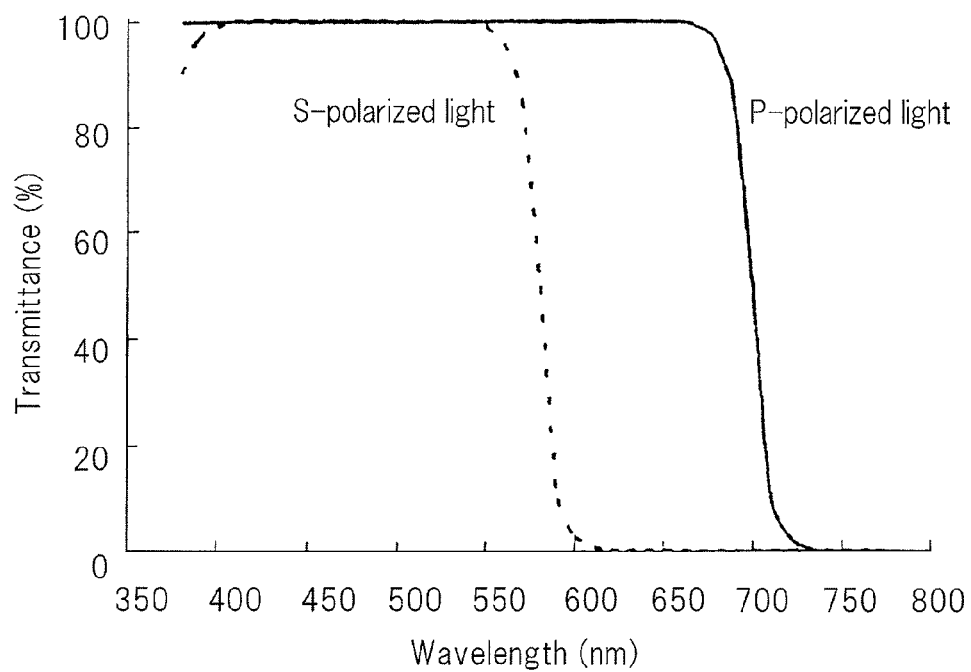
FIG. 22A is a graph showing the spectral transmittance characteristic with respect to P-polarized light and S-polarized light of the second dichroic mirror of the color synthesis optical element that forms part of the illumination device shown in FIG. 20.
Figure 22B:
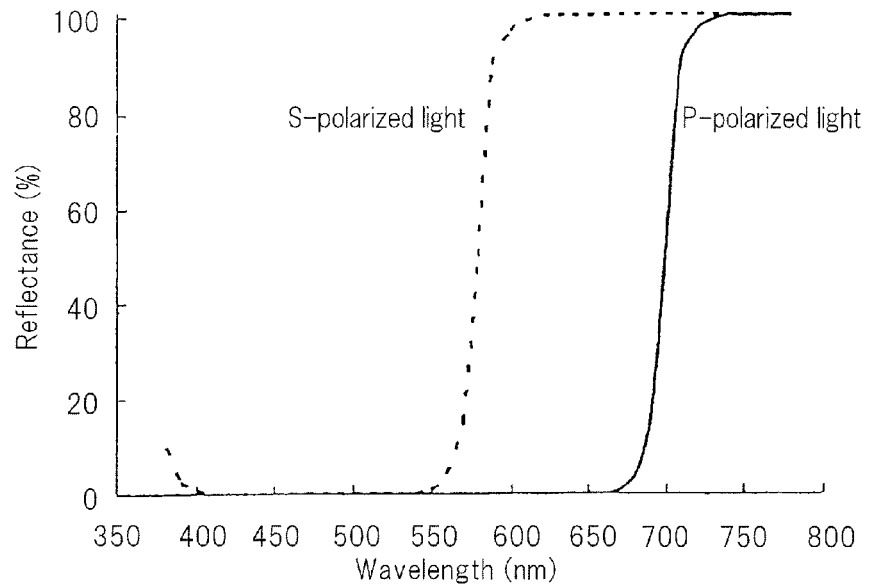
FIG. 22B is a graph showing the spectral reflectance characteristic with respect to P-polarized light and S-polarized light of the second dichroic mirror of the color synthesis optical element that forms part of the illumination device shown in FIG. 20.

FIG. 22A is a graph showing the spectral transmittance characteristic with respect to P-polarized light and S-polarized light of second dichroic mirror 22b. FIG. 22B is a graph showing the spectral reflectance characteristic with respect to P-polarized light and S-polarized light of second dichroic mirror 22b.

The cutoff wavelength of second dichroic mirror 22b with respect to light entered as P-polarized light is 700 nm. In this case, second dichroic mirror 22b largely transmits and does not reflect P-polarized light having a wavelength of 700 nm or less. On the other hand, the cutoff wavelength of second dichroic mirror 22b with respect to light entered as S-polarized light is 580 nm. In this case, second dichroic mirror 22b largely reflects and does not transmit S-polarized light having a wavelength of at least 580 nm. Conversely, second dichroic mirror 22b largely transmits and does not reflect S-polarized light having a wavelength shorter than 580 nm.

If the characteristics of second dichroic mirror 22b are expressed as its action upon colored light, with respect to blue and green light, second dichroic mirror 22b doe not act in any way upon P-polarized light and S-polarized light and transmits both without alteration. In addition, with respect to red light, second dichroic mirror 22b transmits P-polarized light and reflects S-polarized light. In other words, second dichroic mirror 22b also acts as a polarization beam splitter with respect to red light.

The setting of the cutoff wavelengths with respect to S-polarized light of first dichroic mirror 22a and second dichroic mirror 22b to the blue-green (cyan) band of 490 nm and the yellow band of 580 nm differs greatly from the spectral characteristics of the dichroic prism that was disclosed in Patent Document 8 (see FIGS. 1A and 1B). This point of difference enables the compensation of light of a color that is insufficient within the constraints of etendue to obtain good white balance and allows the optical output characteristic of LED light sources to be exhibited at a maximum. This point will be described in greater detail hereinbelow.

Figure 23:
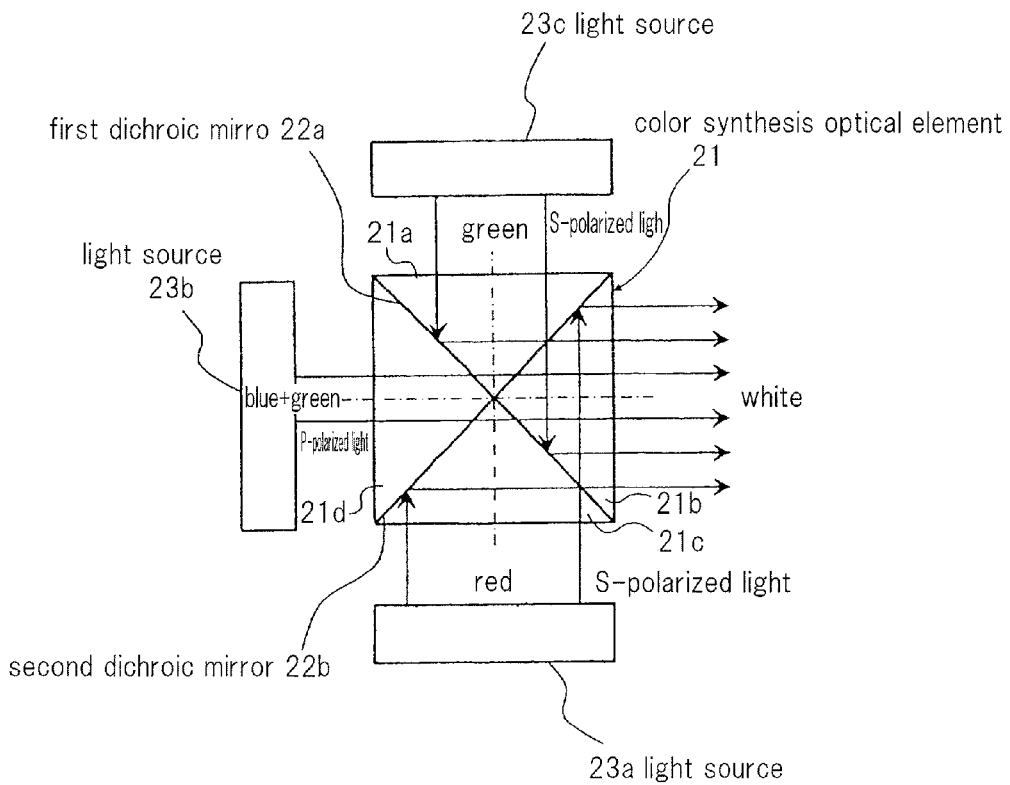
FIG. 23 is a schematic view showing an example of the optical paths when colors are synthesized using the illumination device shown in FIG. 20.

FIG. 23 is a plan view for describing optical paths when colors are synthesized using the illumination device shown in FIG. 20. As previously described, of the four side surfaces of color synthesis optical element 21, three of the surfaces are incident surfaces, and light is entered from these incident surfaces and the colored light is synthesized by first dichroic mirror 22a and second dichroic mirror 22b. The one remaining surface is the exit surface, and light that has been synthesized by first dichroic mirror 22a and second dichroic mirror 22b is exited from this exit surface.

In FIG. 23, lines represented by solid lines with arrows are for describing representative directions of the progression of incident luminous flux, but this does not mean that only the lines represented as solid lines with arrows are these incident light rays. The incident light is luminous flux having a cross-sectional area no greater than the incident surfaces of color synthesis optical element 21 and includes positions other than the lines represented by solid lines with arrows as well as rays having an angular component.

Light source 23c emits green S-polarized light. The green S-polarized light from light source 23c is entered into color synthesis optical element 21 from the incident surface of right angle prism 21a (in FIG. 23, the surface located on the upper side of the figure). Second dichroic mirror 22b does not act in any way upon green S-polarized light and the green S-polarized light therefore passes through second dichroic mirror 22b without alteration. On the other hand, first dichroic mirror 22a reflects all green S-polarized light. Accordingly, the luminous flux of green S-polarized light is bent 90 degrees at first dichroic mirror 22a and is then exited from the exit surface of right angle prism 21b, as shown in FIG. 23.

Light source 23b emits blue and green P-polarized light. The blue and green P-polarized light from light source 23b is entered into color synthesis optical element 21 from the incident surface of right angle prism 21d (in FIG. 23, the surface located on the left side of the figure). Neither first dichroic mirror 22a nor second dichroic mirror 22b act in any way upon blue and green P-polarized light, and blue and green P-polarized light therefore pass through each of dichroic mirrors 22a and 22b without alteration and are then exited from the exit surface of right angle prism 21b.

Light source 23a emits red S-polarized light. The red S-polarized light from light source 23a is entered into color synthesis optical element 21 from the incident surface of right angle prism 21c (in FIG. 23, the surface located on the lower side of the figure). First dichroic mirror 22a does not act in any way upon red S-polarized light, and the red S-polarized light therefore passes through first dichroic mirror 22a without alteration. On the other hand, second dichroic mirror 22b reflects all red S-polarized light. As a result, luminous flux of red S-polarized light is bent 90 degrees at second dichroic mirror 22b and is then exited from the exit surface of right angle prism 21b, as shown in FIG. 23.

In the illumination device of the present exemplary embodiment, white light can thus be obtained by synthesizing blue P-polarized light, green P-polarized light and S-polarized light, and red S-polarized light.

Figure 24A:
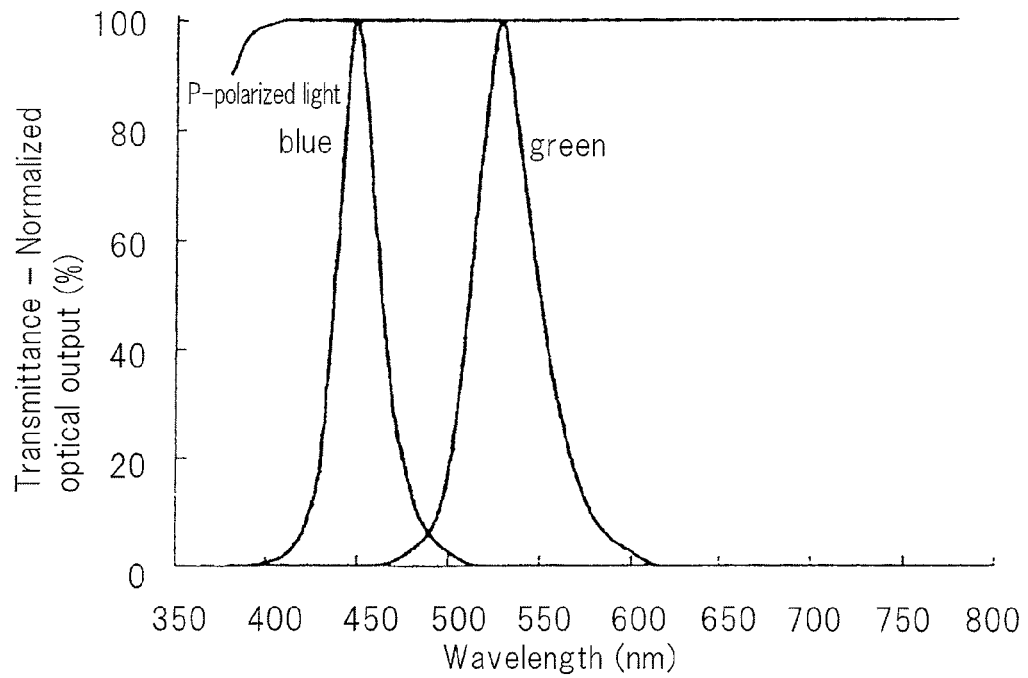
FIG. 24A is a graph showing the relation between the emission spectrums of each of blue and green LED light sources and the spectral transmittance characteristic with respect to P-polarized light of the first dichroic mirror of the color synthesis optical element that forms part of the illumination device shown in FIG. 20.
Figure 24B:
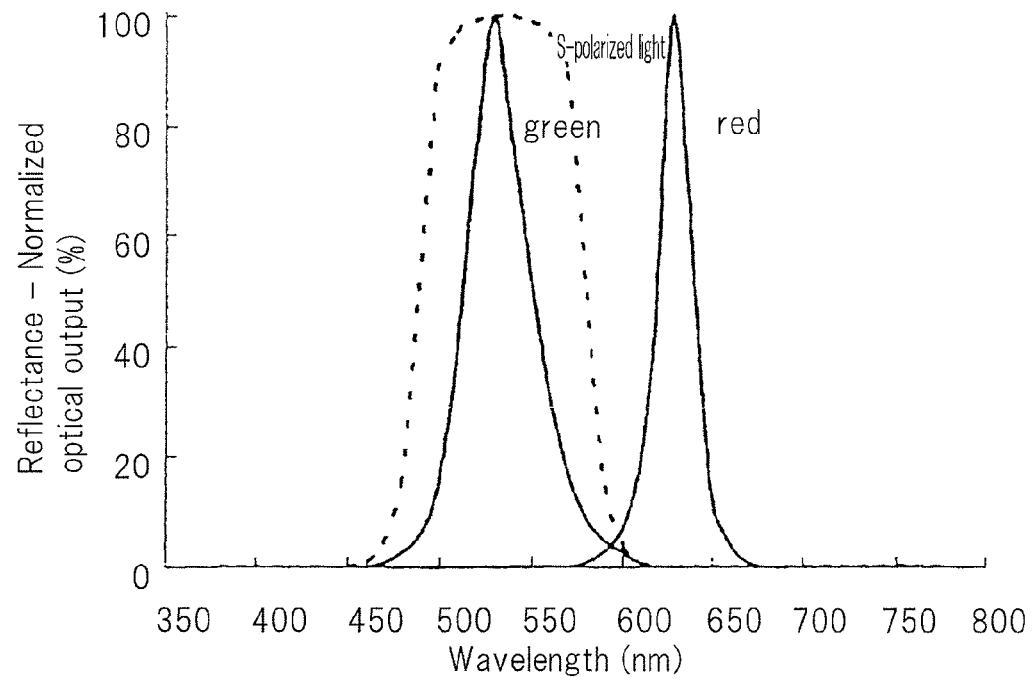
FIG. 24B is a graph showing the relation between the emission spectrums of each of green and red LED light sources and the spectral reflectance characteristic with respect to S-polarized light of the first dichroic mirror of the color synthesis optical element that forms part of the illumination device shown in FIG. 20.

FIG. 24A is a graph showing the relation between the emission spectrums of each of blue and green LED light sources and the spectral transmittance characteristic with respect to P-polarized light of first dichroic mirror 22a. FIG. 24B is a graph showing the relation between the emission spectrums of each of green and red LED light sources and the spectral reflectance characteristic with respect to S-polarized light of first dichroic mirror 22a. The peak wavelength of the red LED light source is 630 nm, the peak wavelength of the green LED light source is 530 nm, and the peak wavelength of the blue LED light source is 450 nm.

Figure 25A:
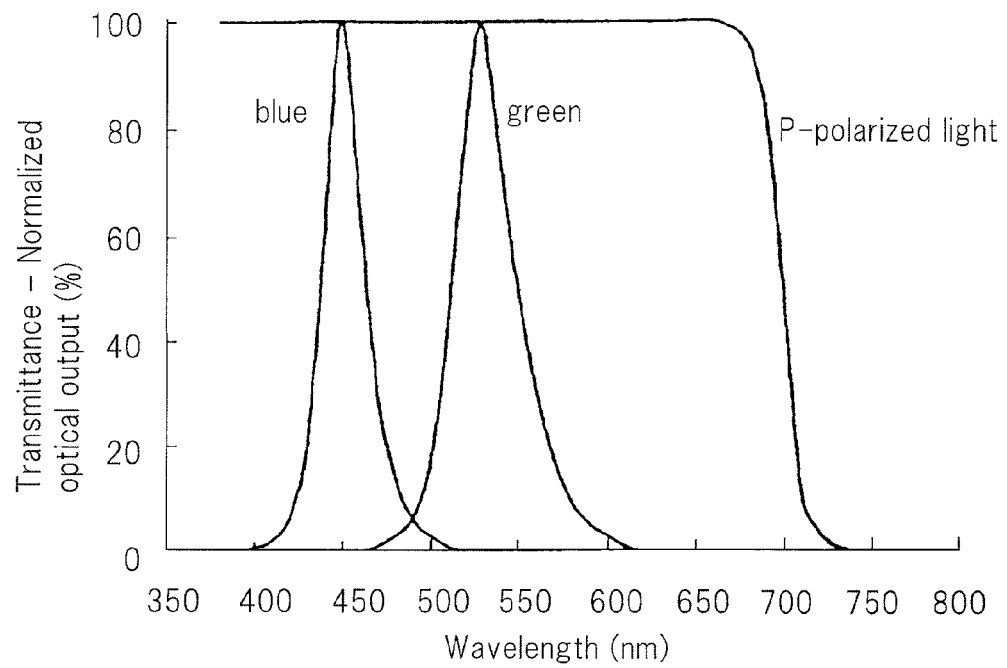
FIG. 25A is a graph showing the relation between the emission spectrums of each of blue and green LED light sources and the spectral transmittance characteristic with respect to P-polarized light of the second dichroic mirror of the color synthesis optical element that forms part of the illumination device shown in FIG. 20.
Figure 25B:
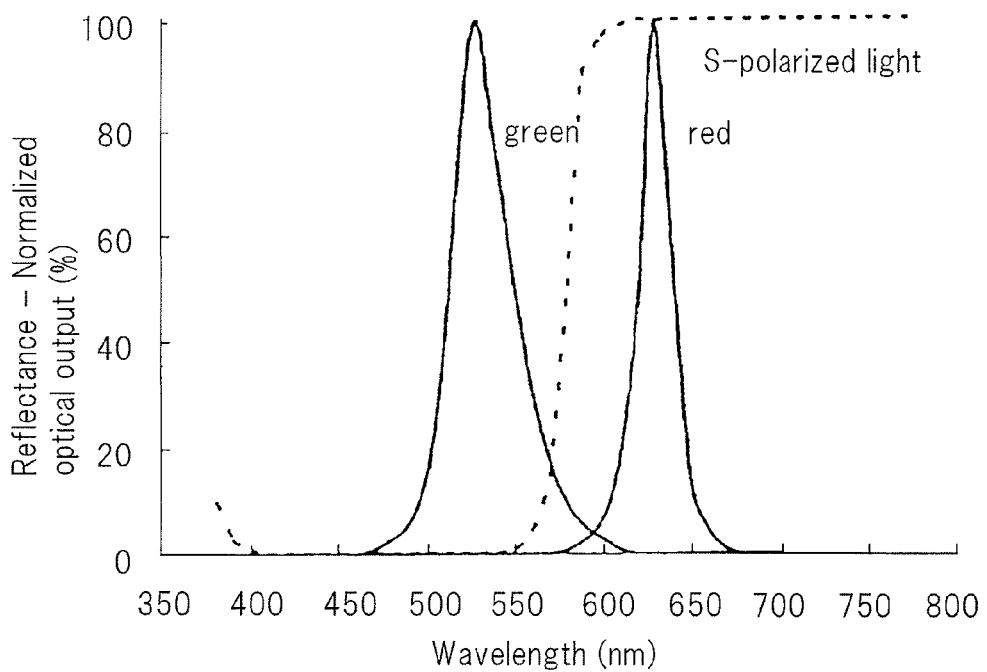
FIG. 25B is a graph showing the relation between the emission spectrums of each of green and red LED light sources and the spectral reflectance characteristic with respect to S-polarized light of the second dichroic mirror of the color synthesis optical element that forms part of the illumination device shown in FIG. 20.

FIG. 25A is a graph showing the relation between the emission spectrums of each of the blue and green LED light sources and the spectral transmittance characteristic with respect to P-polarized light of second dichroic mirror 22b. FIG. 25B is a graph showing the relation between the emission spectrums of each of the red and green LED light sources and the spectral reflectance characteristic with respect to S-polarized light of second dichroic mirror 22b. The peak wavelength of the red LED light source is 630 nm, the peak wavelength of the green LED light source is 530 nm, and the peak wavelength of the blue LED light source is 450 nm.

As can be seen from FIGS. 24A and 25A, the cutoff wavelengths of first dichroic mirror 22a and second dichroic mirror 22b with respect to blue and green P-polarized light are sufficiently separated. Accordingly, blue and green P-polarized light is not reflected by these dichroic mirrors 22a and 22b despite shifting of the cutoff wavelengths due to incident angle dependency. As a result, loss due to incident angle dependency does not occur.

In addition, as can be seen from FIGS. 24B and 25B, the cutoff wavelengths of first dichroic mirror 22a and second dichroic mirror 22b with respect to red S-polarized light and green S-polarized light are sufficiently separated. Accordingly, red and green S-polarized light can be synthesized by these dichroic mirrors 22a and 22b with virtually no loss despite shifting of the cutoff wavelengths due to incident angle dependency.

The cutoff wavelengths of first dichroic mirror 22a and second dichroic mirror 22b are thus set to the blue-green (cyan) and yellow wavelength bands that are not used in color synthesis, whereby colored light can be efficiently synthesized for light that is entered at angles that differ from parallel light.

As in the first exemplary embodiment, the present exemplary embodiment enables the synthesis of green light from two different directions. Moreover, a configuration is adopted that decreases the amount of blue light for which optical output is relatively great and adds green light. Accordingly, the three primary colors can be synthesized at preferable color mixture ratios, and white light having superior white balance can be obtained. In addition, the optical output of the LEDs of three colors can be exhibited at the maximum without limitation.

The illumination device of the present exemplary embodiment is not limited to a configuration that synthesizes only green light from two different directions. For example, in the illumination device shown in FIG. 20, light source 23b may be of a configuration that further emits red P-polarized light.

Fifth Exemplary Embodiment

Figure 26:
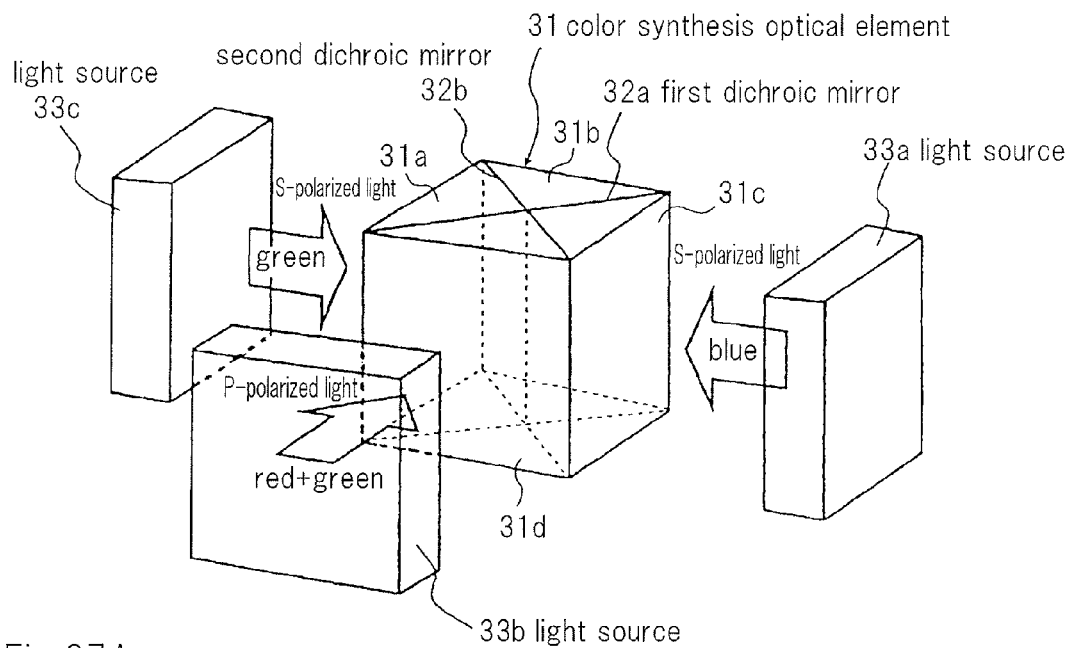
FIG. 26 is a perspective view showing the configuration of the illumination device that is the fifth exemplary embodiment of the present invention.

FIG. 26 is a perspective view showing the configuration of the illumination device that is the fifth exemplary embodiment of the present invention.

Referring to FIG. 26, the illumination device includes color synthesis optical element 31 and three light sources 33a-33c.

As with the first exemplary embodiment, color synthesis optical element 31 is a cross dichroic prism composed of four right angle prisms 31a-31d in which surfaces that form right angles are joined together. First dichroic mirror 32a and second dichroic mirror 32b that are composed of dielectric multilayer films are formed on the joined surfaces of right angle prisms 31a-31d so as to intersect.

Of the four side surfaces of color synthesis optical element 31, light is entered from three surfaces (each of the surfaces of right angle prisms 31a, 31c, and 31d). The one remaining side surface is the exit surface of light that has been synthesized.

In the illumination device of the first exemplary embodiment shown in FIG. 2, light source 3a emits red light (S-polarized light), light source 3b emits green light (P-polarized light), and light source 3c emits green and blue light (S-polarized light). In the illumination device of the present exemplary embodiment, in contrast, light source 33a emits blue light (S-polarized light), light source 33b emits red and green light (P-polarized light), and light source 33c emits green light (S-polarized light).

The S-polarized light (blue) from light source 33a is entered into color synthesis optical element 31 from the incident surface of right angle prism 31c. The P-polarized light (red+green) from light source 33b is entered into color synthesis optical element 31 from the incident surface of right angle prism 31d. The S-polarized light (green) is entered into color synthesis optical element 31 from the incident surface of right angle prism 31a. In other words, the present exemplary embodiment differs from the first exemplary embodiment in that green S-polarized light is entered into color synthesis optical element 31 from light source 33c, red and green P-polarized light is entered into color synthesis optical element 31 from light source 33b, and blue S-polarized light is entered into color synthesis optical element 31 from light source 33a.

In color synthesis optical element 31, the S-polarized light (blue), P-polarized light (red+green), and S-polarized light (green) from each incident surface are synthesized by first dichroic mirror 32a and second dichroic mirror 32b.

Figure 27A:
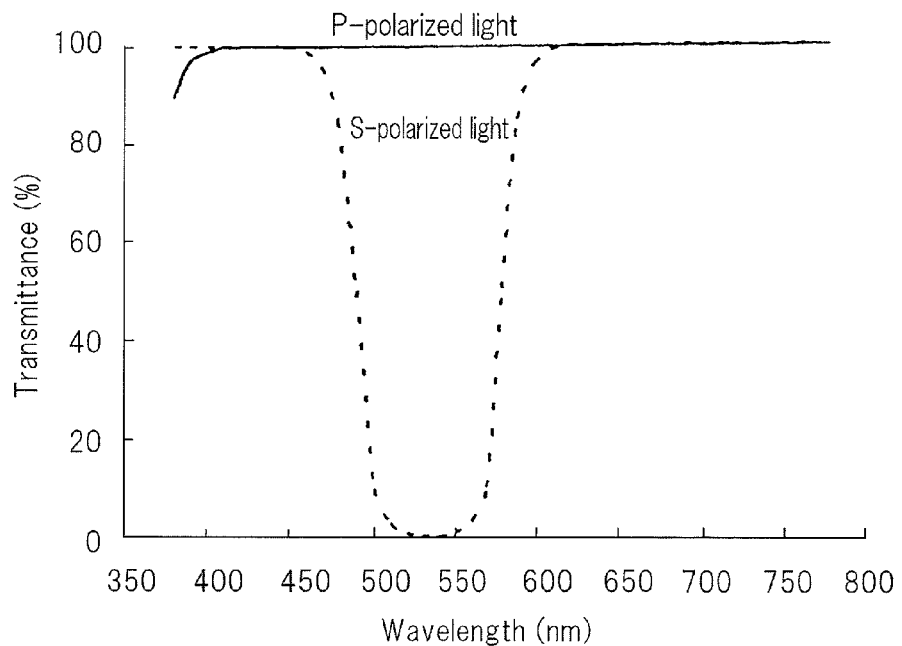
FIG. 27A is a graph showing the spectral transmittance characteristic with respect to P-polarized light and S-polarized light of the first dichroic mirror of the color synthesis optical element that forms part of the illumination device shown in FIG. 26.
Figure 27B:
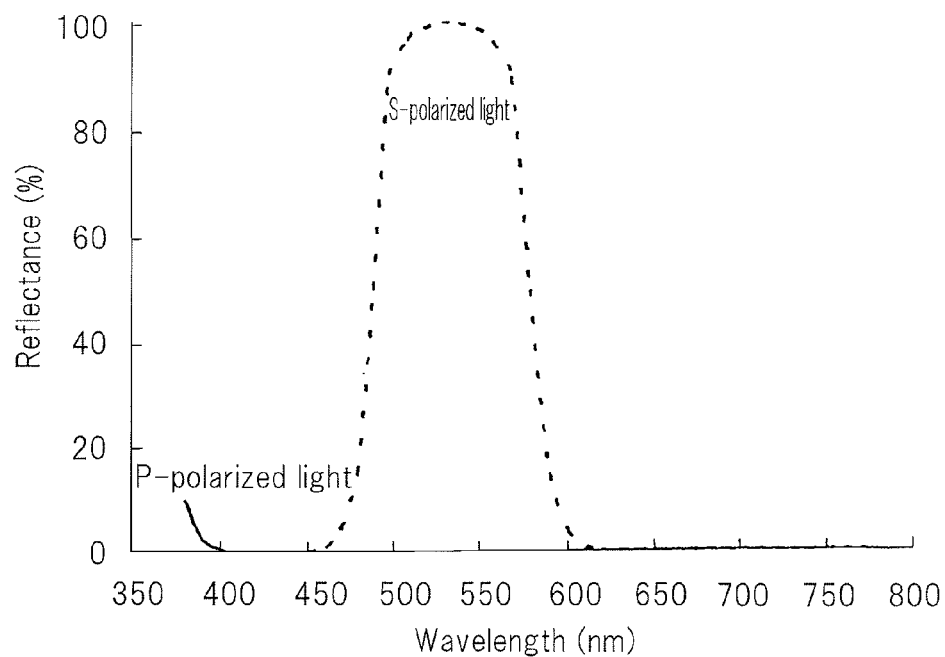
FIG. 27B is a graph showing the spectral reflectance characteristic with respect to P-polarized light and S-polarized light of the first dichroic mirror of the color synthesis optical element that forms part of the illumination device shown in FIG. 26.

FIG. 27A is a graph showing the spectral transmittance characteristic with respect to P-polarized light and S-polarized light of first dichroic mirror 32a. FIG. 27B is a graph showing the spectral reflectance characteristic with respect to P-polarized light and S-polarized light of first dichroic mirror 32a.

First dichroic mirror 32a largely transmits and does not reflect light of the visible range of the incident P-polarized light. The cutoff wavelengths of first dichroic mirror 32a with respect to incident S-polarized light are 490 nm and 580 nm. In this case, first dichroic mirror 32a largely transmits and does not reflect S-polarized light having a wavelength of 490 nm or less and 580 nm or more. In addition, first dichroic mirror 32a largely reflects and does not transmit S-polarized light having a wavelength band that is greater than 490 nm but less than 580 nm.

If the characteristics of first dichroic mirror 32a are expressed as its action upon colored light, with respect to green light, first dichroic mirror 32a transmits P-polarized light and reflects S-polarized light. In other words, first dichroic mirror 32a also acts as a polarization beam splitter with respect to green light. First dichroic mirror 32a does not act in any way upon blue and red light and transmits both P-polarized light and S-polarized light.

Figure 28A:
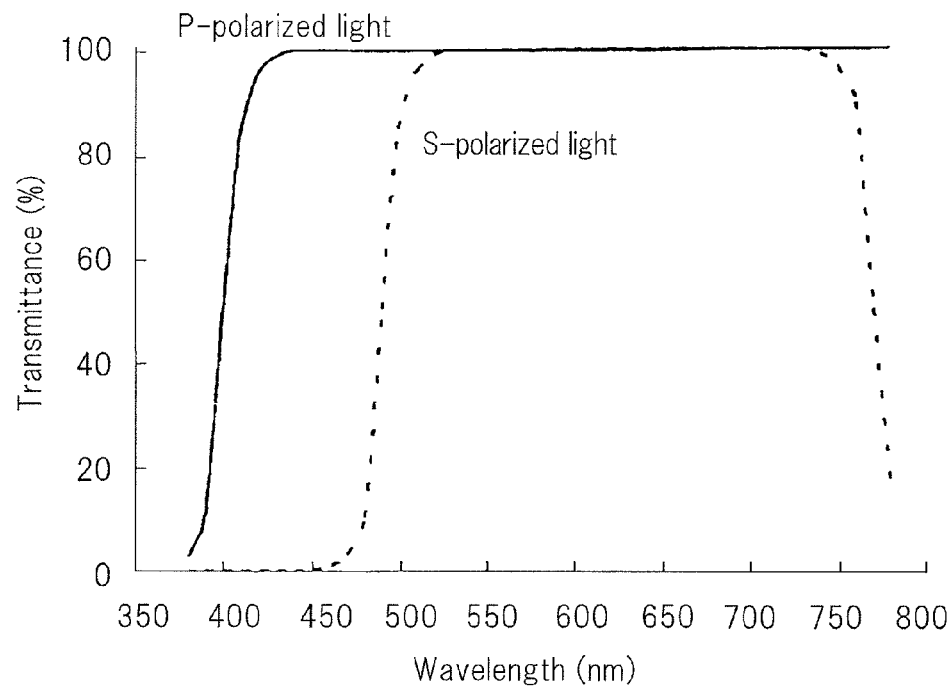
FIG. 28A is a graph showing the spectral transmittance characteristic with respect to P-polarized light and S-polarized light of the second dichroic mirror of the color synthesis optical element that forms part of the illumination device shown in FIG. 26.
Figure 28B:
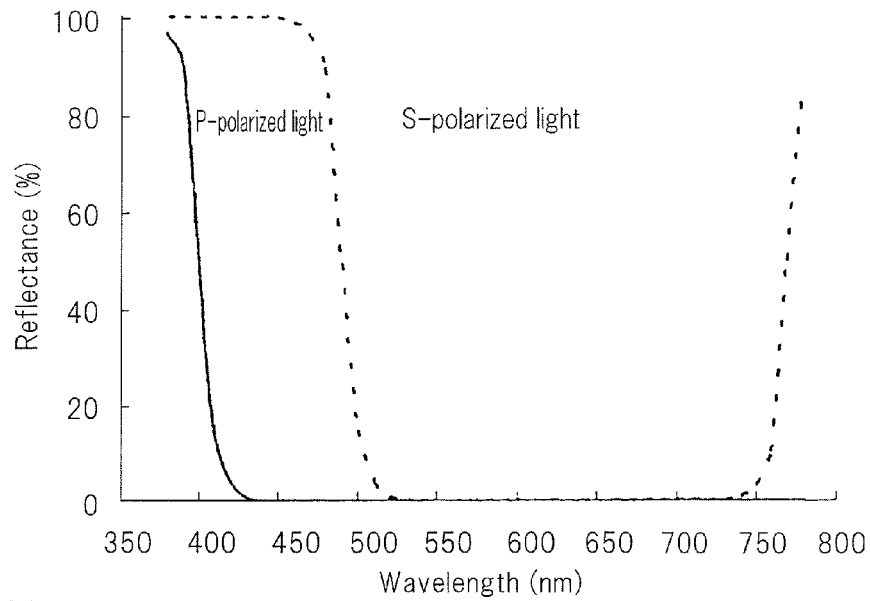
FIG. 28B is a graph showing the spectral reflectance characteristic with respect to P-polarized light and S-polarized light of the second dichroic mirror of the color synthesis optical element that forms part of the illumination device shown in FIG. 26.

FIG. 28A is a graph showing the spectral transmittance characteristic with respect to P-polarized light and S-polarized light of second dichroic mirror 32b. FIG. 28B is a graph showing the spectral reflectance characteristic with respect to P-polarized light and S-polarized light of second dichroic mirror 32b.

The cutoff wavelength with respect to incident P-polarized light of second dichroic mirror 32b is 400 nm. In this case, second dichroic mirror 32b largely transmits and does not reflect P-polarized light having a wavelength of 400 nm or more. In addition, the cutoff wavelength of second dichroic mirror 32b with respect to incident S-polarized light is 490 nm. In this case, second dichroic mirror 32b largely reflects and does not transmit S-polarized light having a wavelength no greater than 490 nm. In addition, second dichroic mirror 32b largely transmits and does not reflect S-polarized light having a wavelength longer than 490 nm.

If the characteristics of second dichroic mirror 32b are expressed by its action upon colored light, with respect to red and green light, second dichroic mirror 32b does not act in any way upon P-polarized light and S-polarized light and transmits both without alteration. With respect to blue light, second dichroic mirror 32b transmits P-polarized light and reflects S-polarized light. In other words, second dichroic mirror 32b also acts as a polarization beam splitter upon blue light.

The present exemplary embodiment differs greatly from the dichroic prism disclosed in Patent Document 8 (see FIG. 1A and FIG. 1B) in that the cutoff wavelengths with respect to S-polarized light of first dichroic mirror 32a and second dichroic mirror 32b are set to the blue-green (cyan) band of 490 nm and the yellow band of 580 nm. Due to this point of difference, light of a color that is insufficient can be augmented within the constraints of etendue to obtain good white balance and the optical output characteristic of LED light sources can be exhibited to their maximum. These features are explained in greater detail hereinbelow.

Figure 29:
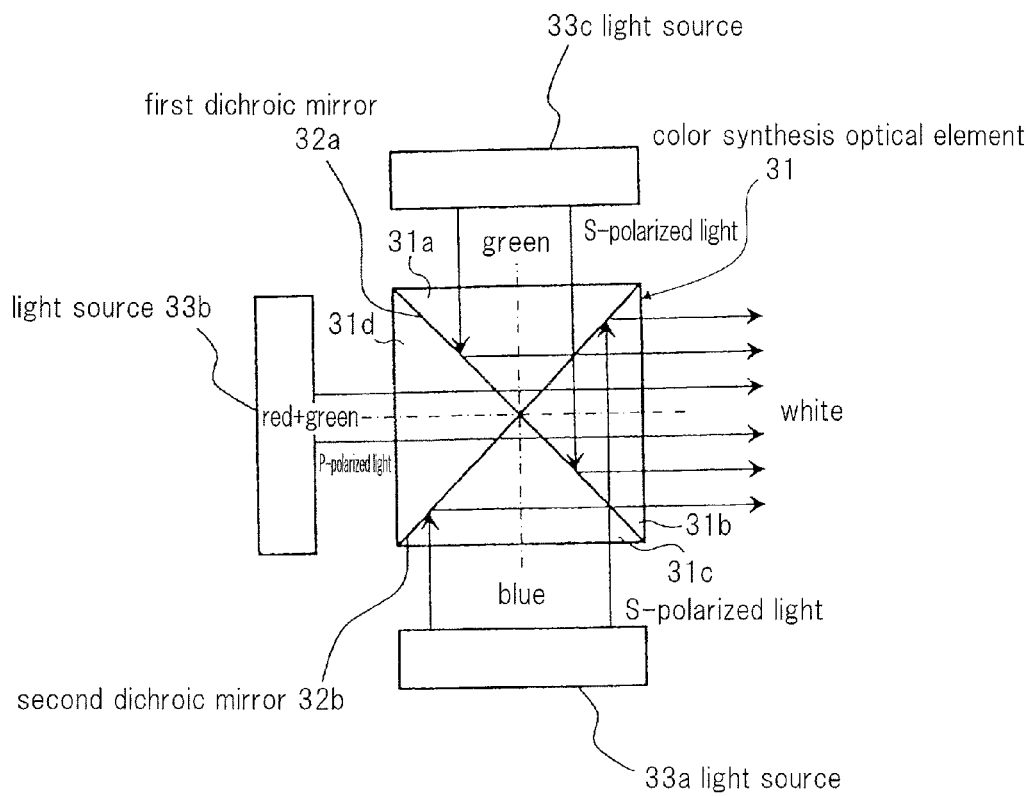
FIG. 29 is a schematic view showing an example of the optical paths when colors are synthesized using the illumination device shown in FIG. 26.

FIG. 29 is a plan view for describing the optical paths when colors are synthesized using the illumination device shown in FIG. 26. As previously described, three surfaces of the four side surfaces of color synthesis optical element 31 are incident surfaces, and light is entered from these incident surfaces, and the colored light is synthesized by first dichroic mirror 32a and second dichroic mirror 32b. The one remaining surface is the exit surface and the light that is synthesized by first dichroic mirror 32a and second dichroic mirror 32b is exited from this exit surface.

In FIG. 29, lines represented as solid lines with arrows are for describing the representative directions of the progression of incident luminous flux, but this does not mean that only the lines represented as solid lines with arrows are the incident rays. The incident light is luminous flux having a cross-sectional area no greater than the incident surfaces of color synthesis optical element 31 and includes positions other than the lines represented as solid lines with arrows as well as rays having an angular component.

Light source 33c emits green S-polarized light. Green S-polarized light from light source 33c is entered into color synthesis optical element 31 from the incident surface of right angle prism 31a (in FIG. 29, the surface located on the upper side of the figure). Second dichroic mirror 32b does not act in any way upon green S-polarized light, and green S-polarized light therefore passes through second dichroic mirror 32b without alteration. On the other hand, first dichroic mirror 32a reflects all green S-polarized light. As a result, the luminous flux of green S-polarized light is bent 90 degrees by first dichroic mirror 32a and is then exited from the exit surface of right angle prism 31b, as shown in FIG. 29.

Light source 33b emits red and green P-polarized light. The red and green P-polarized light from light source 33b is entered into color synthesis optical element 31 from the incident surface of right angle prism 31d (in FIG. 29, the surface located on the left side of the figure). Neither first dichroic mirror 32a nor second dichroic mirror 32b act in any way upon red and green P-polarized light, and the red and green P-polarized light therefore pass through each of dichroic mirrors 32a and 32b without alteration and are then exited from the exit surface of right angle prism 31b.

Light source 33a emits blue S-polarized light. The blue S-polarized light from light source 33a is entered into color synthesis optical element 31 from the incident surface of right angle prism 31c (in FIG. 29, the surface located on the lower side of the figure). First dichroic mirror 32a does not act in any way upon blue S-polarized light, and the blue S-polarized light therefore passes through first dichroic mirror 32a without alteration. On the other hand, second dichroic mirror 32b reflects all blue S-polarized light. As a result, luminous flux of blue S-polarized light is bent 90 degrees at second dichroic mirror 32b and then exited from the exit surface of right angle prism 31b, as shown in FIG. 29.

Thus, in the illumination device of the present exemplary embodiment, white light can be obtained by synthesizing blue S-polarized light, green P-polarized light and S-polarized light, and red P-polarized light.

Figure 30A:
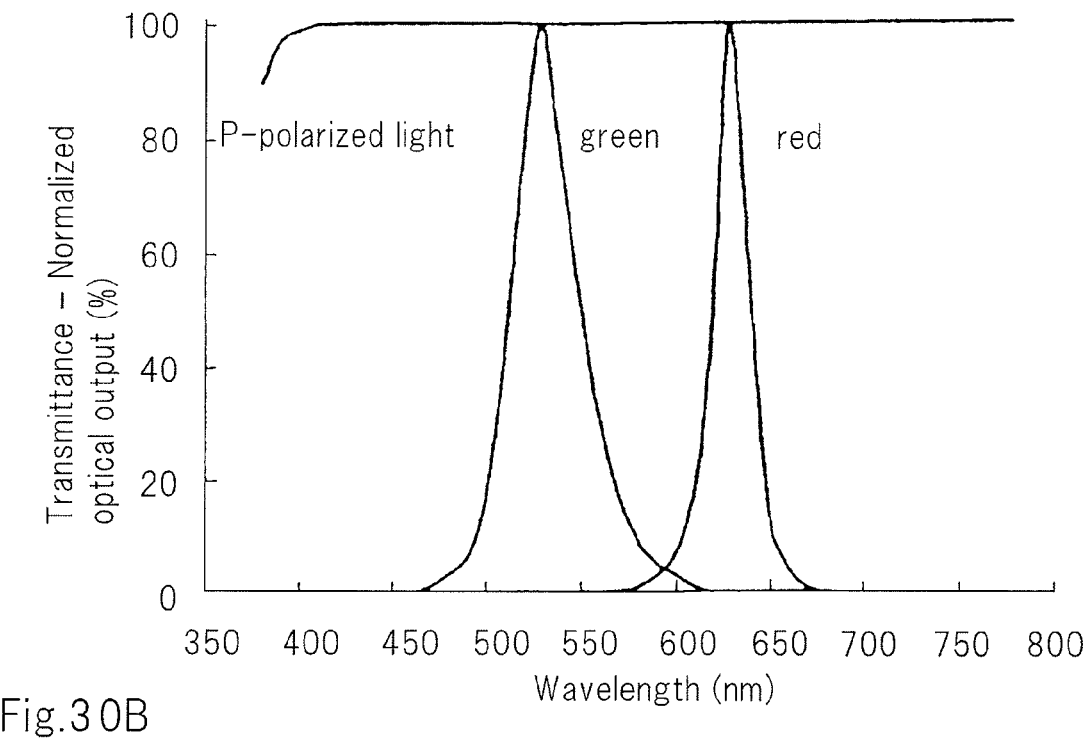
FIG. 30A is a graph showing the relation between the emission spectrums of each of green and red LED light sources and the spectral transmittance characteristic with respect to P-polarized light of the first dichroic mirror of the color synthesis optical element that forms part of the illumination device shown in FIG. 26.
Figure 30B:
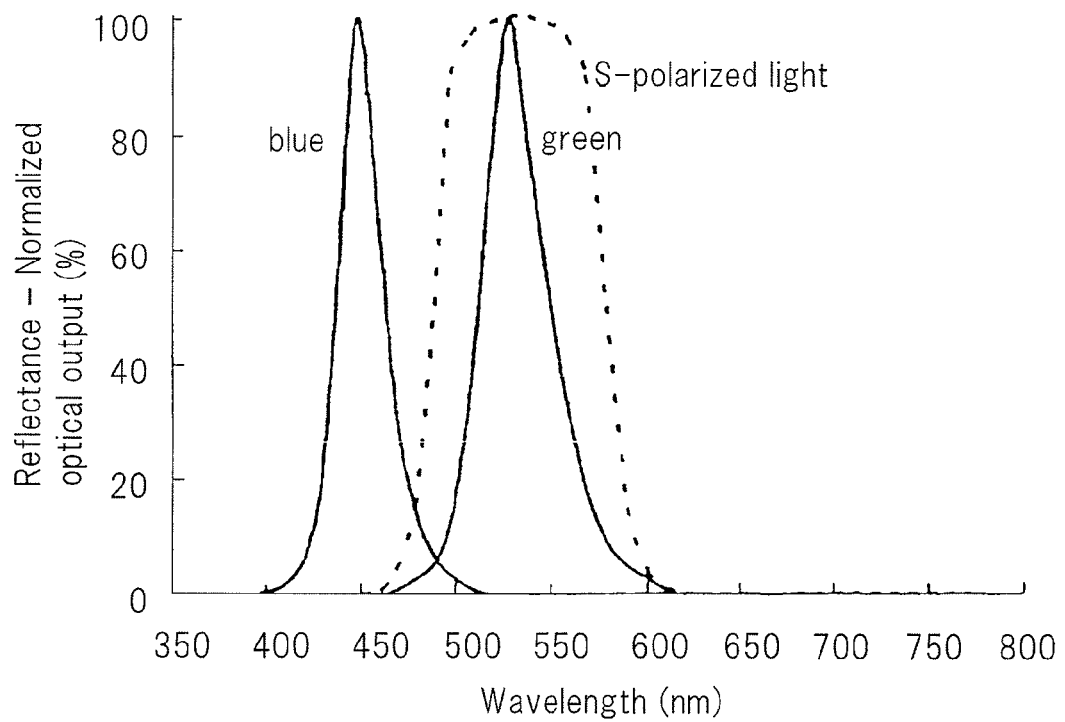
FIG. 30B is a graph showing the relation between the emission spectrums of each of blue and green LED light sources and the spectral reflectance characteristic with respect to S-polarized light of the first dichroic mirror of the color synthesis optical element that forms part of the illumination device shown in FIG. 26.

FIG. 30A is a graph showing the relation between the emission spectrums of each of green and red LED light sources and the spectral transmittance characteristic with respect to P-polarized light of first dichroic mirror 32a. FIG. 30B is a graph showing the relation between the emission spectrums of each of blue and green LED light sources and the spectral reflectance characteristic with respect to S-polarized light of first dichroic mirror 32a. The peak wavelength of the red LED light source is 630 nm, the peak wavelength of the green LED light source is 530 nm, and the peak wavelength of the blue LED light source is 450 nm.

Figure 31A:
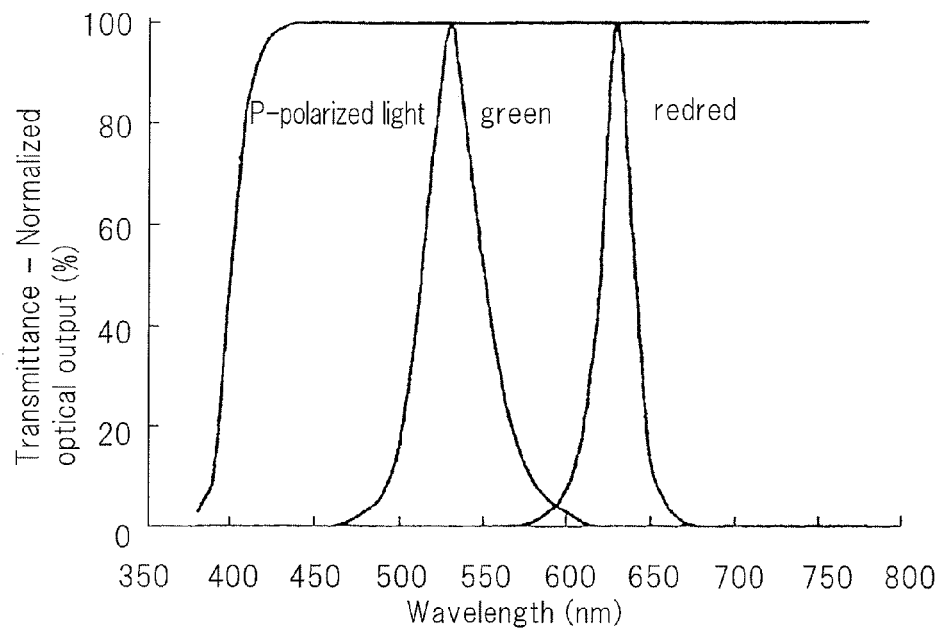
FIG. 31A is a graph showing the relation between the emission spectrums of each of green and red LED light sources and the spectral transmittance characteristic with respect to P-polarized light of the second dichroic mirror of the color synthesis optical element that forms part of the illumination device shown in FIG. 26.
Figure 31B:
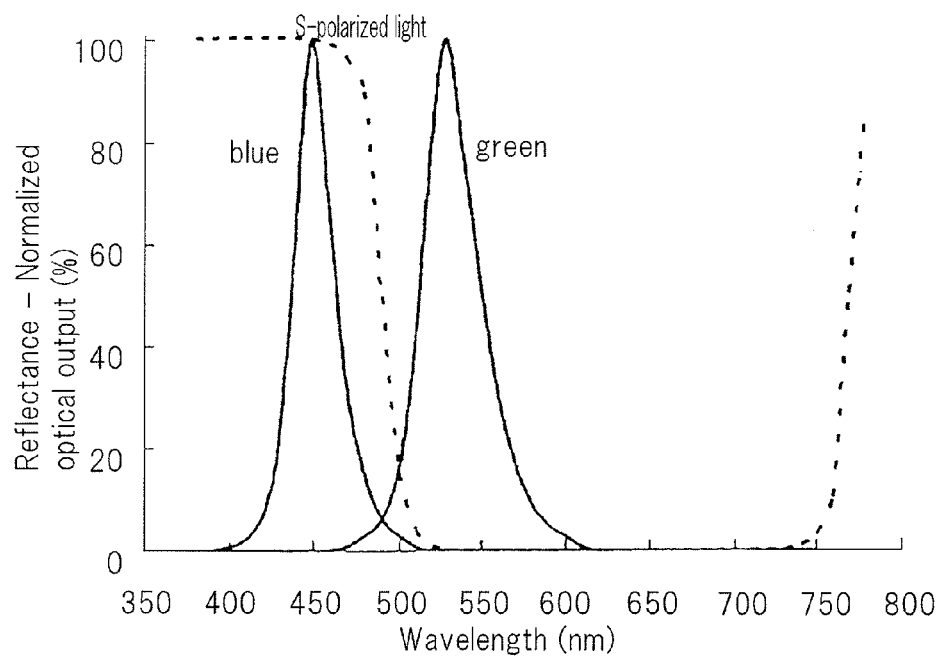
FIG. 31B is a graph showing the relation between the emission spectrums of each of blue and green LED light sources and the spectral reflectance characteristic with respect to S-polarized light of the second dichroic mirror of the color synthesis optical element that foams part of the illumination device shown in FIG. 26.

FIG. 31A is a graph showing the relation between the emission spectrums of each of red and green LED light sources and the spectral transmittance characteristic with respect to P-polarized light of second dichroic mirror 32b. FIG. 31B is a graph showing the relation between the emission spectrums of each of the blue and green LED light sources and the spectral reflectance characteristic with respect to S-polarized light of second dichroic mirror 32b. The peak wavelength of the red LED light source is 630 nm, the peak wavelength of the green LED light source is 530 nm, and the peak wavelength of the blue LED light source is 450 nm.

As can be clearly seen from FIGS. 30A and 31A, the cutoff wavelengths with respect to red and green P-polarized light of first dichroic mirror 32a and second dichroic mirror 32b are sufficiently separated. Accordingly, blue and green P-polarized light is not reflected by these dichroic mirrors 32a and 32b despite shifting of the cutoff wavelengths due to incident angle dependency. As a result, loss due to incident angle dependency does not occur.

In addition, as can be clearly seen from FIGS. 30B and 31B, the cutoff wavelengths with respect to blue S-polarized light and green S-polarized light of first dichroic mirror 32a and second dichroic mirror 32b are sufficiently separated. Accordingly, blue and green S-polarized light can be synthesized by these dichroic mirrors 32a and 32b with virtually no loss despite shifting of the cutoff wavelengths due to incident angle dependency.

Because the cutoff wavelengths of first dichroic mirror 32a and second dichroic mirror 32b are thus set to the blue-green (cyan) and yellow wavelength bands that are not used in color synthesis, colored light can be efficiently synthesized even for light that is entered at angles that differ from parallel light.

According to the present exemplary embodiment, as in the first exemplary embodiment, green light can be synthesized from two different directions. In addition, a configuration is adopted that decreases the amount of red light for which optical output is relatively great and that adds green light. Accordingly, the three primary colors can be synthesized at preferable color mixture ratios, and white light is obtained that has superior white balance. In addition, the optical output of the LEDs of three colors can be exhibited at the maximum without limitations.

The illumination device of the present exemplary embodiment is not limited to a configuration in which only green light is synthesized from two different directions. For example, in the illumination device shown in FIG. 26, light source 33b may be of a configuration that further emits blue P-polarized light.

Sixth Exemplary Embodiment

Figure 32:
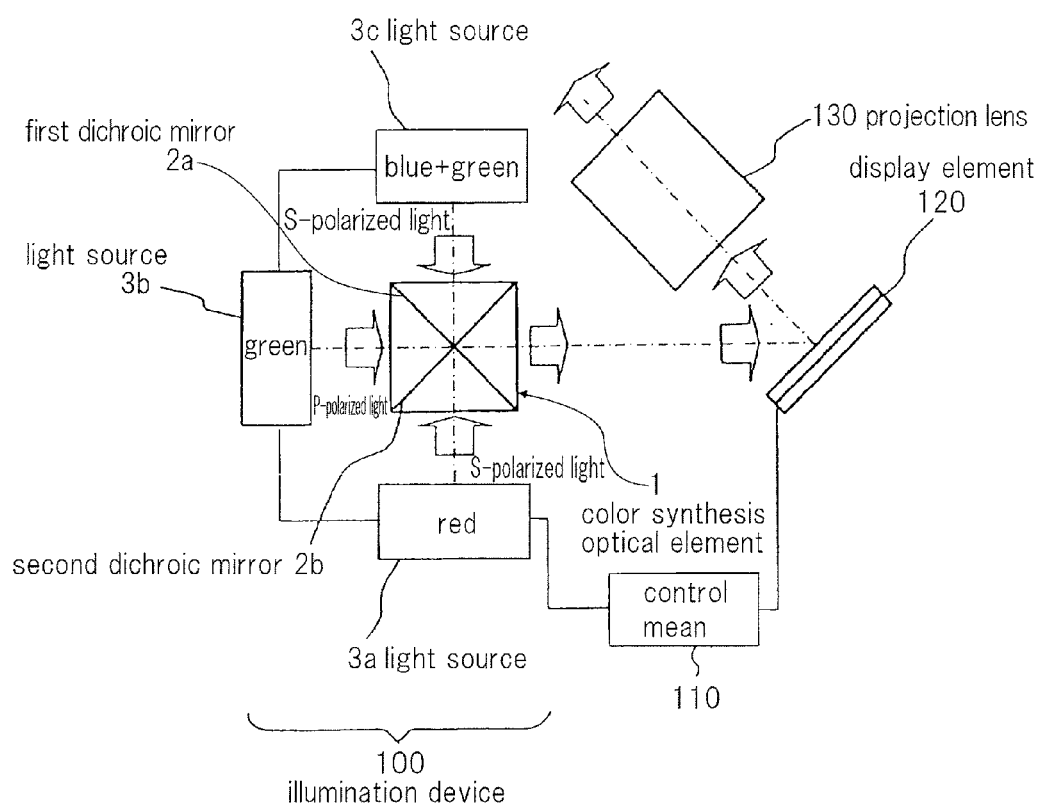
FIG. 32 is a block diagram showing the configuration of the projection-type display device that is the sixth exemplary embodiment of the present invention.

FIG. 32 is a block diagram showing the configuration of the projection-type display device that is the sixth exemplary embodiment of the present invention.

Referring to FIG. 32, the projection-type display device includes illumination device 100, control means 110, display element 120, and projection lens 130.

Illumination device 100 is of the same configuration as the illumination device of the first exemplary embodiment and is made up of color synthesis optical element 1 and three light sources 3a-3c. Color synthesis optical element 1 is a cross dichroic prism in which first dichroic mirror 2a and second dichroic mirror 2b composed of dielectric multilayer films are formed on the joined surfaces of four right angle prisms so as to intersect.

Light is entered from three surfaces (the surfaces of each of right angle prisms 1a, 1c, and 1d) of the four side surfaces of color synthesis optical element 1, and colors are synthesized. The one remaining side surface is the exit surface of light that has been synthesized. An anti-reflection film composed of a dielectric multilayer film is applied to the incident surfaces and exit surface of color synthesis optical element 1.

Light source 3a emits red light (S-polarized light). Light source 3b emits green light (P-polarized light). Light source 3c emits green and blue light (S-polarized light). Here, red, green, and blue correspond to the three primary colors of light.

The S-polarized light (red) from light source 3a is entered into color synthesis optical element 1 from the incident surface of right angle prism 1c. The P-polarized light (green) from light source 3b is entered into color synthesis optical element 1 from the incident surface of right angle prism 1d. The S-polarized light (blue) from light source 3c is entered into color synthesis optical element 1 from the incident surface of right angle prism 1a.

In color synthesis optical element 1, the S-polarized light (red), P-polarized light (green), and S-polarized light (green+blue) from each of the incident surfaces is synthesized by first dichroic mirror 2a and second dichroic mirror 2b, and the synthesized light (white light) is exited from the exit surface.

Display element 120 is arranged in the direction of progression of the light that is exited from the exit surface of color synthesis optical element 1, and projection lens 130 is arranged in the direction of progression of light that is reflected by display element 120. Projection lens 130 projects the image displayed on display element 120 onto a screen (not shown).

As shown in FIG. 5, each of light sources 3a-3c is made up of LED module 50, condensing optics 52, and drive circuit 53. In LED module 50, an LED that is light-emitting unit 51 is mounted on a substrate. The substrate additionally serves as a heat radiation plate and a heat sink (not shown) is attached. In addition, heat control is effected by a forced cooling apparatus to stabilize the light emission characteristic of the LED.

Figure 33:
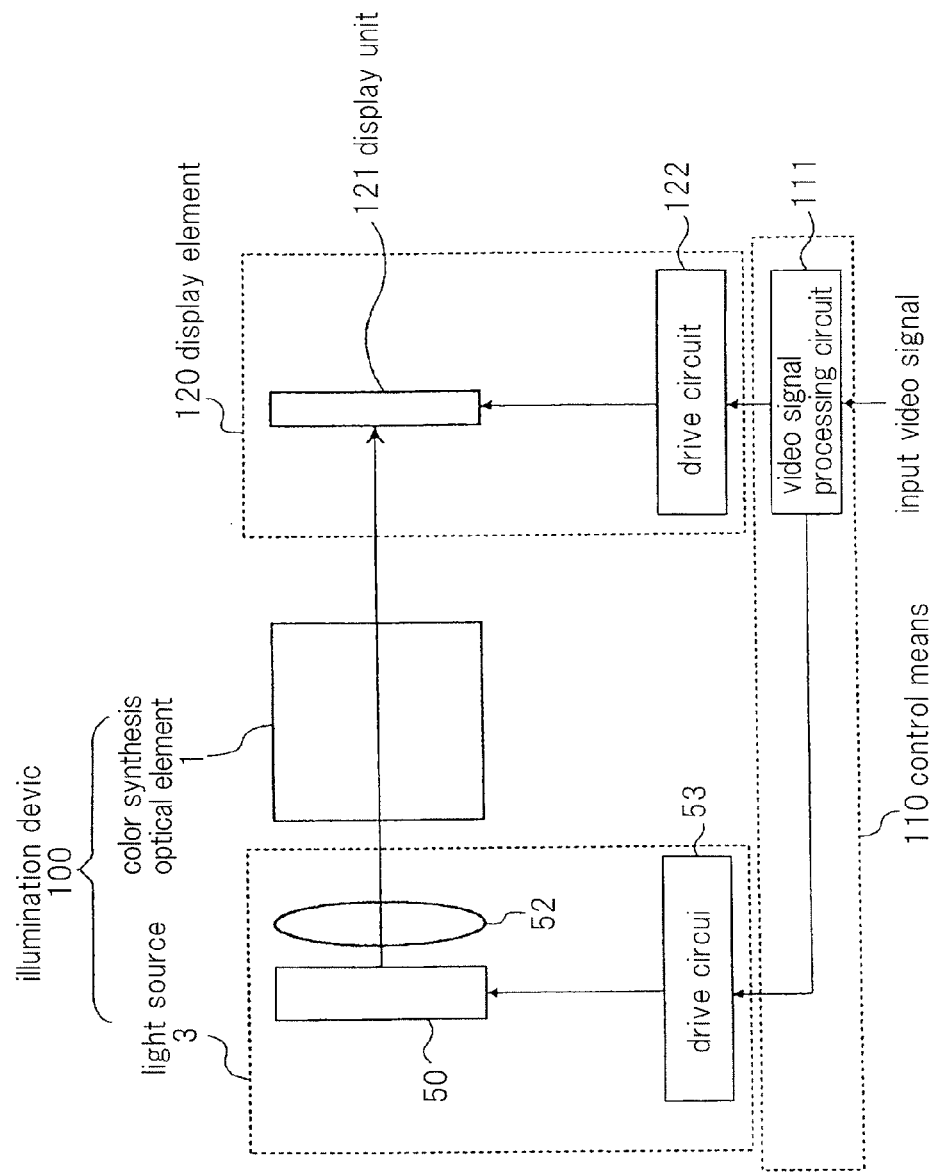
FIG. 33 is a block diagram for describing the control means of the projection-type display device shown in FIG. 32.

Control means 110 controls light sources 3a-3c and display element 120. FIG. 33 shows the configuration of this control means 110. In FIG. 33, for the sake of convenience, illumination device 100 and display element 120 are shown in addition to control means 110. Illumination device 100 shown in FIG. 33 is composed of light source 3 and color synthesis optical element 1. Light source 3 corresponds to light sources 3a-3c shown in FIG. 32, but in FIG. 33, the light sources are shown in a simplified state as a single light source.

As shown in FIG. 33, control means 110 is provided with video signal processing circuit 111. Video signal processing circuit 111 both successively supplies image signals of each color component from the input video signal to drive circuit 122 of display element 120 to bring about the display of images for each color component on display element 120 and supplies synchronizing signals that are matched to the timing of the image display of each color component to drive circuit 53 of each light source of illumination device 100 to control lighting of the light source of the color that corresponds to the color component for the image display that is being effected.

Drive circuit 53 that has received a synchronizing signal from video signal processing circuit 111 supplies current to the LED that is the light-emitting unit of LED module 50. The light from the LED is condensed by condensing optics 52, and the condensed light is then entered into the incident surfaces of color synthesis optical element 1.

As condensing optics 52, a lens-shaped optical element is used in FIG. 33, but a reflective optical element such as a reflector may also be used. In addition, a fly-eye lens or glass rod may also be used as an integrator for causing the light to illuminate display element 120 uniformly. Polarization conversion optics that employ a polarization beam splitter and half-wave plate may also be used to efficiently obtain the light of the polarization component that is used in color synthesis optical element 1. Of course, the light-emitting unit of LED module 50 may be the light source that produces polarized light, or a polarization conversion function may be provided in the light-emitting unit to generate polarized light from the light-emitting unit. In either form, the light source can be constructed by means of any combination of known technology.

Referring again to FIG. 32, light source 3a is provided with red LED module 60 shown in FIG. 6A, light source 3b is provided with green LED module 70 shown in FIG. 6B, and light source 3c is provided with blue LED module 80 shown in FIG. 6C.

The light-emitting unit of red LED module 60 is composed of four LED chips 61a-61d for which the peak wavelength is 630 nm. The light-emitting unit of green LED module 70 is composed of four LED chips 71a-71d for which the peak wavelength is 520 nm. The light-emitting unit of blue LED module 80 is composed of three LED chips 81a-81c for which the peak wavelength is 460 nm and one LED chip 81d for which the peak wavelength is 520 nm. The emission spectrums of the red, green, and blue LED chips are the same as those shown in FIG. 8B.

The areas of the light-emitting units of each of red LED module 60, green LED module 70, and blue LED module 80 are determined by the area of the display element and the f-number of the projection lens based on the constraints of etendue, but in the determination of the areas of the light-emitting units, factors such as the positioning margins in fabrication and the uniformity of the illuminance distribution of the illumination light are taken into consideration.

In the red LED module 60, green LED module 70, and blue LED module 80, light-emission characteristics vary with respect to current of the LED chips that make up the light-emitting units, and drive circuit 53 shown in FIG. 33 therefore controls the amount of current to the LED chips according to these light emission characteristics.

The characteristics of the LEDs of each color at the time of rated drive are described next. The chromaticity of a red LED is given as (0.700, 0.300) on xy chromaticity coordinates, and the emitted luminous flux is 455 lm per chip. The chromaticity of the green LED is given as (0.195, 0.700) on xy chromaticity coordinates, and the emitted luminous flux is 1000 lm per chip. The chromaticity of the blue LED is given as (0.140, 0.046) on xy chromaticity coordinates, and the emitted luminous flux is 133 lm per chip.

Display element 120 is, for example, an MEMS (Micro Electro Mechanical System)-type element in which a micromirror is provided for each pixel and that switches light by the action of mirrors. According to this element, a color picture can be displayed by a field-sequential mode.

Video signal processing circuit 111 breaks down one frame of a picture into fields of each of the colors red, green, and blue by time and causes display of the images of the color components of each field on display unit 121 by way of drive circuit 122. Video signal processing circuit 111 supplies synchronizing signals to drive circuit 53 of illumination device 100 in synchronization with the field image display and drives the light source of each color to switch the colors of the illumination light. Half-tones can be reproduced by modulating the pulse width of the signals that are supplied to drive circuit 122.

The colors of field images that are displayed are not limited to the three colors red, green, and blue. Field images of C (cyan), M (magenta), Y (yellow) and W (white) in which these colors are combined may also be displayed. In this case, a plurality of light sources among light sources 3a-3c are lit simultaneously in accordance with the color of the field image that is to be displayed.

Display element 120 is not limited to a device that uses micromirrors. Instead of a reflective type, display element 120 may also be a transmissive-type display element in which a microshutter is provided in each pixel. Of course, display element 120 may also be a display element other than the MEMS type. However, two polarization components are included in illumination light, and a device that has no polarization dependence in display operations is therefore preferable as display element 120. When there is polarization dependency in the display operations of display element 120, polarization conversion optics may be used to arrange to one polarization component.

The spectral transmittance characteristic and spectral reflectance characteristic with respect to P-polarized light and S-polarized light of first dichroic mirror 2a are as shown in FIGS. 3A and 3B.

The spectral transmittance characteristic and spectral reflectance characteristic with respect to P-polarized light and S-polarized light of second dichroic mirror 2b are as shown in FIGS. 4A and 4B.

The operations of the projection-type display device composed of the above-described constituent elements are next described using FIG. 32.

Light emitted from light source 3a (light emitted from red LED module 60) has the spectrum of red LEDs and is entered into color synthesis optical element 1 as S-polarized light. S-polarized light having the spectrum of red LEDs passes through first dichroic mirror 2a (see FIG. 8B) and is reflected by second dichroic mirror 2b (see FIG. 9B). In other words, the optical path of red S-polarized light is bent 90 degrees at second dichroic mirror 2b and the red S-polarized light is then exited from the exit surface of color synthesis optical element 1.

Light emitted from light source 3b (light emitted from green LED module 70) has the spectrum of green LEDs and is entered into color synthesis optical element 1 as P-polarized light. The P-polarized light having the spectrum of green LEDs passes through first dichroic mirror 2a (see FIG. 8B) and also passes through second dichroic mirror 2b (see FIG.

9B). In other words, P-polarized light having the spectrum of green LEDs is exited from the exit surface of color synthesis optical element 1 unchanged without having its optical path bent.

Light emitted from light source 3c (light emitted from blue LED module 80) has the spectrum of a green LED in addition to the spectrum of blue LEDs and is entered into color synthesis optical element 1 as S-polarized light. The S-polarized light having the spectrum of blue LEDs and the spectrum of a green LED passes through second dichroic mirror 2b (see FIG. 9B) and is reflected by first dichroic mirror 2a (see FIG. 8B). In other words, S-polarized light having the spectrum of blue LEDs and the spectrum of a green LED has its optical path bend 90 degrees at first dichroic mirror 2a and then is exited from the exit surface of color synthesis optical element 1.

Illumination light (red) that is entered into display element 120 from light source 3a by way of color synthesis optical element 1 has an angular spread in the order of ±15 degrees. Similarly, illumination light (green) entered into display element 120 from light source 3b by way of color synthesis optical element 1 and illumination light (green+blue) entered into display element 120 from light source 3c by way of color synthesis optical element 1 both have angular spread in the order of ±15 degrees. According to the present exemplary embodiment, the cutoff wavelengths with respect to green P-polarized light of first dichroic mirror 2a and second dichroic mirror 2b are sufficiently separated. Accordingly, green P-polarized light is not reflected by these dichroic mirrors 2a and 2b despite shifting of the cutoff wavelengths due to incident angle dependency. As a result, loss does not occur due to incident angle dependency.

Similarly, the cutoff wavelengths with respect to blue and green S-polarized light and red S-polarized light of first dichroic mirror 2a and second dichroic mirror 2b are sufficiently separated. Accordingly, blue, green, and red S-polarized light can be synthesized with virtually no loss by these dichroic mirrors 2a and 2b despite shifting of the cutoff wavelengths due to incident angle dependency.

As described hereinabove, light from light sources 3a-3c is entered into color synthesis optical element 1 from three directions. In color synthesis optical element 1, light entered from three directions is synthesized and exited so as to have the same optical axis, and display element 120 is illuminated by the light exited from this color synthesis optical element 1. The luminous flux that has undergone intensity modulation according to the image in display element 120 is entered into projection lens 130. The images (pictures) displayed in display element 120 are then projected on a screen (not shown) by projection lens 130.

The effect of the projection-type display device of the present exemplary embodiment is next described.

As an example, the light-emitting unit of a blue LED module is made up of four blue LEDs, the light-emitting unit of a green LED module is made up of four green LEDs, and the light-emitting unit of a red LED module is made up of four red LEDs. The total synthesized luminous flux when the luminous flux from each of these blue, green, and red LED modules is synthesized is 6352 lm (455+1000+133).

However, the chromaticity of white that is synthesized as described above is (0.299, 0.271) and therefore diverges greatly in the direction of blue-violet from the white chromaticity (0.313, 0.329) of the standard illuminant D6 . This divergence occurs because the optical output of green LEDs is relatively weak with respect to the light quantity ratios for obtaining desirable white while the optical output of blue LEDs is relatively strong.

To obtain white balance, the emitted luminous flux of green must be increased. If within the rated range, the emitted luminous flux can be increased by increasing the current that flows to the LEDs. However, increasing the current amount in a state in which the emitted luminous flux from green LEDs is 1000 lm results in driving the LED at a level that exceeds its rating, and in this case, the luminous flux cannot be expected to increase in accordance with an increase of the current amount. In addition, driving LEDs in excess of the rating not only shortens the life expectancy of the LEDs but may even destroy the LEDs.

Based on the foregoing, the emitted luminous flux of the blue LEDs is normally suppressed to from 133 lm to 80 lm and the emitted luminous flux of the red LEDs is suppressed to from 455 lm to 364 lm in accordance with the emitted luminous flux of the green LEDs. In this case, the total luminous flux is 5776 lm, and the brightness is decreased by 9%.

In the projection-type display device of the present exemplary embodiment, in contrast, blue LED module 80 is made up of three LED chips 81a-81c that emit blue light and a single LED chip 81d that emits green light, as shown in FIG. 6C. In other words, compared to the above-described blue LED module that is made up of four blue LEDs, the number of blue LED chips in this blue LED module is reduced by one to three and an LED chip that emits green light is arranged in its place.

In addition, in the projection-type display device of the present exemplary embodiment, red LED module 60 is made up of four LED chips 61a-61d that emit red light as shown in FIG. 6A, and green LED module 70 is made up of four LED chips 71a-71d that emit green light as shown in FIG. 6B. Accordingly, the number of green LED chips is the four LED chips 71a-71d that are provided in green LED module 70 and the single green LED chip 81d that is used in blue LED module 80 for a total of five. In addition, the number of blue LED chips is three, and the number of red LED chips is four. When these red, green, and blue LED chips are all driven at rating, the white chromaticity (0.313, 0.329) of standard illuminant D65 is obtained as the white chromaticity. In addition, the total luminous flux is 7219 lm, enabling a 25% improvement over the 5776 lm described above.

According to the present exemplary embodiment as described hereinabove, a projection-type display device is obtained that can display a bright projected image by using an illumination device that can exhibit the optical output performance of LEDs at a maximum, that obtains white light having superior white balance, and moreover, that features high optical utilization efficiency when mixing colors.

In the present exemplary embodiment, a cross dichroic prism shown in the first exemplary embodiment was used as color synthesis optical element 1, but when the optical output characteristic of red LEDs surpasses that of blue LEDs, the cross dichroic prism shown in the second exemplary embodiment may also be used. In this case, four LED chips that emit green light are mounted in the green LED module, four LED chips that emit blue light are mounted in the blue LED module, and three LED chips that emit red light and one LED chip that emits green light are mounted in the red LED module.

As other examples, the number of green LEDs may be decreased and red or blue LEDs may be added in the green LED module.

Blue LED module 80 shown in FIG. 6C was assumed to have three blue LED chips 81a-81c and one green LED chip 81d mounted on a substrate, but the module is not limited to this configuration. Four green LED of one-quarter the chip area may be used and these may be arranged in symmetrical form, for example, in the four corners of the light-emitting unit, whereby the color mixing of the emitted light is improved.

All of the LED modules of each color shown in FIGS. 6A-6C have four LED chips mounted on a substrate, but the modules are not limited to this form. The LED chip that is mounted in an LED module that emits light of a single color may be a single LED chip having four times the area. The number of LED chips that are mounted in an LED module that emits light of two colors may be two or more. The important point is not the number of LED chips, but rather, the chip area. The chip area of LED chips that are mounted in an LED module is preferably set while keeping the color-mixing ratio in mind. Using LED chips having a small area enables setting the chip area at a more precise color-mixing ratio.

Of course, if the optical output characteristic of blue LEDs is higher, two blue LED chips in the blue LED module shown in FIG. 6C may be replaced by two green LED chips. An LED module is therefore preferably designed as appropriate according to the optical output characteristics of the LEDs that are used.

Alternatively, rather than mounting a plurality of LED chips on a single substrate, a plurality of components each having one LED chip mounted may be used and synthesis realized using an optical means such as a light guide plate.

Still further, to increase the absolute quantity of light, means may be used in combination that use a hologram or dichroic mirror described in the background art to synthesize light of a plurality of colors having different peak wavelengths.

In the interest of simplification in the foregoing explanation, the display elements of each color, the color synthesis optical element, and the projection lens were assumed to be components that do not generate loss that depends on wavelength, and explanation was presented using ratios of the quantity of luminous flux emitted from each light source. In actuality, there are also constituent parts in which the transmission characteristics vary according to color, and the area ratios of LED chips are preferably set by the light-quantity ratios of luminous flux of each color exited from the projection lens when displaying an all-white screen.

Seventh Exemplary Embodiment

Figure 34:
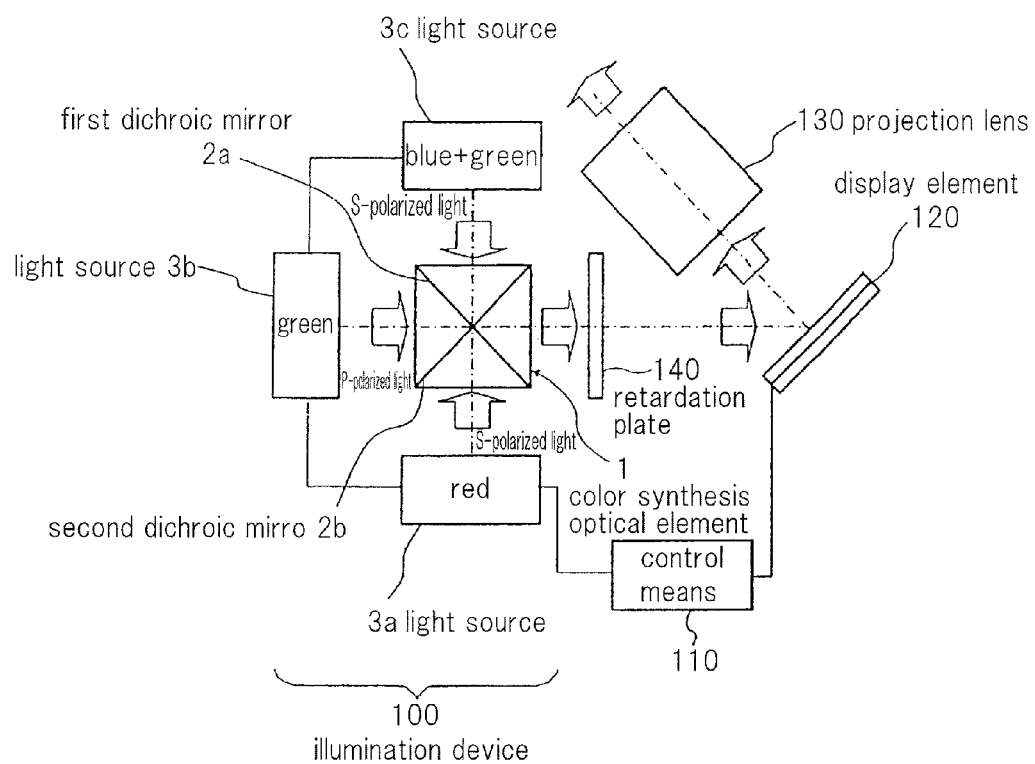
FIG. 34 is a block diagram showing the configuration of the projection-type display device that is the seventh exemplary embodiment of the present invention.

FIG. 34 is a block diagram showing the configuration of the projection-type display device that is the seventh exemplary embodiment of the present invention. The projection-type display device of the present exemplary embodiment is a device in which retardation plate 140 is added to the configuration of the projection-type display device of the sixth exemplary embodiment. The configuration and operations other than retardation plate 140 are all identical to the sixth exemplary embodiment.

As described hereinabove, in the projection-type display device of the sixth exemplary embodiment, blue S-polarized light, green P-polarized light and S-polarized light, and red S-polarized light are synthesized in color synthesis optical element 1, and the light from this color synthesis optical element 1 illuminates display element 120. When, for example, an MEMS-type component is used for display element 120, the polarization direction also differs for each color for a projected image.

A case is considered in which the projection-type display device of the sixth exemplary embodiment is applied to a stereoscopic display device that uses a liquid crystal shutter eyeglasses to perform stereoscopic display. In a stereoscopic display device of this type, a screen is used that allows the polarization of the projected image to be maintained. As a result, when the image that is projected onto the screen from the projection-type display device is viewed by way of liquid crystal shutter eyeglasses, the polarization direction of transmitted light is limited by a sheet polarizer that is provided in the liquid crystal shutter eyeglasses. In other words, the colors of the image are changed. A similar problem occurs not only with liquid crystal shutter eyeglasses, but whenever a means that limits polarization is used to view a projected image.

In the projection-type display device of the present exemplary embodiment, retardation plate 140 is provided between color synthesis optical element 1 and display element 120 at a position that faces the exit surface of color synthesis optical element 1 to solve the above-described problem.

Retardation plate 140 is a quarter-wave plate and is of a configuration in which a polyvinyl alcohol film is stretched uniaxially and sandwiched between protective films. When, for example, the optical axis of retardation plate 140 is set to the 45-degree direction, blue S-polarized light, green S-polarized light, and red S-polarized light become right-handed circularly polarized light and green P-polarized light becomes left-handed circularly polarized light, whereby the directivity of the polarization of projected light can be eliminated and the problem of differences in the amount of reflected light due to color can be canceled.

Retardation plate 140 is not limited to the construction described above. As retardation plate 140, a preferable construction is made up of a multilayer film that acts as a quarter-wave plate across the broad wavelength band of white light.

In addition, retardation plate 140 may also be a retardation plate that makes phase difference change randomly in minute regions to thus cancel polarization. Illumination light from each minute region progressively spreads at a certain angle, whereby randomly different polarization states are superposed and illumination light lacking polarization is obtained.

Retardation plate 140 is not limited to a film. A component that can electronically control phase difference such as a liquid crystal element can also be used as retardation plate 140. In addition, a component that changes the voltage that is applied in minute regions to thus change the liquid crystal cell thickness and give random phase differences may also be used as retardation plate 140.

When the polarization axis of the sheet polarizer of liquid crystal shutter eyeglasses is in a direction parallel to P-polarized light or S-polarized light, a half-wave plate may be used as retardation plate 140, and the optical axis may be set to the 22.5-degree direction to rotate the polarized light that passes through in the ±45-degree direction. In this case, light that passes through liquid crystal shutter eyeglasses is the average value of transmitted light with respect to P-polarized light and S-polarized light and the problem of differences in transmitted light due to color can therefore be resolved.

The position at which retardation plate 140 is arranged is not limited to a position that faces the exit surface of color synthesis optical element 1. Retardation plate 140 may also be arranged between display element 120 and projection lens 130 or at a position that faces the exit surface of projection lens 130. In either case, the same effect can be obtained as when retardation plate 140 is arranged at a position that faces the exit surface of color synthesis optical element 1.

The present invention realized by each of the above-described exemplary embodiments exhibits the following actions and effects.

Typically, when solid-state light sources such as LEDs are used as each of red, green, and blue light sources and the red, green, and blue light from each solid-state light source is synthesized to obtain white light having superior white balance, the blue optical output with respect to the color mixing ratios of red, green, and blue light is greater than for the other colors and the green optical output is smaller than for the other colors. In such cases, the optical output of the blue and red solid-state light sources is limited to accord with the green solid-state light source for which the optical output is relatively small, whereby the optical output of the white light that is obtained is reduced.

The illumination device according to one aspect of the present invention includes:

a first light source that includes a solid-state light source whose peak wavelength is set in the red wavelength band;

a second light source that includes a solid-state light source whose peak wavelength is set in the green wavelength band;

a third light source that includes a solid-state light source whose peak wavelength is set in the blue wavelength band; and a color synthesis optical element in which colored light of a first polarization that is entered from the second light source and colored light of a second polarization for which the state of polarization differs from the first polarization that is entered from the first and third light sources are synthesized;

wherein any one of the first to third light sources further includes at least one solid-state light source whose peak wavelength is set in a specific wavelength band that is the wavelength band of the color of the solid-state light source that is used in one of the remaining two light sources.

According to the above-described configuration, green light can be synthesized from two different directions. In addition, this configuration decreases the amount of blue light for which optical output is relatively great and adds green light. Accordingly, the three primary colors can be synthesized at optimum color mixing ratios and white light is obtained having superior white balance.

In addition, the optical output of the solid-state light sources of the three colors can be exhibited at a maximum without limitations.

In the above-described illumination device of the present invention, the above-described color synthesis optical element may be of a configuration that includes: an exit surface;

first to third incident surfaces;

first and second films that are provided such that the film surfaces intersect each other and that selectively reflect or transmit incident light according to wavelength;

the above-described first film transmitting, of visible light of a first polarization, at least light of the above-described specific wavelength band and reflecting, of visible light of a second polarization whose polarization state differs from that of the above-described first polarization, at least light of the above-described specific wavelength band; the above-described second film transmitting, of visible light of the above-described first polarization, at least light of the above-described specific wavelength band and transmitting, of visible light of the above-described second polarization, at least light of the above-described specific wavelength band; and the cutoff wavelengths with respect to the above-described second polarization of the above-described first and second films being set within band ranges other than the wavelength bands of red, green, and blue that are the three primary colors of light, and at least colored light of the above-described second polarization that is entered from the above-described first incident surface, colored light of the above-described first polarization that is entered from the above-described second incident surface, and colored light of the above-described second polarization that is entered from the above-described third incident surface being exited from the above-described exit surface by way of the above-described first and second films.

The following actions and effects are exhibited by means of this configuration. In the following explanation, the problems in the previously described Patent Documents 1-5 are also described together.

Typically, a dichroic mirror composed of a dielectric multilayer film, while having the advantage of small light absorption, also has incident angle dependency and polarization dependency. Although incident angle dependency and polarization dependency do not occur in the case of perpendicular incidence (the angle of incidence is 0 degrees), this dichroic mirror has the characteristic in which the amount of shift or divergence from the designed value of cutoff wavelength increases as the angle of incidence increases.

In addition, the cut-off characteristic is not steep, but rather, has a slope in a band in the order of 20 nm-30 nm, whereby the separation-synthesis efficiency in this wavelength band drops.

As shown in Patent Document 1, regarding light from LEDs for which peak wavelengths are close, the synthesis efficiency drops in the vicinity of the cutoff wavelengths. When an LED having a large semiconductor chip area is used to obtain brightness, despite conversion to parallel luminous flux by means of a lens, light exited from directions other than the optical axis and having angularity is exited from the lens, whereby the colors of the synthesized light will differ for each angular component due to the incident angle dependency of the dichroic mirrors. In addition, the emitted light from the LED has random polarization directions, whereby only the component of any one of the polarization directions may be synthesized.

When this type of dichroic mirror is used to synthesize light of a plurality of colors, the efficiency during synthesis drops when the peak wavelengths are not separated and a bright synthesized light cannot be obtained.

As shown in Patent Documents 2-5, when four colors or six colors among the band of white light are synthesized, when bright luminous flux is to be obtained, light other than parallel luminous flux also occurs and the efficiency of light synthesis similarly drops due to incident angle dependency or polarization dependency. Furthermore, when the ratios at which multiple colors are synthesized differ due to angular components, irregular color will appear on the projection screen.

In particular, as shown in Patent Document 2 or Patent Documents 4 and 5, when light from LEDs of two colors is supplied from the same direction, the colored light does not mix as parallel luminous flux, and angular spread must be conferred in order to achieve uniform color mixing of each of the colors. However, when angular spread is conferred, loss occurs during color mixing of light that is entered from other directions due to the incident angle dependency of the dichroic mirrors. Thus, there is the trade-off in which although angular spread must be conferred in order to achieve uniform color mixing of each of the colors, conferring this angular spread results in loss due to incident angle dependency.

According to the color synthesis optical element in the illumination device of the above-described present invention, a configuration can be provided in which the cutoff wavelengths of a first film (for example, a dichroic mirror) and a second film (for example, a dichroic mirror) with respect to green P-polarized light are sufficiently separated. Accordingly, green P-polarized light is not reflected by these films despite shifting of the cutoff wavelengths due to incident angle dependency. As a result, loss due to incident angle dependency does not occur.

Alternatively, a configuration can be provided in which, for example, the cutoff wavelengths of the first film and the second film with respect to green S-polarized light and red S-polarized light are sufficiently separated. Accordingly, the red and green S-polarized light can be synthesized by these films with virtually no loss despite shifting of the cutoff wavelengths due to incident angle dependency.

Accordingly, colored light can be efficiently synthesized for light that is entered at angles that differ from parallel light.

As described hereinabove, the present invention can provide an illumination device that can cause realization of the maximum optical output performance of LEDs and that features high light utilization efficiency during color mixing, and that can obtain white light having superior white balance.

In addition, the present invention can provide a projection-type display device in which this illumination device is used to obtain a bright projected image.

The illumination device of each of the exemplary embodiments described above and the projection-type display device that uses the illumination device are only examples of the present invention, and the configurations and operations of these devices are open to appropriate modifications within a scope that does not diverge from the gist of the present invention.

For example, the illumination device of the first to third exemplary embodiments, the illumination device of the fourth and fifth exemplary embodiments, and the projection-type display device of the sixth and seventh exemplary embodiments can be combined as appropriate.

In addition, in the first to seventh exemplary embodiments, the relation between P-polarized light and S-polarized light can be reversed (description of P-polarized light can be described as S-polarized light, and description of S-polarized light can be described as P-polarized light).

Still further, the first and second dichroic mirrors are not limited to dielectric multilayer films and may also be optical films having wavelength selectivity or polarization selectivity such as holograms.

The angle of intersection of the first and second dichroic mirrors is not limited to 90 degrees.

The first and second dichroic mirrors may be formed on plate glass rather than in prism shapes.

Still further, in the first to seventh exemplary embodiments, other solid-state light sources such as semiconductor lasers may be used in place of LEDs.

The display element is not limited to a component that uses micromirrors. Instead of a reflective type, the display element may be a transmissive display element provided with a microshutter at each pixel. The display element may also be a device other than a digital mirror device, such as a liquid crystal light valve.

Although the present invention has been described with reference to exemplary embodiments, the present invention is not limited to the above-described exemplary embodiments. The configuration and operation of the present invention is open to various modifications within a scope that does not depart from the gist of the present invention that will be understood by one of ordinary skill in the art.

This application claims the benefits of priority based on Japanese Patent Application No. 2009-222671 for which application was submitted on Sep. 28, 2009 and incorporates by citation all of the disclosures of that application.

The invention claimed is:

1. An illumination device comprising:
a first light source that includes a solid-state light source having a peak wavelength that is set in a red wavelength band;
a second light source that includes a solid-state light source having a peak wavelength that is set in a green wavelength band;
a third light source that includes a solid-state light source having a peak wavelength that is set in a blue wavelength band; and
a color synthesis optical element that synthesizes colored light of a first polarization that enters the color synthesis optical element from said second light source and colored light of a second polarization having a polarization state that differs from a polarization state of said first polarization, the colored light of the second polarization entering the color synthesis optical element from said first light source and said third light source;
wherein any one of said first light source, said second light source and said third light source further includes at least one solid-state light source having a peak wavelength that is set in a specific wavelength band that is a wavelength band of a color of the solid-state light source that is used in one of the remaining two light sources,
wherein said color synthesis optical element comprises:
an exit surface;
a first incident surface, a second incident surface and a third incident surface; and
a first film and a second film provided such that a surface of the first film and a surface of the second film intersect with each other, the first film and the second film selectively reflecting or transmitting incident light according to the wavelength of the incident light,
wherein:
said first film transmits, of visible light of said first polarization, at least light of said specific wavelength band and reflects, of visible light of said second polarization, at least light of said specific wavelength band;
said second film transmits, of said visible light of said first polarization, at least light of said specific wavelength band and transmits, of said visible light of said second polarization, at least light of said specific wavelength band; and
cutoff wavelengths of said first film and said second film with respect to said second polarization are set within ranges of bands other than the wavelength bands of red, green, and blue that are three primary colors of light, and at least colored light of said second polarization that enters the color synthesis optical element from said first incident surface, colored light of said first polarization that enters the color synthesis optical element from said second incident surface, and colored light of said second polarization that enters the color synthesis optical element from said third incident surface exit the color synthesis optical element from said exit surface by way of said first and second films.

2. The illumination device as set forth in claim 1, wherein the solid-state light source having the peak wavelength that is set in said specific wavelength band is a solid-state light source having the peak wavelength that is set in said green wavelength band and is provided in said third light source.

3. The illumination device as set forth in claim 2, wherein:
the cutoff wavelengths with respect to said second polarization of said first and second films are set to within the range of the yellow wavelength band;
said first light source emits red light of said second polarization having a peak wavelength that is set in said red wavelength band;
said second light source emits green light of said first polarization having a peak wavelength that is set in said green wavelength band; and
said third light source emits green light of said second polarization having a peak wavelength that is set in said green wavelength band and blue light of said second polarization having a peak wavelength that is set in said blue wavelength band.

4. The illumination device as set forth in claim 3, wherein said yellow wavelength band is at least 560 nm and no greater than 600 nm.

5. An illumination device comprising:
a first light source that includes a solid-state light source having a peak wavelength that is set in a red wavelength band;
a second light source that includes a solid-state light source having a peak wavelength that is set in a blue wavelength band;
a third light source that includes a solid-state light source having a peak wavelength that is set in a green wavelength band; and
a color synthesis optical element that synthesizes colored light of a first polarization that enters the color synthesis optical element from said second light source and colored light of a second polarization having a polarization state that differs from a polarization state of said first polarization, the colored light of the second polarization entering the color synthesis optical element from said first light source and said third light source;
wherein any one of said first light source, said second light source and said third light source further includes at least one solid-state light source having a peak wavelength that is set in a specific wavelength band that is a wavelength band of a color of the solid-state light source that is used in one of the remaining two light sources,
wherein said color synthesis optical element comprises:
an exit surface;
a first incident surface, a second incident surface and a third incident surface; and
a first film and a second film provided such that a surface of the first film and a surface of the second film intersect with each other, said first film and said second film selectively reflecting or transmitting incident light according to the wavelength of the incident light,
wherein:
said first film transmits, of visible light of said first polarization, at least light of said specific wavelength band and reflects, of visible light of said second polarization, at least light of said specific wavelength band;
said second film transmits, of said visible light of said first polarization, at least light of said specific wavelength band and transmits, of said visible light of said second polarization, at least light of said specific wavelength band;
cutoff wavelengths of said first film and said second film with respect to said second polarization are set within ranges of bands other than the wavelength bands of red, green, and blue that are three primary colors of light, and at least colored light of said second polarization that enters the color synthesis optical element from said first incident surface, colored light of said first polarization that enters the color synthesis optical element from said second incident surface, and colored light of said second polarization that enters the color synthesis optical element from said third incident surface exit the color synthesis optical element from said exit surface by way of said first and second films, and
wherein:
said solid-state light source having the peak wavelength that is set in said specific wavelength band, which is arranged in said second light source, is a solid-state light source having a peak wavelength that is set in said green wavelength band;
the cutoff wavelength with respect to said second polarization of said first film includes first and second cutoff wavelengths, the first cutoff wavelength being set within the range of the yellow wavelength band and the second cutoff wavelength being set within the range of the blue-green wavelength band;
the cutoff wavelength with respect to said second polarization of said second film is set within said yellow wavelength band;
said first light source emits red light of said second polarization having a peak wavelength that is set in said red wavelength band;
said second light source emits blue light of said first polarization having a peak wavelength that is set in said blue wavelength band and green light of said first polarization having a peak wavelength that is set in said green wavelength band; and
said third light source emits green light of said second polarization having a peak wavelength that is set in said green wavelength band.

6. An illumination device comprising:
a first light source that includes a solid-state light source having a peak wavelength that is set in a blue wavelength band;
a second light source that includes a solid-state light source having a peak wavelength that is set in a red wavelength band;
a third light source that includes a solid-state light source having a peak wavelength that is set in a green wavelength band; and
a color synthesis optical element that synthesizes colored light of a first polarization that enters the color synthesis optical element from said second light source and colored light of a second polarization having a polarization state that differs from a polarization state of said first polarization, the colored light of the second polarization entering the color synthesis optical element from said first light source and said third light source;
wherein any one of said first light source, said second light source, and said third light source further includes at least one solid-state light source having a peak wavelength that is set in a specific wavelength band that is a wavelength band of a color of the solid-state light source that is used in one of the remaining two light sources,
wherein said color synthesis optical element comprises:
an exit surface;
a first incident surface, a second incident surface, and a third incident surface; and
a first film and a second film provided such that a surface of the first film and a surface of the second film intersect with each other, said first film and said second film selectively reflecting or transmitting incident light according to the wavelength of the incident light,
wherein:
said first film transmits, of visible light of said first polarization, at least light of said specific wavelength band and reflects, of visible light of said second polarization, at least light of said specific wavelength band;
said second film transmits, of said visible light of said first polarization, at least light of said specific wavelength band and transmits, of said visible light of said second polarization, at least light of said specific wavelength band;

cutoff wavelengths of said first film and said second film with respect to said second polarization are set within ranges of bands other than the wavelength bands of red, green, and blue that are three primary colors of light, and at least colored light of said second polarization that enters the color synthesis optical element from said first incident surface, colored light of said first polarization that enters the color synthesis optical element from said second incident surface, and colored light of said second polarization that enters the color synthesis optical element from said third incident surface exit the color synthesis optical element from said exit surface by way of said first and second films, and wherein:

said solid-state light source having the peak wavelength that is set in said specific wavelength band, which is arranged in said second light source, is a solid-state light source having a peak wavelength that is set in said green wavelength band;

the cutoff wavelength with respect to said second polarization of said first film includes first and second cutoff wavelengths, the first cutoff wavelength being set to a wavelength of the yellow wavelength band and the second cutoff wavelength being set to a wavelength of the blue-green wavelength band;

the cutoff wavelength with respect to said second polarization of said second film is set to a wavelength of said blue-green wavelength band;

said first light source emits blue light of said second polarization having a peak wavelength that is set in said blue wavelength band;

said second light source emits green light of said first polarization having a peak wavelength that is set in said green wavelength band and red light of said first polarization having a peak wavelength that is set in said red wavelength band; and said third light source emits green light of said second polarization having a peak wavelength that is set in said green wavelength band.

7. The illumination device as set forth in claim 1, further comprising four right angle prisms including surfaces that form right angles, the surfaces of each right angle prism being joined together, wherein said first film and said second film are formed on the joined surfaces of the right angle prisms.

8. The illumination device as set forth in claim 1, further comprising a retardation plate that converts light exited from said color synthesis optical element to circularly polarized light.

9. A projection-type display device comprising:

the illumination device as set forth in claim 1;

a display element into which light from said illumination device is entered;

projection optics that project an image displayed by said display elements; and a control unit that both causes images that accord with an input video signal to be displayed on said display element for each color component that corresponds to the three primary colors of light and that controls lighting of said first to third light sources that make up said illumination device in synchronization with the timing of the image display of each color component.

* * * * *